US011703990B2

(12) United States Patent
Waldman et al.

(10) Patent No.: US 11,703,990 B2
(45) Date of Patent: Jul. 18, 2023

(54) ANIMATED VISUAL CUES INDICATING THE AVAILABILITY OF ASSOCIATED CONTENT

(71) Applicant: MICROSOFT TECHNOLOGY LICENSING, LLC, Redmond, WA (US)

(72) Inventors: Lawrence Fubini Waldman, Kirkland, WA (US); Cole Jagger Poelker, Asheville, NC (US); Annika Elias, North Bend, WA (US); Matthew Benjamin Blank, Redmond, WA (US); Caleb Warren, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/995,799

(22) Filed: Aug. 17, 2020

(65) Prior Publication Data

US 2022/0050578 A1 Feb. 17, 2022

(51) Int. Cl.
*G06F 3/04812* (2022.01)
*G06F 3/0482* (2013.01)
*H04L 51/046* (2022.01)

(52) U.S. Cl.
CPC ........ *G06F 3/04812* (2013.01); *G06F 3/0482* (2013.01); *H04L 51/046* (2013.01)

(58) Field of Classification Search
CPC ... G06F 3/04812; G06F 3/0482; H04L 51/046
See application file for complete search history.

(56) References Cited

U.S. PATENT DOCUMENTS 5,305,435 A * 4/1994 Bronson ............... G06F 3/0481
715/775
7,739,604 B1 * 6/2010 Lyons ................ G06F 3/0486
715/736

(Continued)

OTHER PUBLICATIONS

"Animate layout changes using a transition", Retrieved from: https://web.archive.org/web/20180629170027/https:/developer.android.com/training/transitions/, Jun. 29, 2018, 17 Pages.

(Continued)

*Primary Examiner* — Ryan F Pitaro
(74) *Attorney, Agent, or Firm* — Scott Y. Shigeta; Newport IP, LLC

(57) ABSTRACT

A system that generates animated visual cues for providing previews that indicate the availability of associated content is provided. The system can display a landing page in response to a command to display selected content, such as messages of a chat session. The landing page generates a visual cue that displays an animated preview of associated content, such as files related to the chat session, concurrently with the selected content before transitioning to view that shows the selected content, such as a chat session UI. The disclosed techniques also enable systems to generate a visual bounce cue providing awareness of salient content. For example, a device displaying selected content, e.g., messages in a chat session UI, may create a controlled animated movement of the chat session UI to let a user know of an update to associated content that may be displayed in a UI layer under the selected content.

20 Claims, 53 Drawing Sheets

(56) References Cited

U.S. PATENT DOCUMENTS

| | | | | |
|---|---|---|---|---|
| 7,913,183 B2* | 3/2011 | Czerwinski | ............ | G06F 3/0481 715/779 |
| 8,296,655 B2* | 10/2012 | Lusty | ............ | G06F 16/248 715/740 |
| 8,504,937 B2* | 8/2013 | Jobs | ............ | G06F 3/0481 715/781 |
| 9,015,641 B2* | 4/2015 | Bocking | ............ | G06F 3/0484 715/863 |
| 9,154,606 B2* | 10/2015 | Tseng | ............ | G06F 3/0488 |
| 9,292,310 B2* | 3/2016 | Chaudhri | ............ | G06F 3/0488 |
| 9,619,912 B2 | 4/2017 | Bhatnagar et al. | | |
| 9,785,332 B1* | 10/2017 | Karppanen | ............ | G09G 5/346 |
| 9,880,735 B2* | 1/2018 | Dascola | ............ | H04M 1/72436 |
| 9,882,996 B2* | 1/2018 | Faaborg | ............ | H04L 67/18 |
| 10,052,026 B1* | 8/2018 | Tran | ............ | A61B 5/165 |
| 10,168,868 B2* | 1/2019 | Lee | ............ | G06F 3/0483 |
| 10,222,960 B2 | 3/2019 | Sowden et al. | | |
| 10,338,765 B2* | 7/2019 | Doan | ............ | G06F 3/0481 |
| 10,423,290 B2* | 9/2019 | Koshimae | ............ | G06F 3/0481 |
| 10,430,039 B2* | 10/2019 | Matas | ............ | H04N 21/44226 |
| 10,551,995 B1* | 2/2020 | Ho | ............ | G06F 3/04817 |
| 10,559,003 B1* | 2/2020 | Bitoun | ............ | H04L 67/1095 |
| 10,573,051 B2 | 2/2020 | Henry et al. | | |
| 10,645,141 B2* | 5/2020 | Ko | ............ | G06Q 50/01 |
| 10,764,233 B1* | 9/2020 | Goldberg | ............ | H04L 51/36 |
| 11,082,549 B2* | 8/2021 | Lee | ............ | G06F 3/0482 |
| 2003/0160815 A1* | 8/2003 | Muschetto | ............ | G06F 3/0481 715/733 |
| 2009/0064055 A1* | 3/2009 | Chaudhri | ............ | G06F 3/04817 715/863 |
| 2009/0094341 A1* | 4/2009 | Szeto | ............ | G06F 3/0482 709/206 |
| 2010/0058231 A1* | 3/2010 | Duarte | ............ | H04M 1/72436 715/800 |
| 2010/0231533 A1* | 9/2010 | Chaudhri | ............ | G06F 3/0482 345/173 |
| 2011/0078624 A1* | 3/2011 | Missig | ............ | G06F 3/04883 715/802 |
| 2012/0169741 A1* | 7/2012 | Adachi | ............ | G06F 9/451 345/474 |
| 2013/0093764 A1 | 4/2013 | Andersson et al. | | |
| 2014/0040770 A1 | 2/2014 | Khoo | | |
| 2014/0096033 A1* | 4/2014 | Blair | ............ | H04L 51/04 715/752 |
| 2014/0173457 A1 | 6/2014 | Wang et al. | | |
| 2014/0247210 A1* | 9/2014 | Henderek | ............ | G06F 3/012 345/156 |
| 2014/0280602 A1* | 9/2014 | Quatrano | ............ | H04L 67/02 709/205 |
| 2014/0282232 A1* | 9/2014 | Oh | ............ | G06F 3/0481 715/800 |
| 2014/0331174 A1* | 11/2014 | Wen | ............ | G06F 3/04883 715/804 |
| 2015/0186610 A1* | 7/2015 | Sansale | ............ | G06F 3/04842 715/736 |
| 2015/0234930 A1 | 8/2015 | Lakkur et al. | | |
| 2015/0286342 A1* | 10/2015 | MacArthur | ............ | G06F 3/0481 715/783 |
| 2015/0346957 A1* | 12/2015 | Louch | ............ | G06F 9/451 715/765 |
| 2015/0365306 A1* | 12/2015 | Chaudhri | ............ | G06F 3/0484 715/736 |
| 2016/0147429 A1* | 5/2016 | Byun | ............ | G06F 3/0481 715/781 |
| 2016/0147903 A1* | 5/2016 | Wang | ............ | G06F 3/0484 707/722 |
| 2016/0149853 A1* | 5/2016 | Anderson | ............ | H04L 51/36 709/205 |
| 2016/0196057 A1* | 7/2016 | Choi | ............ | G06F 3/04883 715/773 |
| 2016/0232201 A1* | 8/2016 | Goran | ............ | G06F 3/017 |
| 2016/0342571 A1* | 11/2016 | Lane | ............ | H04L 51/14 |
| 2016/0342574 A1* | 11/2016 | Zhang | ............ | G06F 40/103 |
| 2016/0349936 A1* | 12/2016 | Cho | ............ | G06F 3/0481 |
| 2017/0031555 A1* | 2/2017 | Ma | ............ | G06F 3/04883 |
| 2017/0054662 A1* | 2/2017 | Crocker | ............ | H04L 51/063 |
| 2017/0060824 A1* | 3/2017 | Sunderland | ............ | G06V 40/174 |
| 2017/0371527 A1* | 12/2017 | Morichere-Matte | .... | H04L 51/32 |
| 2018/0083913 A1* | 3/2018 | Ganesh | ............ | G06F 3/0484 |
| 2019/0079662 A1* | 3/2019 | Wan | ............ | G06F 3/016 |
| 2019/0250781 A1* | 8/2019 | Savitski | ............ | H04M 1/72436 |
| 2019/0334845 A1* | 10/2019 | Rieseberg | ............ | G06F 3/0482 |
| 2020/0233550 A1* | 7/2020 | Kalathur | ............ | G06F 3/0484 |
| 2020/0326848 A1* | 10/2020 | Amini | ............ | G06F 3/04883 |
| 2020/0342865 A1* | 10/2020 | Davies | ............ | G10L 15/22 |
| 2020/0357081 A1* | 11/2020 | Lee | ............ | H04W 4/21 |
| 2020/0379631 A1* | 12/2020 | Karlsson | ............ | G06F 3/04883 |
| 2021/0039000 A1* | 2/2021 | Taylor | ............ | G06N 3/08 |
| 2021/0152503 A1* | 5/2021 | Rodriguez | ............ | H04L 65/60 |

OTHER PUBLICATIONS

"Swipe Container", Retrieved from: https//support.touchgfx.com/docs/development/ui-development/ui-components/containers/swipe-container/, Retrieved Date: Mar. 19, 2020, 6 Pages.

"UI Components for Wearable App Design", Retrieved from: https://developer.tizen.org/design/wearable/ui-components-0#pageIndi_, Retrieved Date: Mar. 19, 2020, 14 pages.

"ViewPager with FragmentPagerAdapter", Retrieved from: https://web.archive.org/web/20140808112145/https:/guides.codepath.com/android/viewpager-with-fragmentpageradapter, Aug. 8, 2014, 6 Pages.

Babich, Nick, "Animated Transitions in Mobile Apps", Retrieved from: https://blog.marvelapp.com/animated-transitions-in-mobile-apps/, Retrieved Date: Mar. 20, 2020, 17 Pages.

Buonomo, et al., "Material View Pager Dots Indicator", Retrieved from: https://github.com/tommybuonomo/dotsindicator, Retrieved Date: Mar. 20, 2020, 6 Pages.

"International Search Report and Written Opinion Issued in PCT Application No. PCT/US21/030987", dated Sep. 1, 2021, 11 Pages.

* cited by examiner

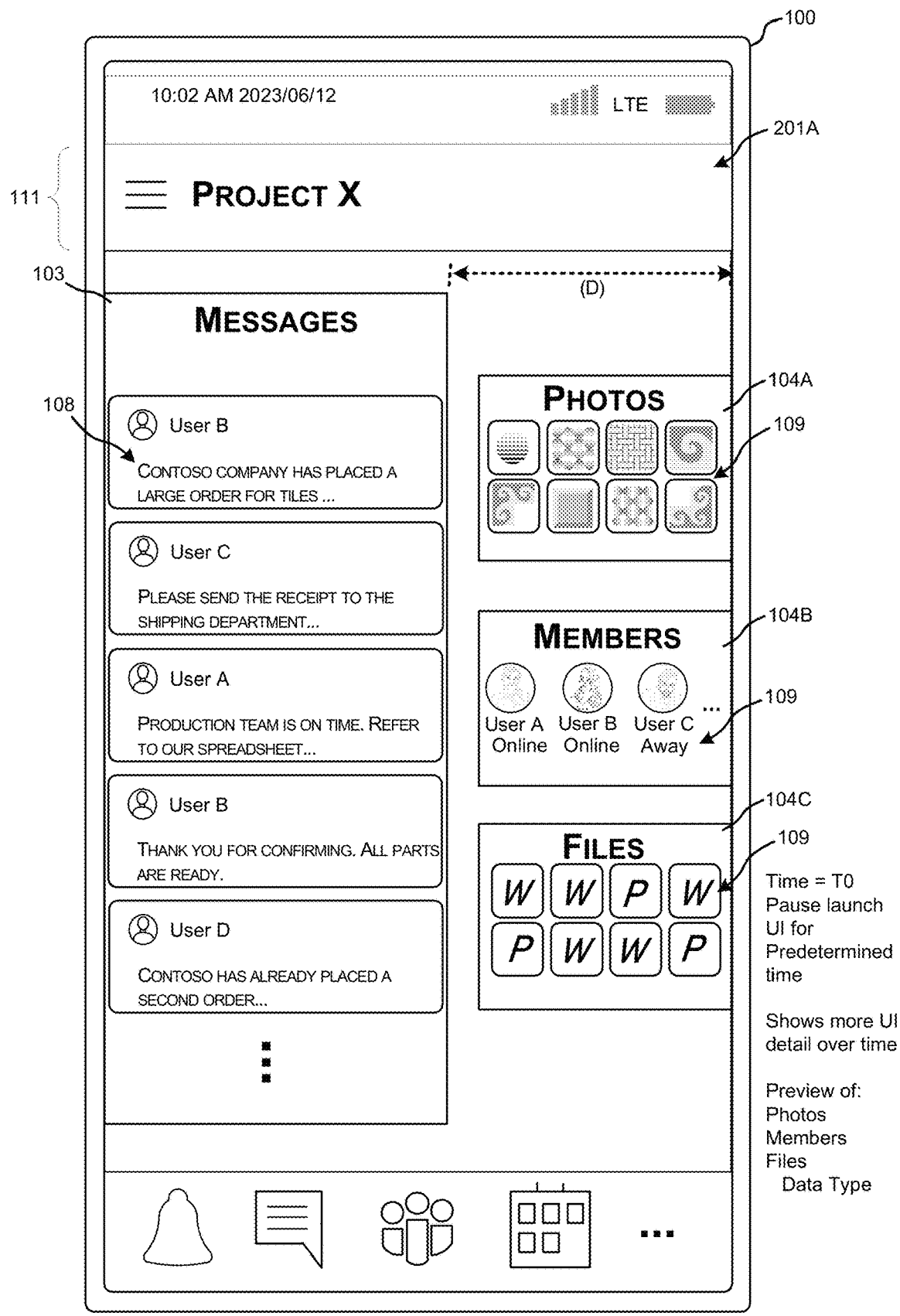
FIGURE 2B  TIME = T₀

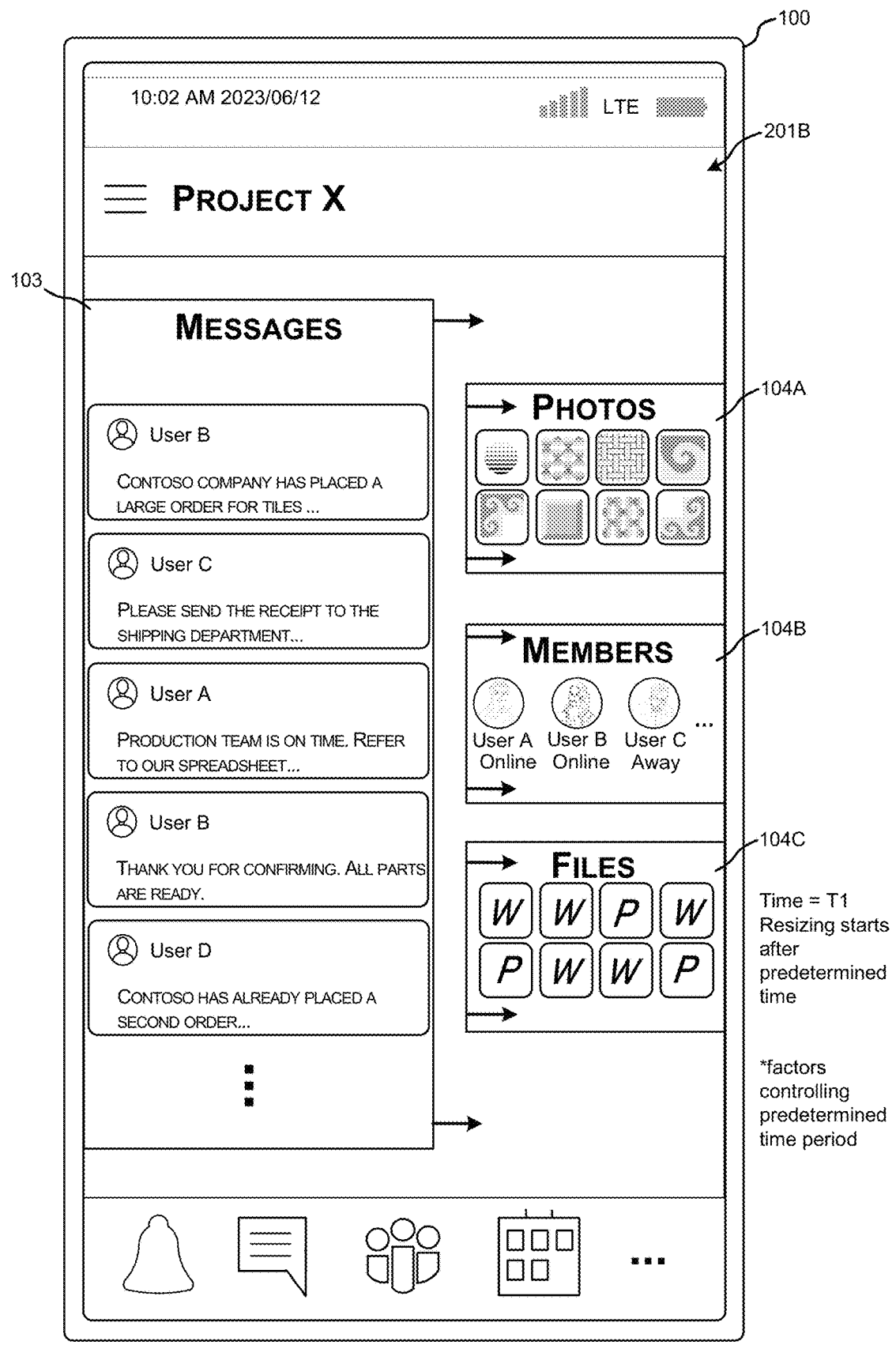
FIGURE 2C  TIME = $T_1$

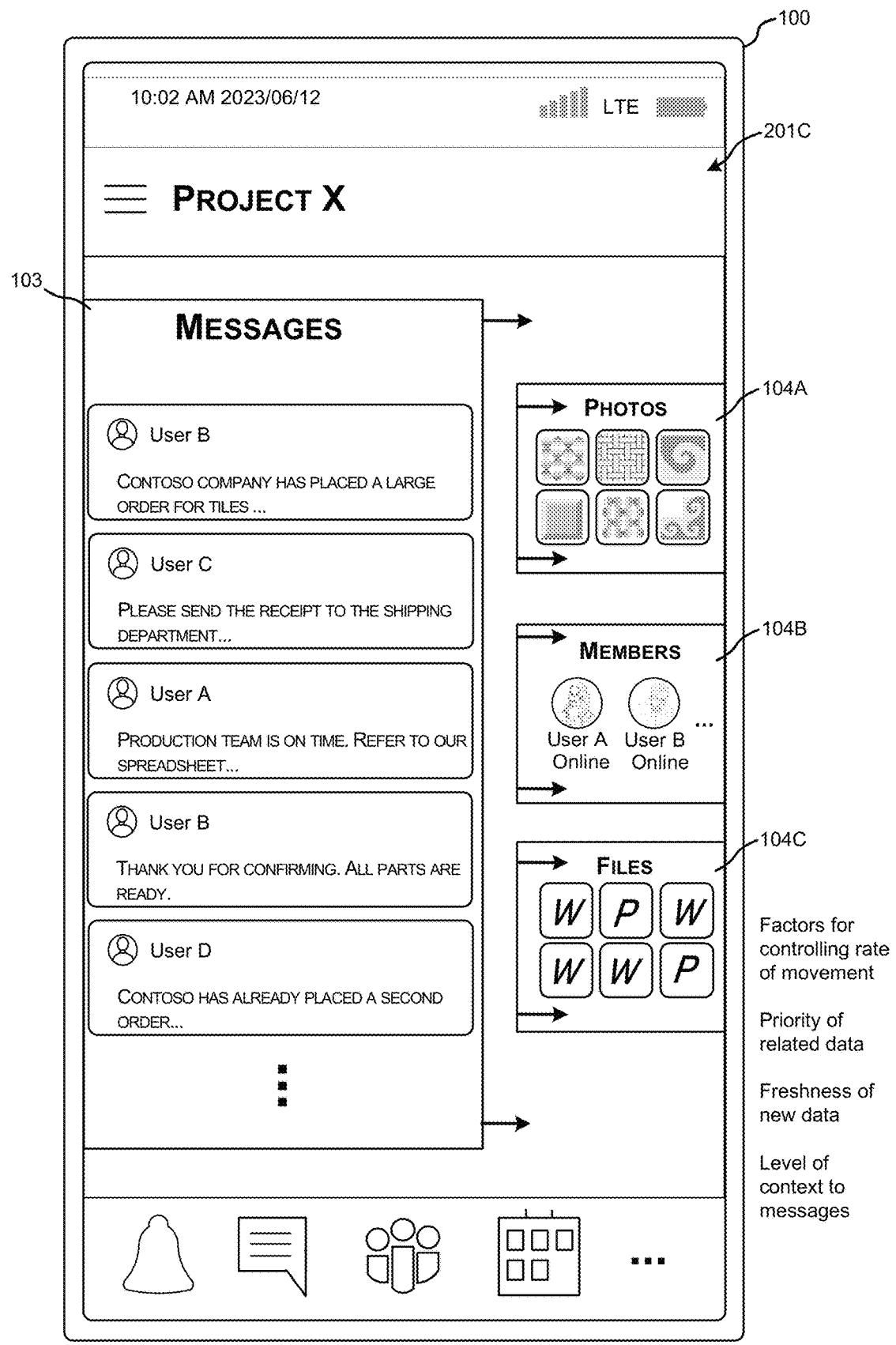
FIGURE 2D   TIME = T₂

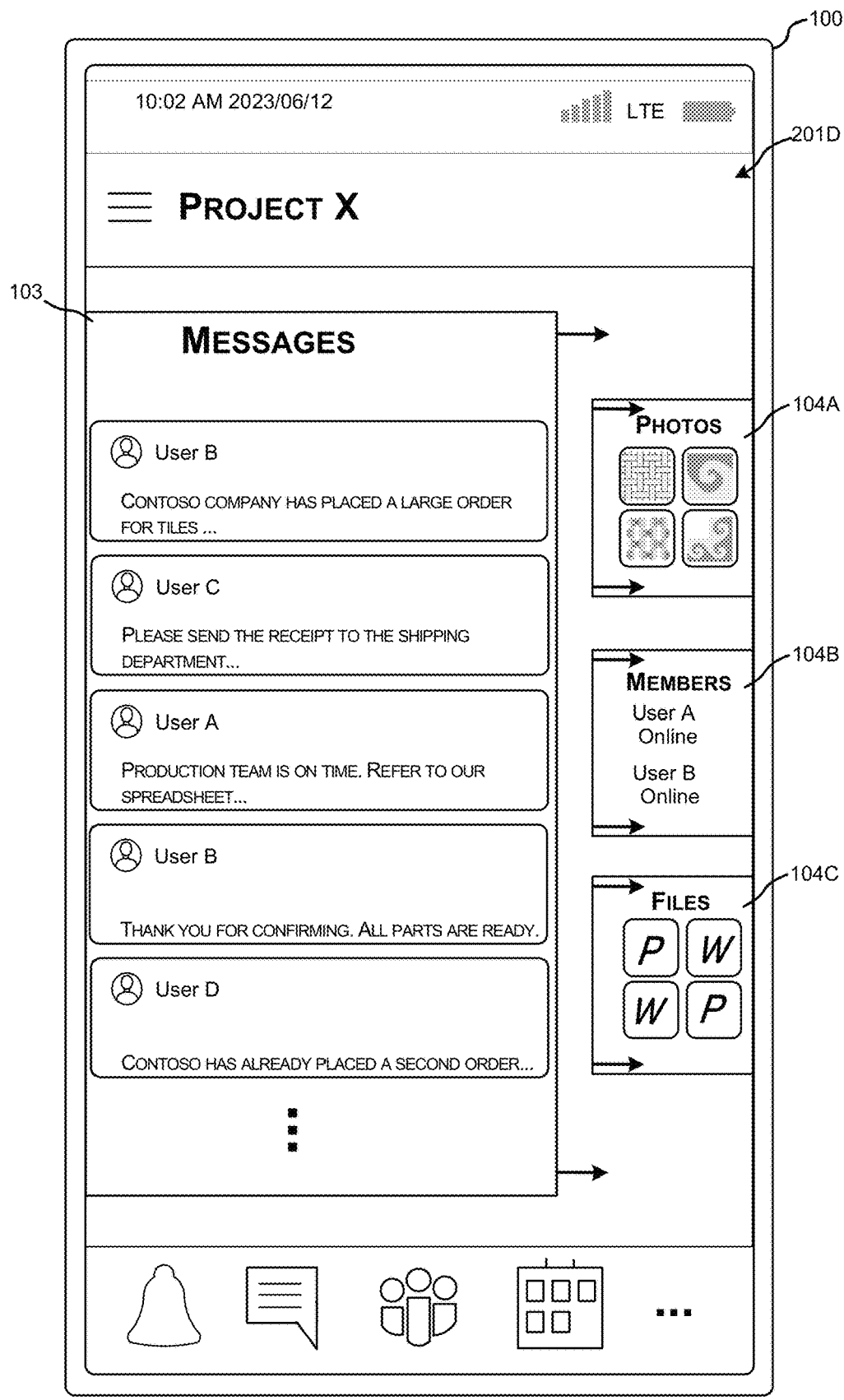
FIGURE 2E    TIME = T₃

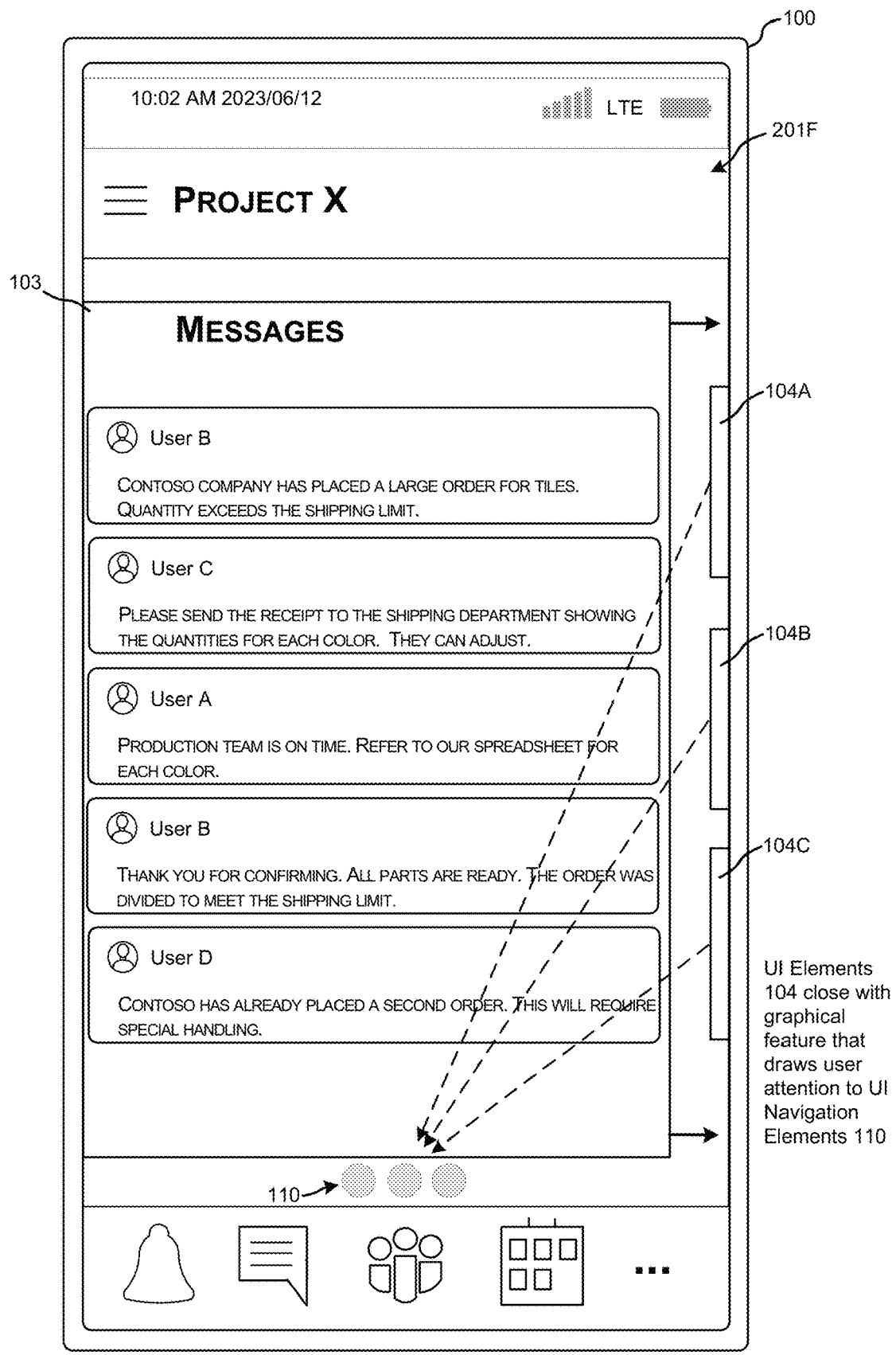
FIGURE 2G     TIME = $T_5$

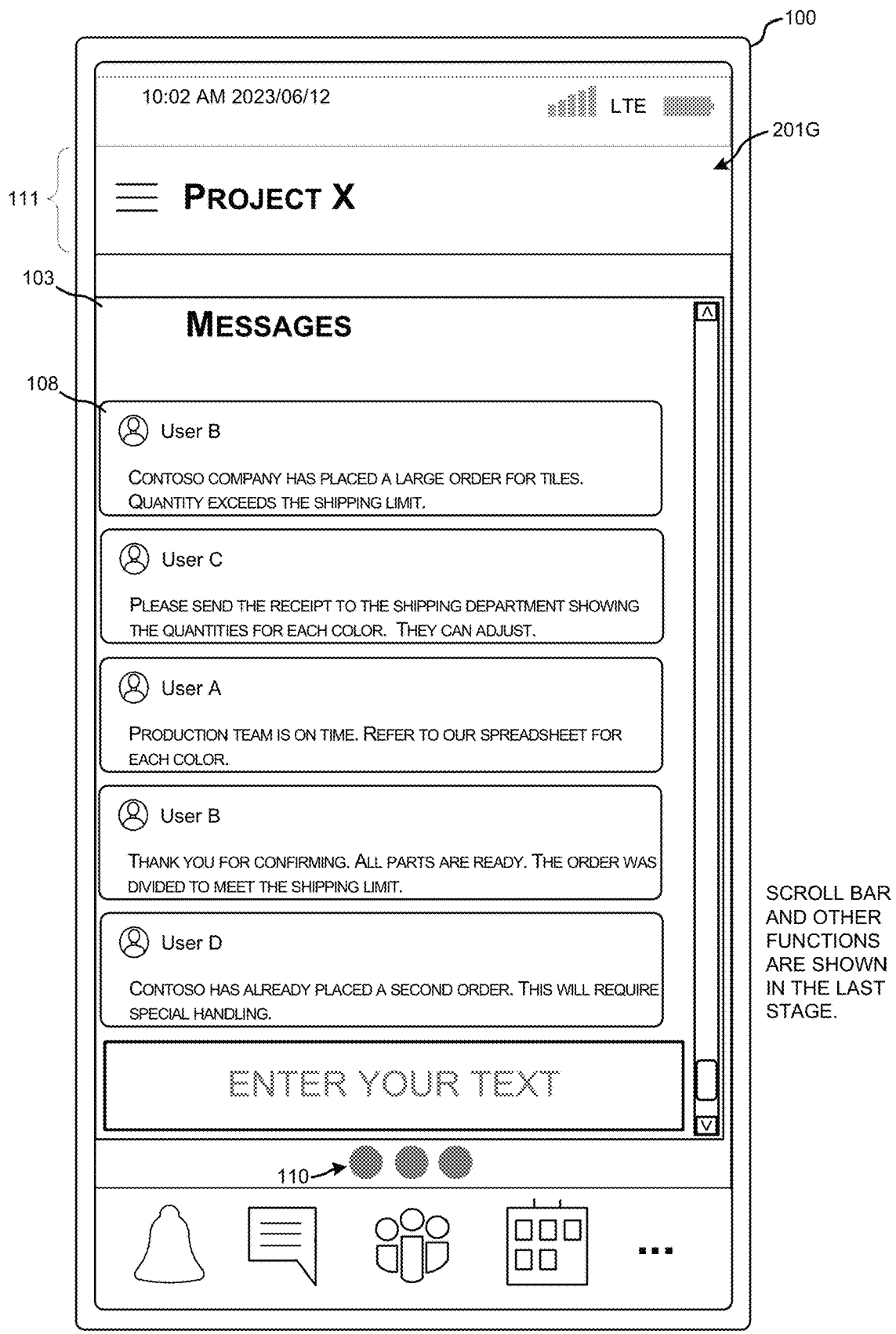
FIGURE 2H       TIME = T₆

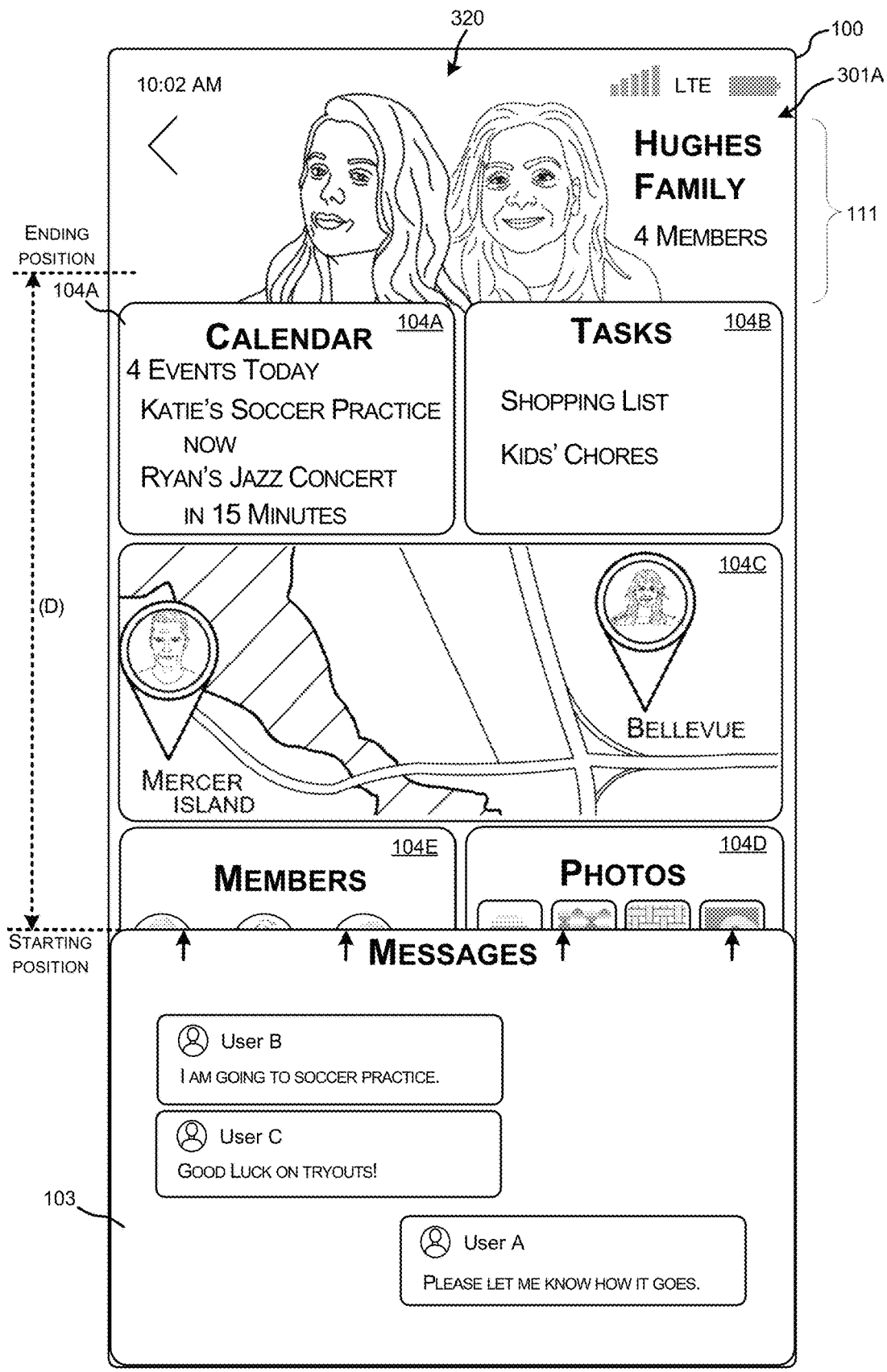
FIGURE 3B  TIME = T₀

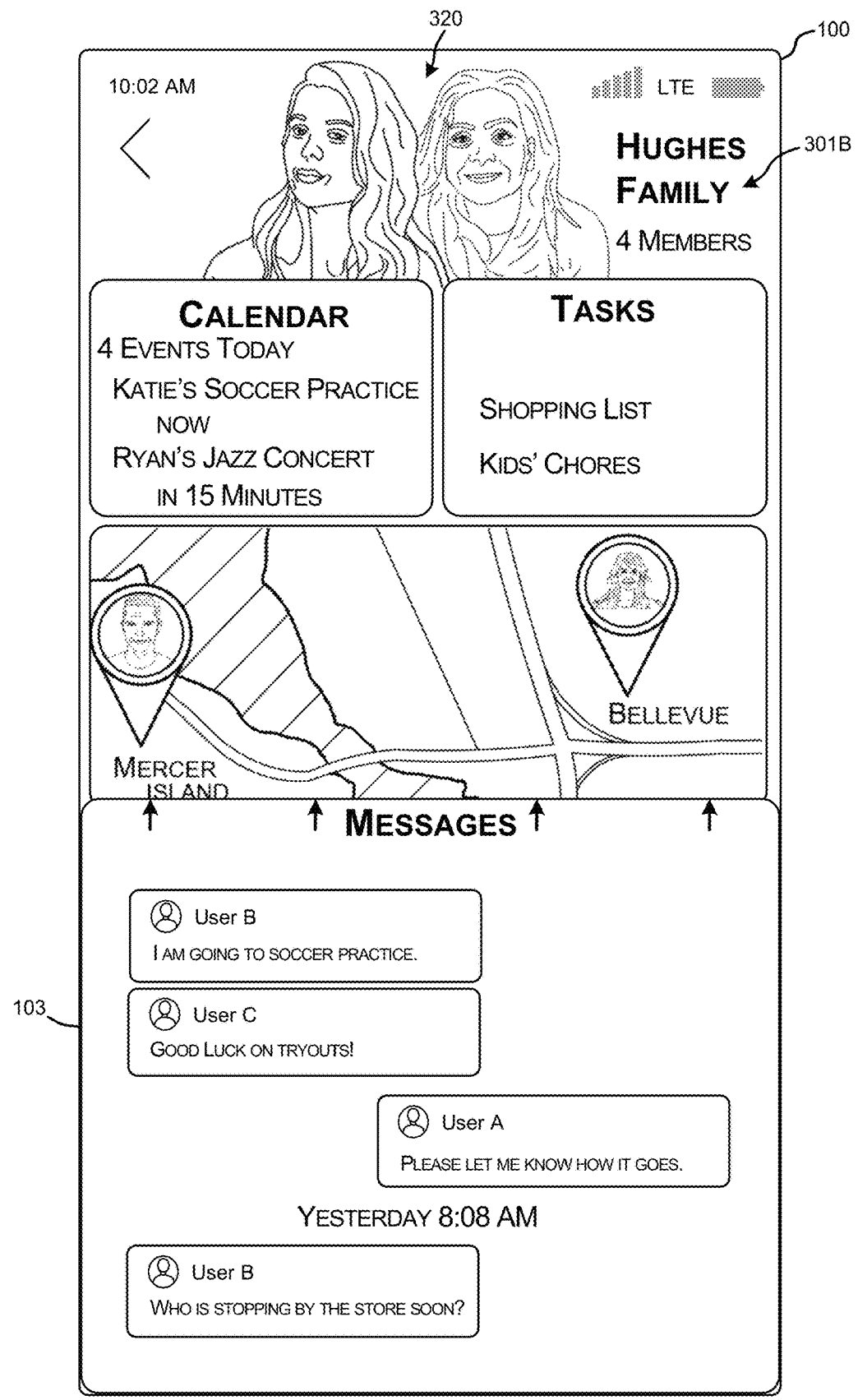
FIGURE 3C  TIME = $T_1$

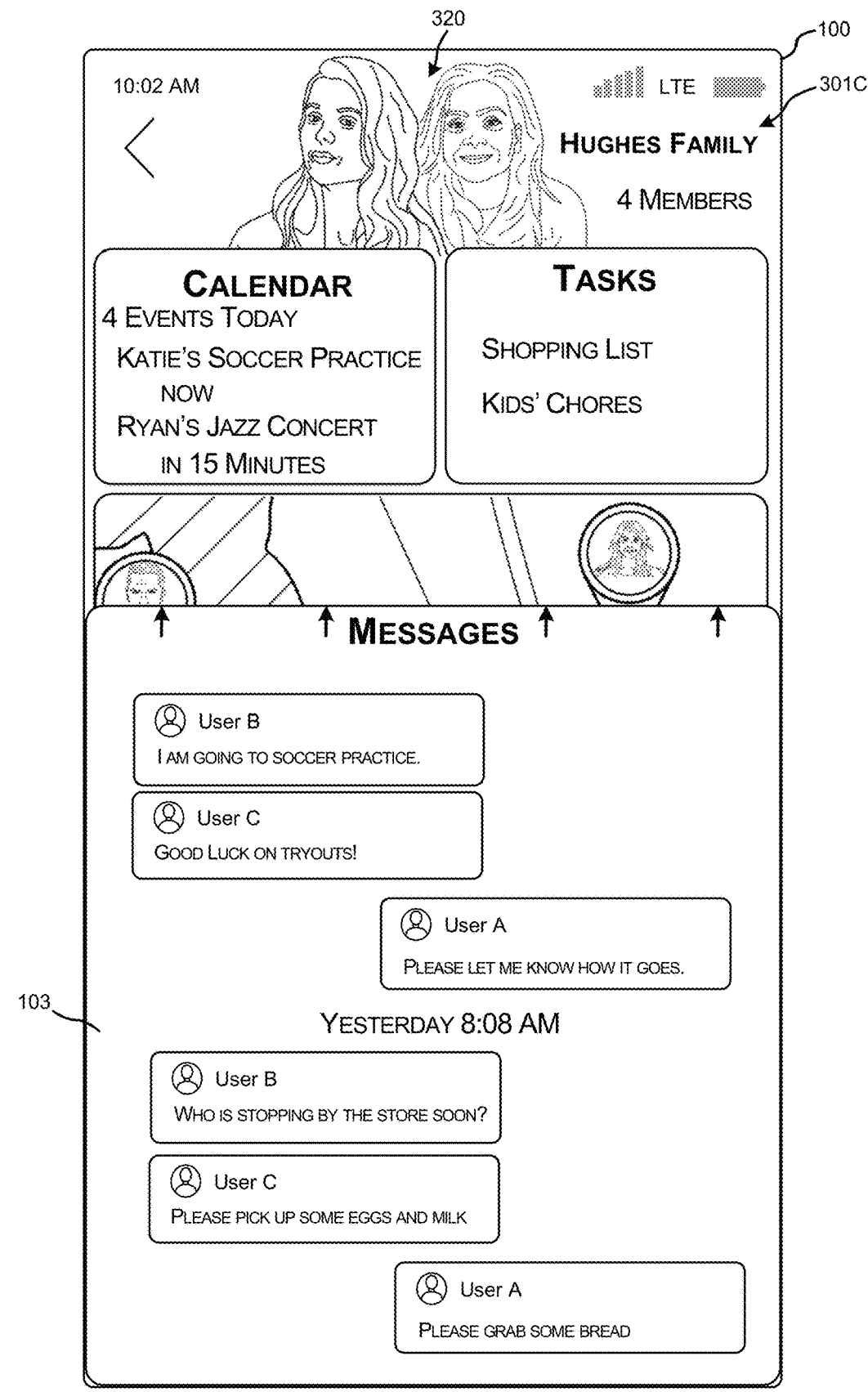
FIGURE 3D  TIME = $T_2$

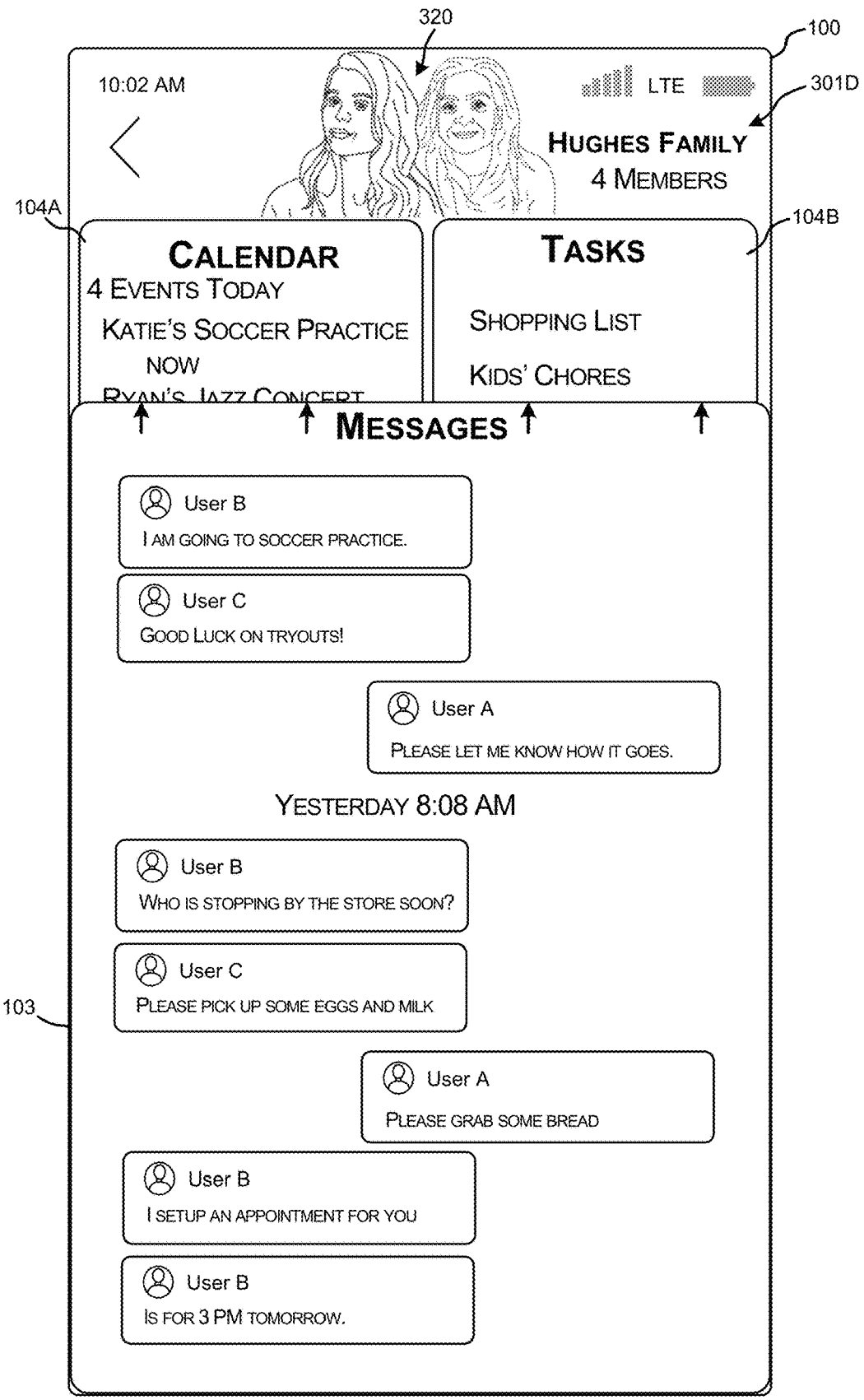
FIGURE 3E  TIME = T₃

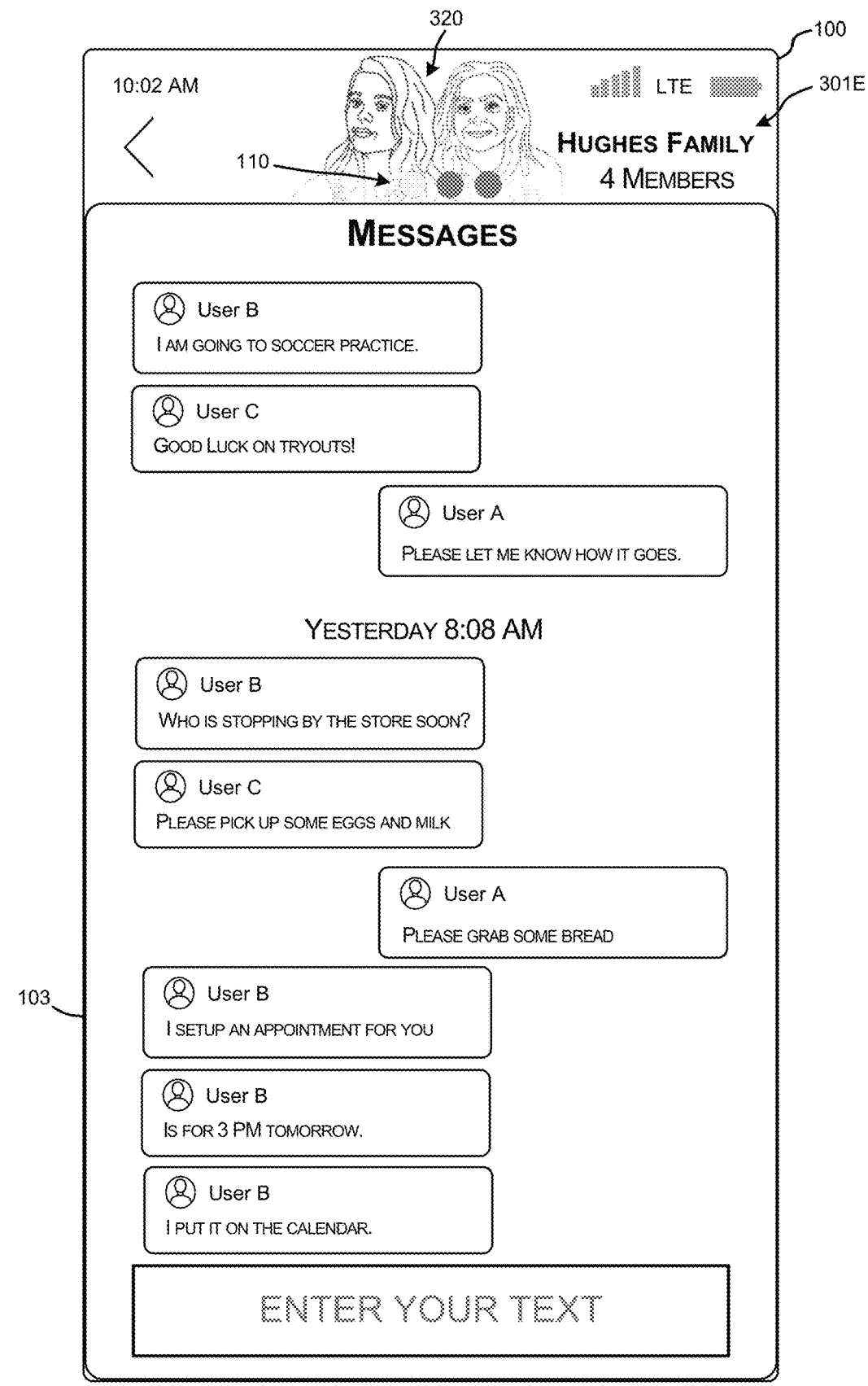
FIGURE 3F  TIME = T₄

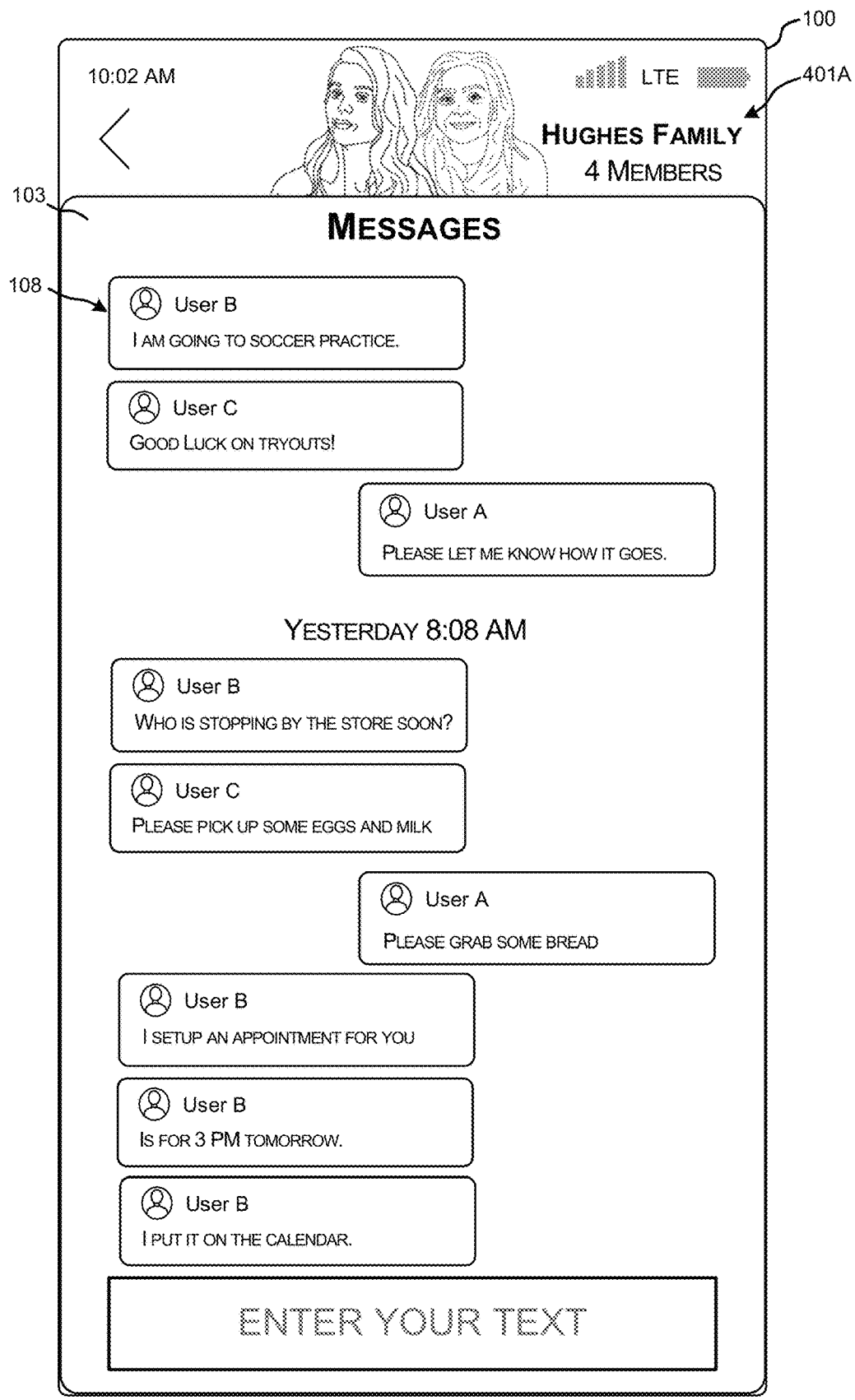
FIGURE 4A    TIME = T₀

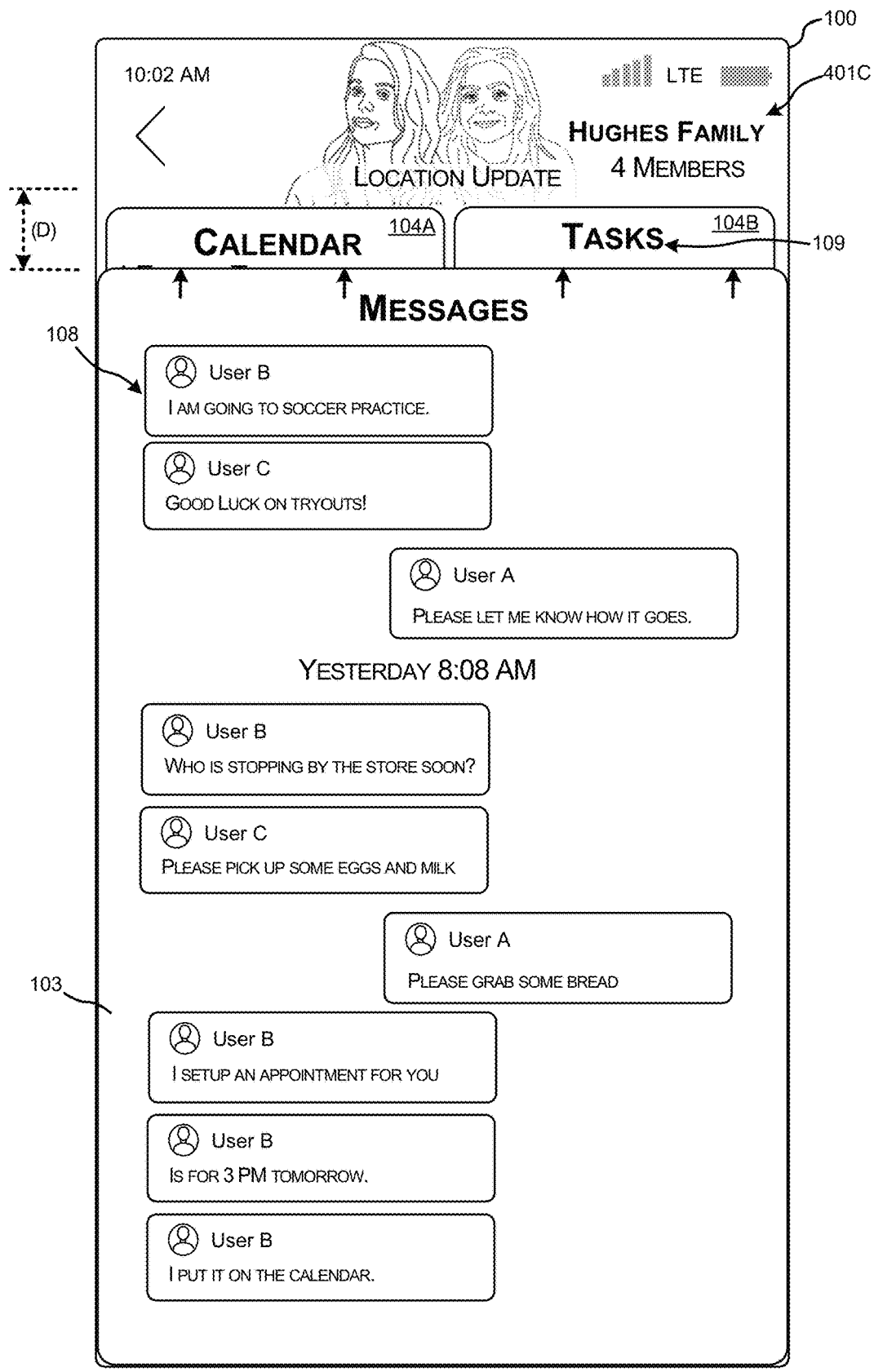
BOUNCE NOTIFICATION  FIGURE 4C  TIME = T₂

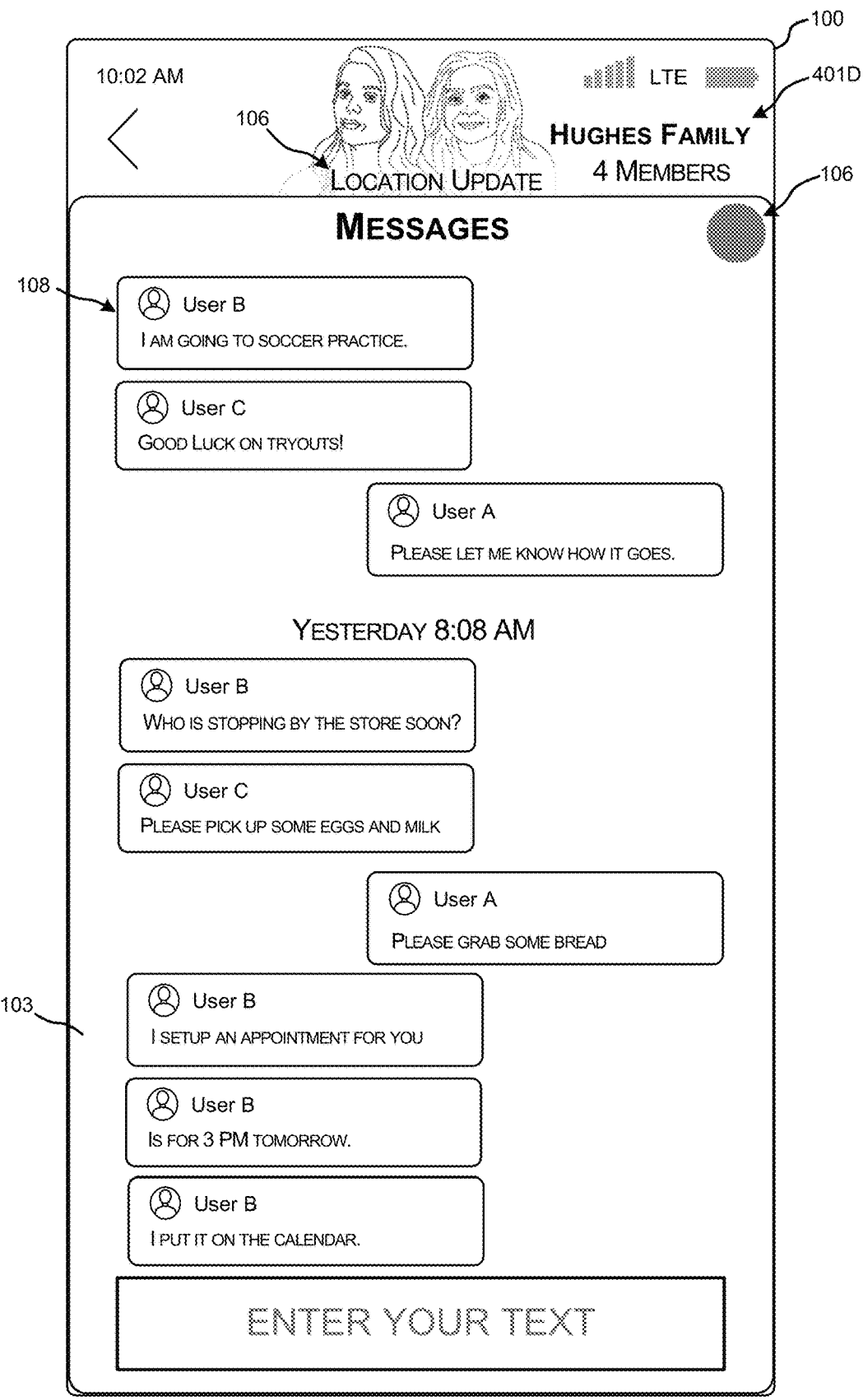
FIGURE 4D     TIME = T₃

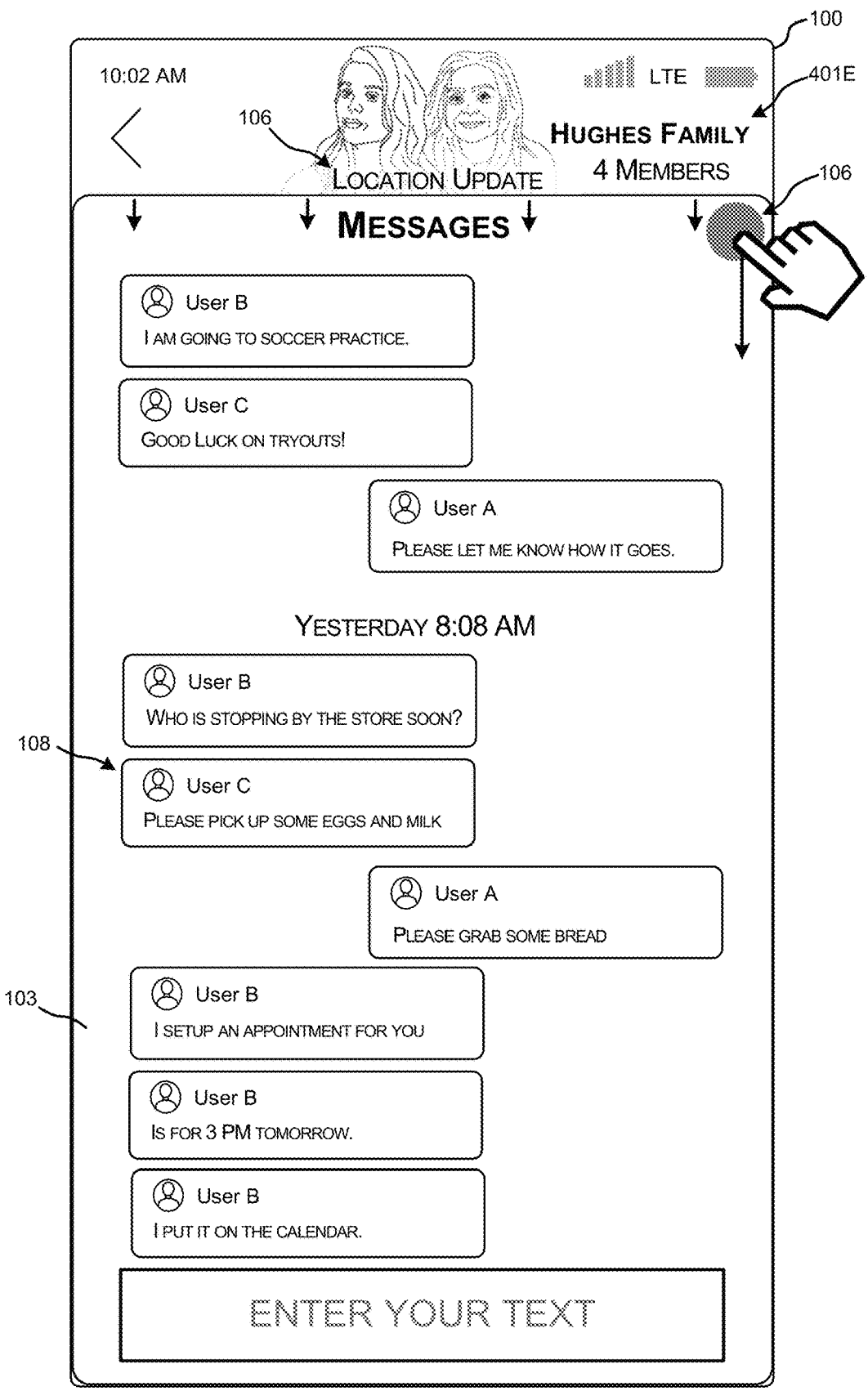
FIGURE 4E  TIME = T₄

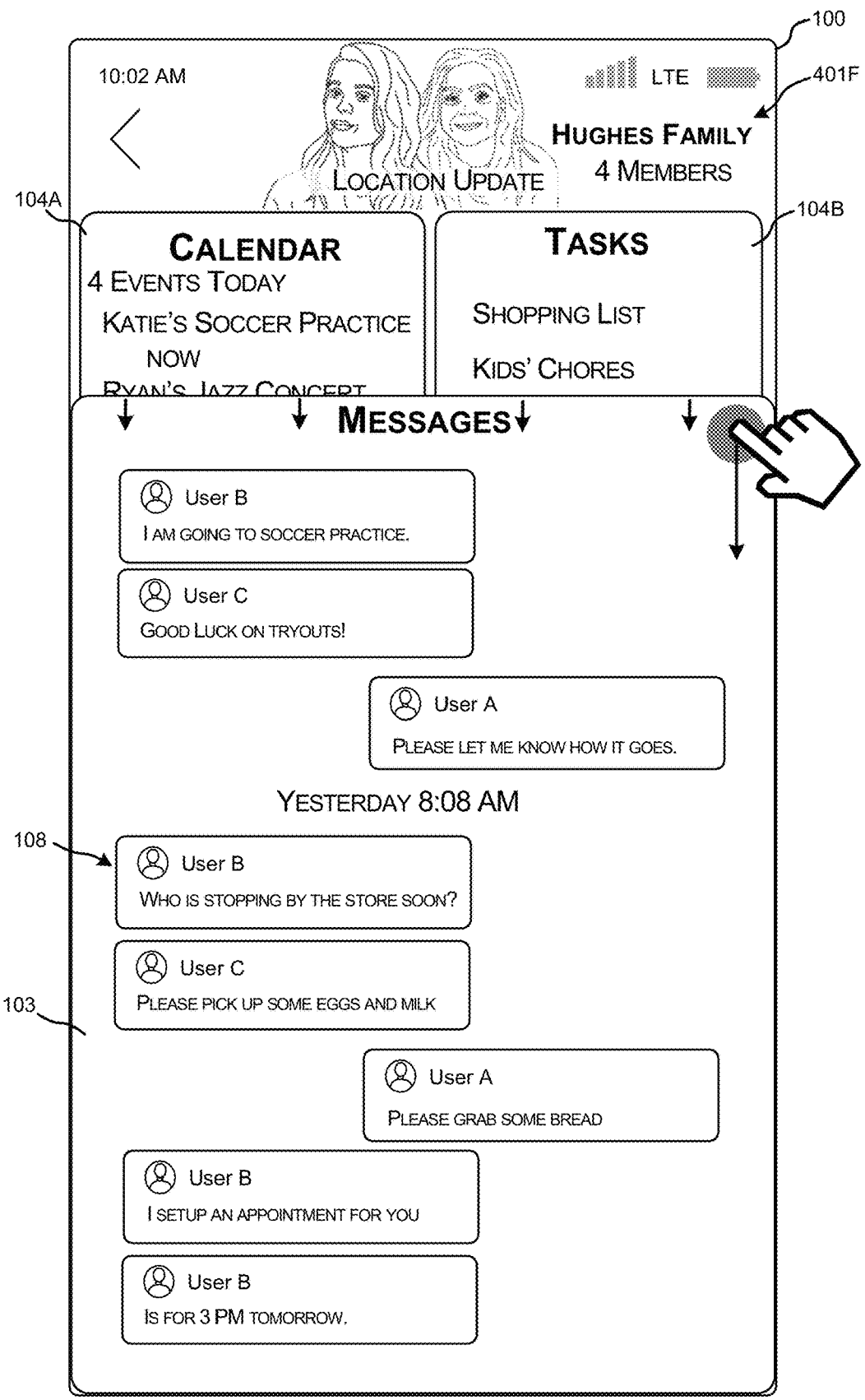
FIGURE 4F   TIME = T₅

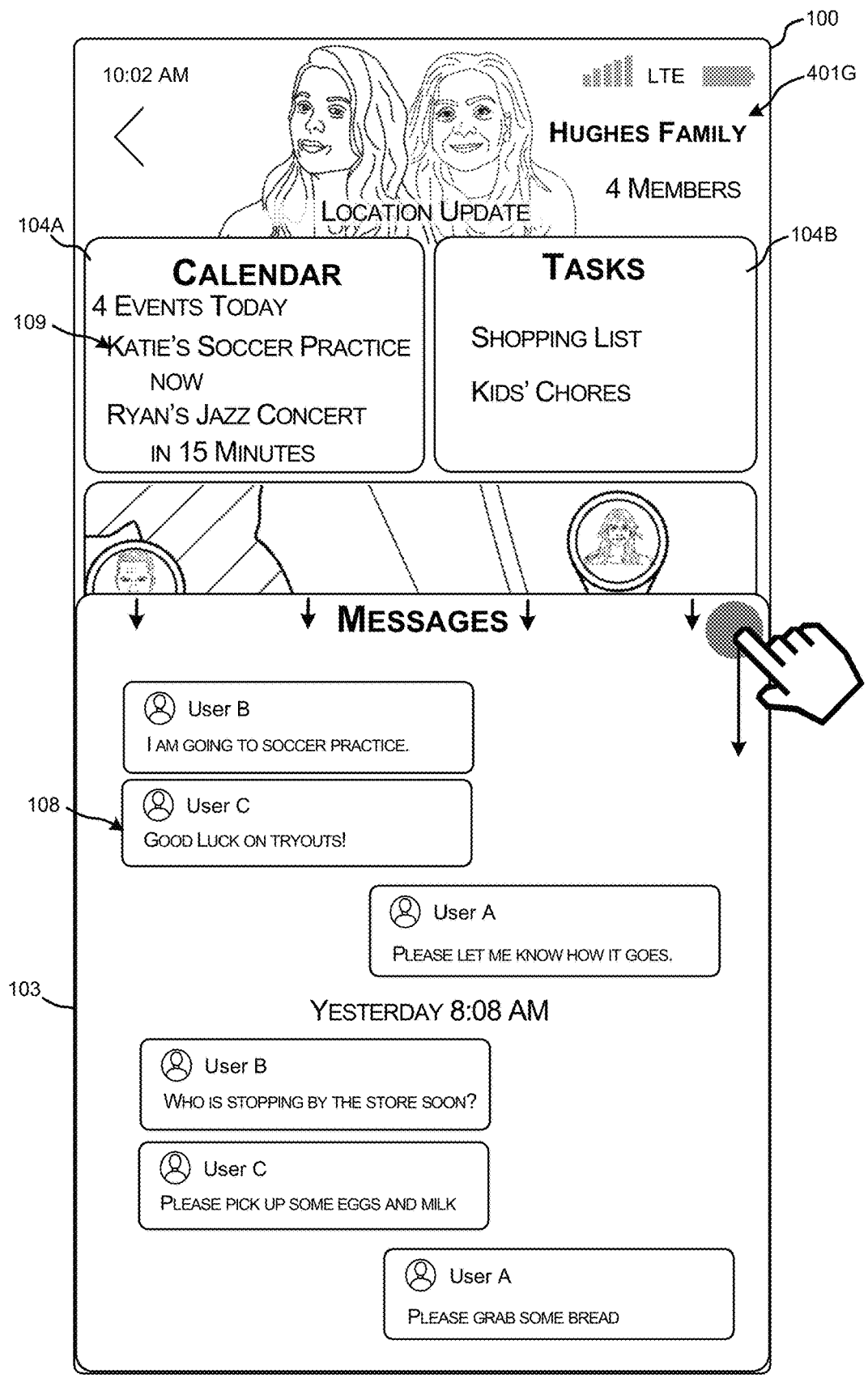
FIGURE 4G  TIME = T6

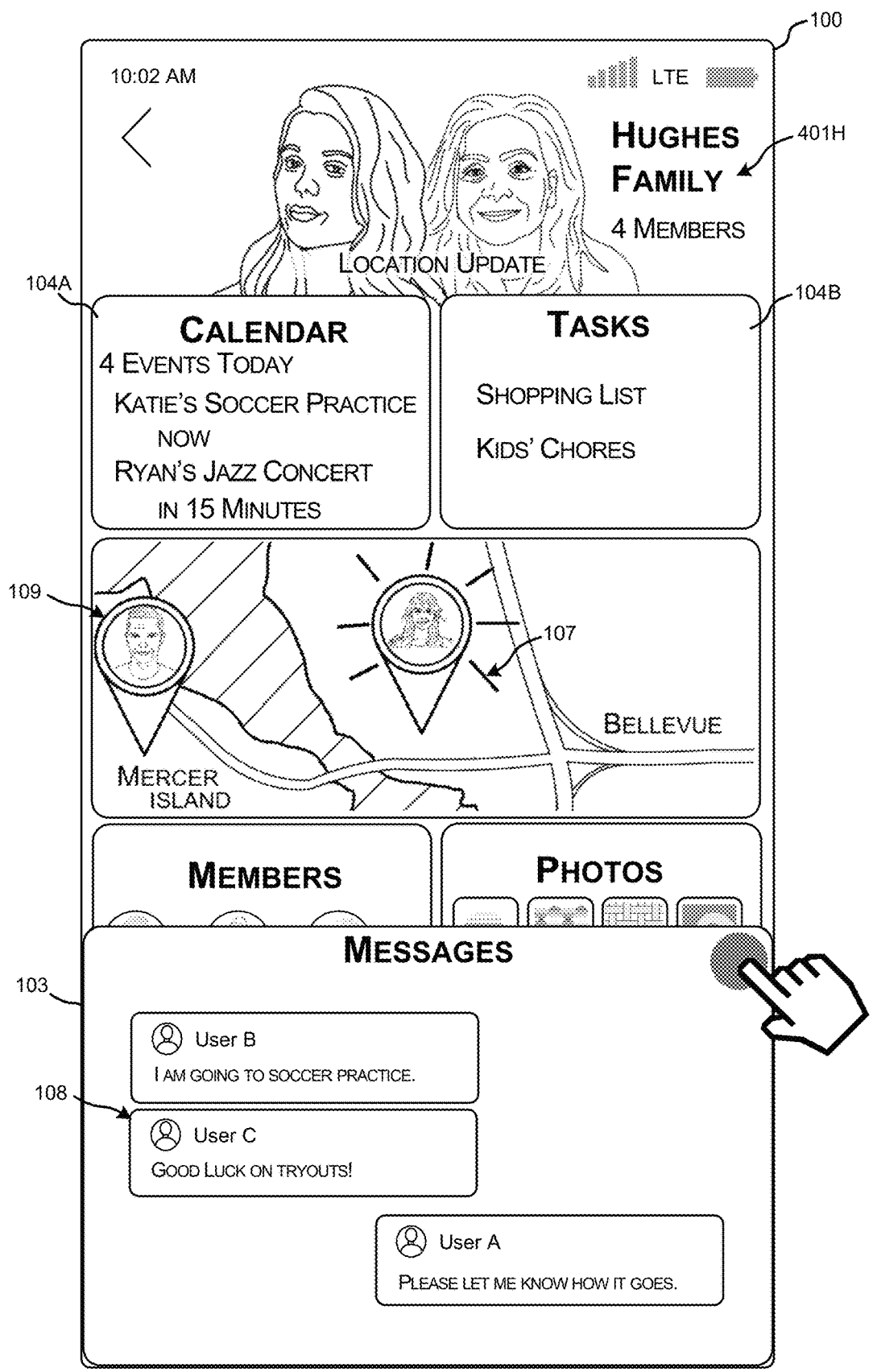
*FIGURE 4H*     TIME = $T_7$

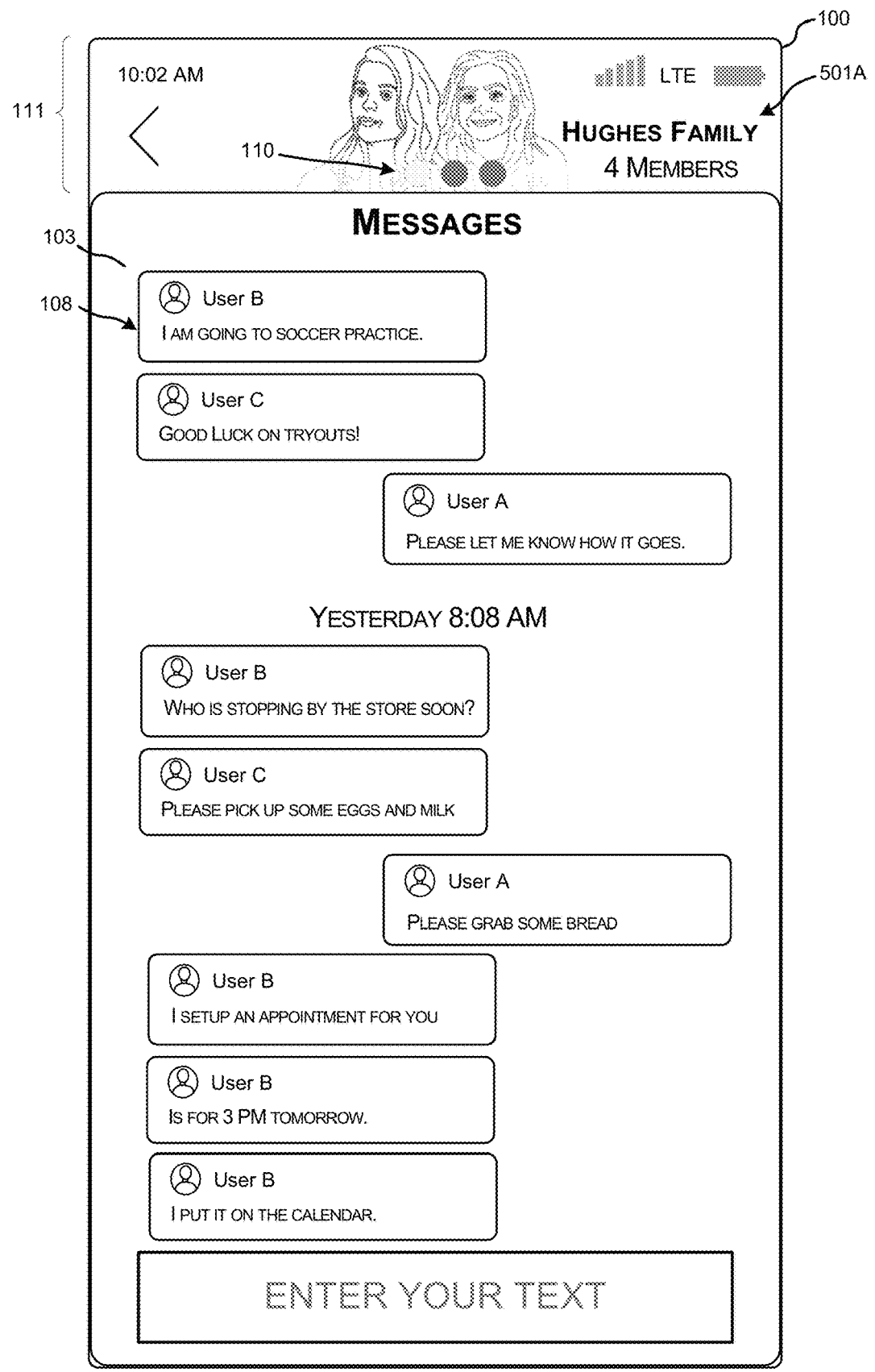
FIGURE 5A  TIME = T₀

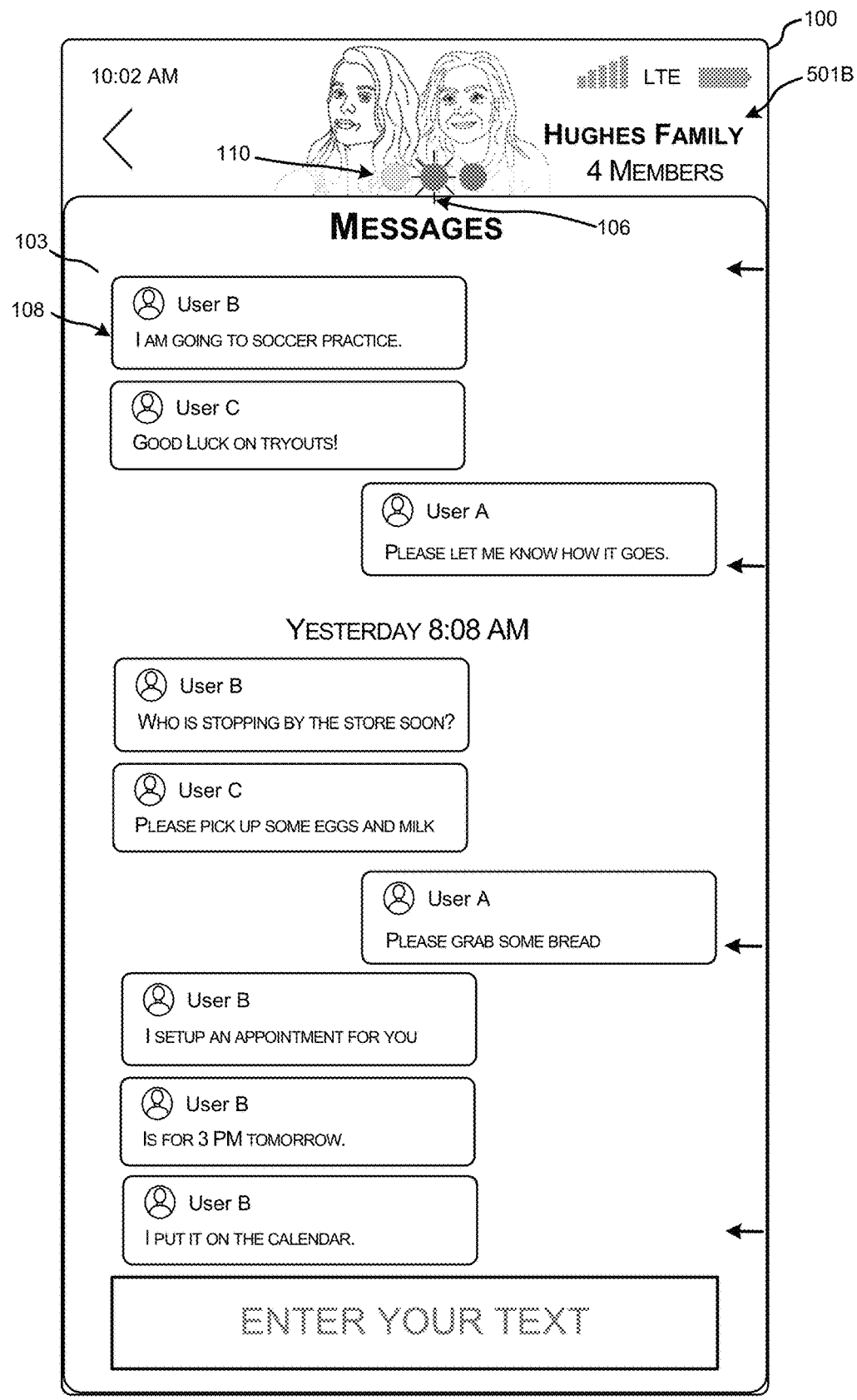
BOUNCE NOTIFICATION     *FIGURE 5B*     TIME = $T_1$

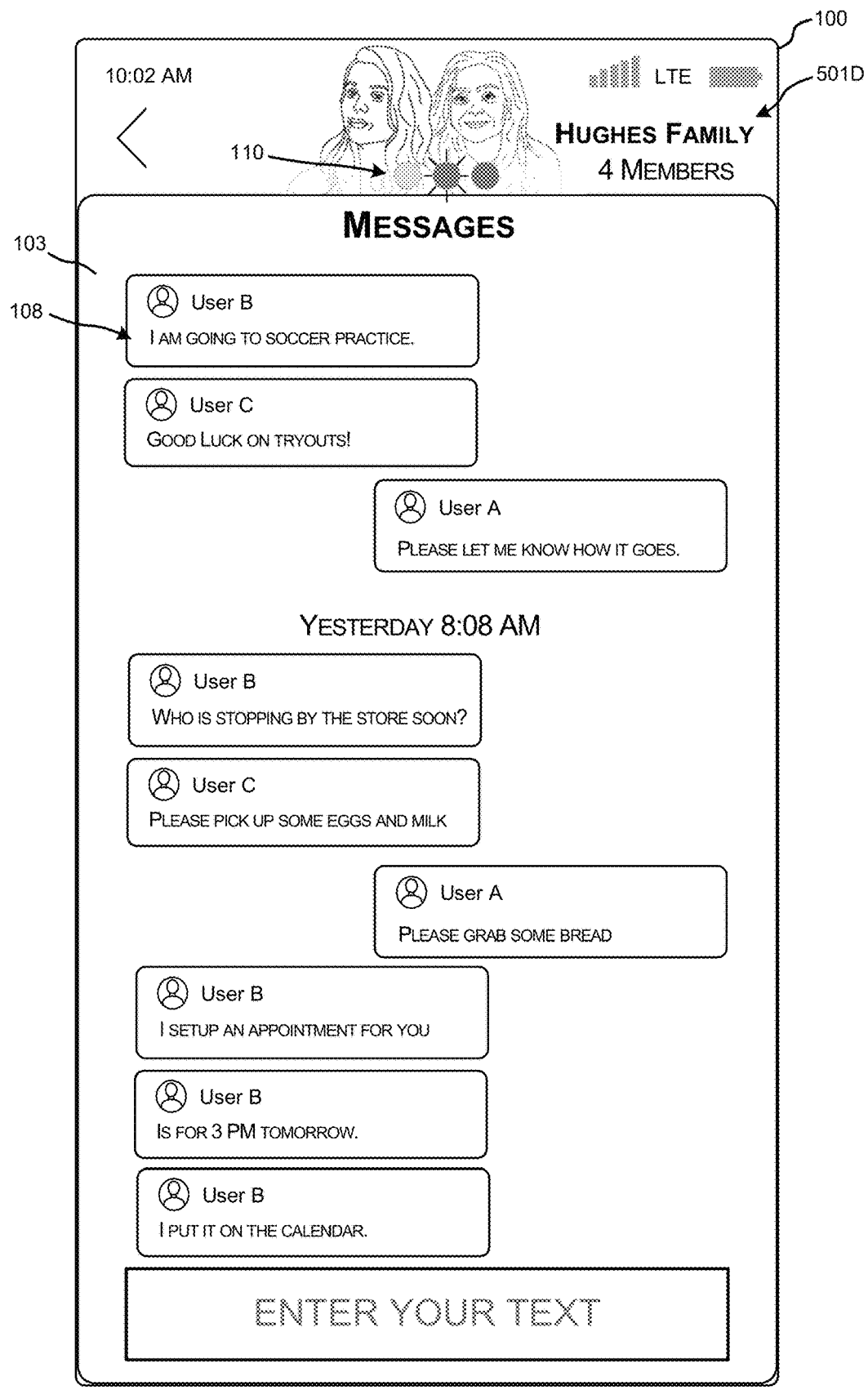
FIGURE 5D  TIME = T₃

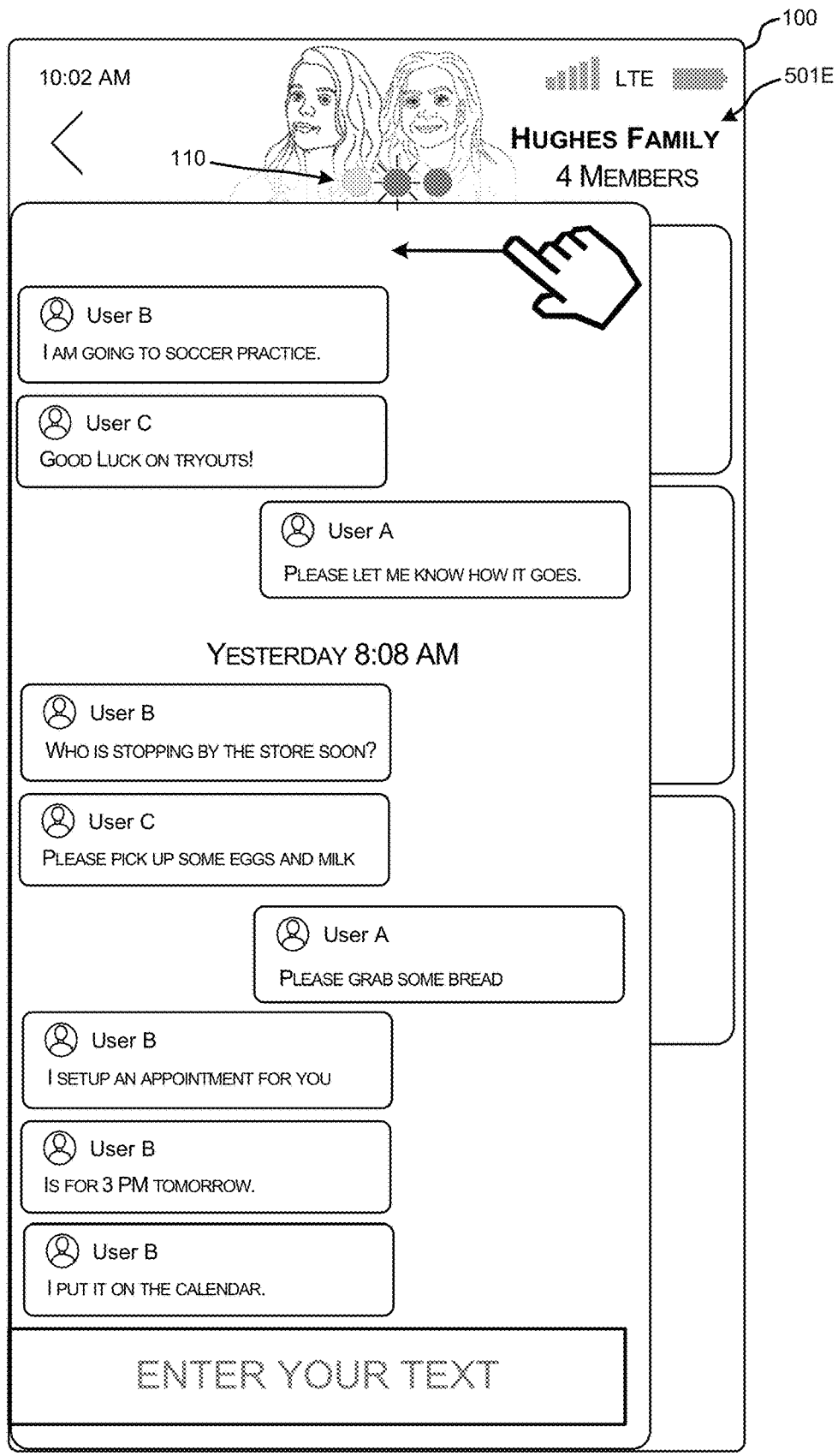
FIGURE 5E    TIME = T₄

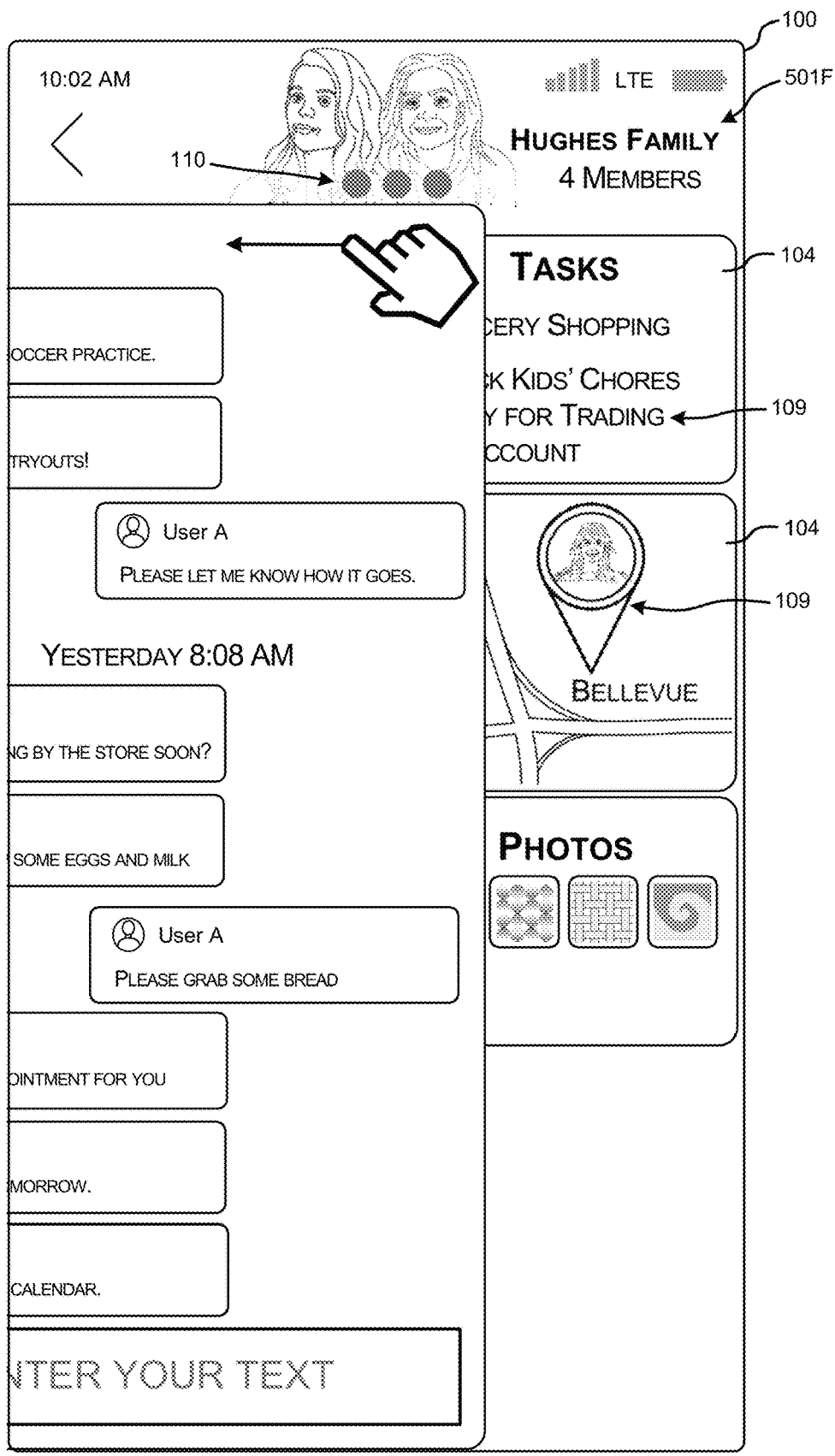
FIGURE 5F  TIME = $T_5$

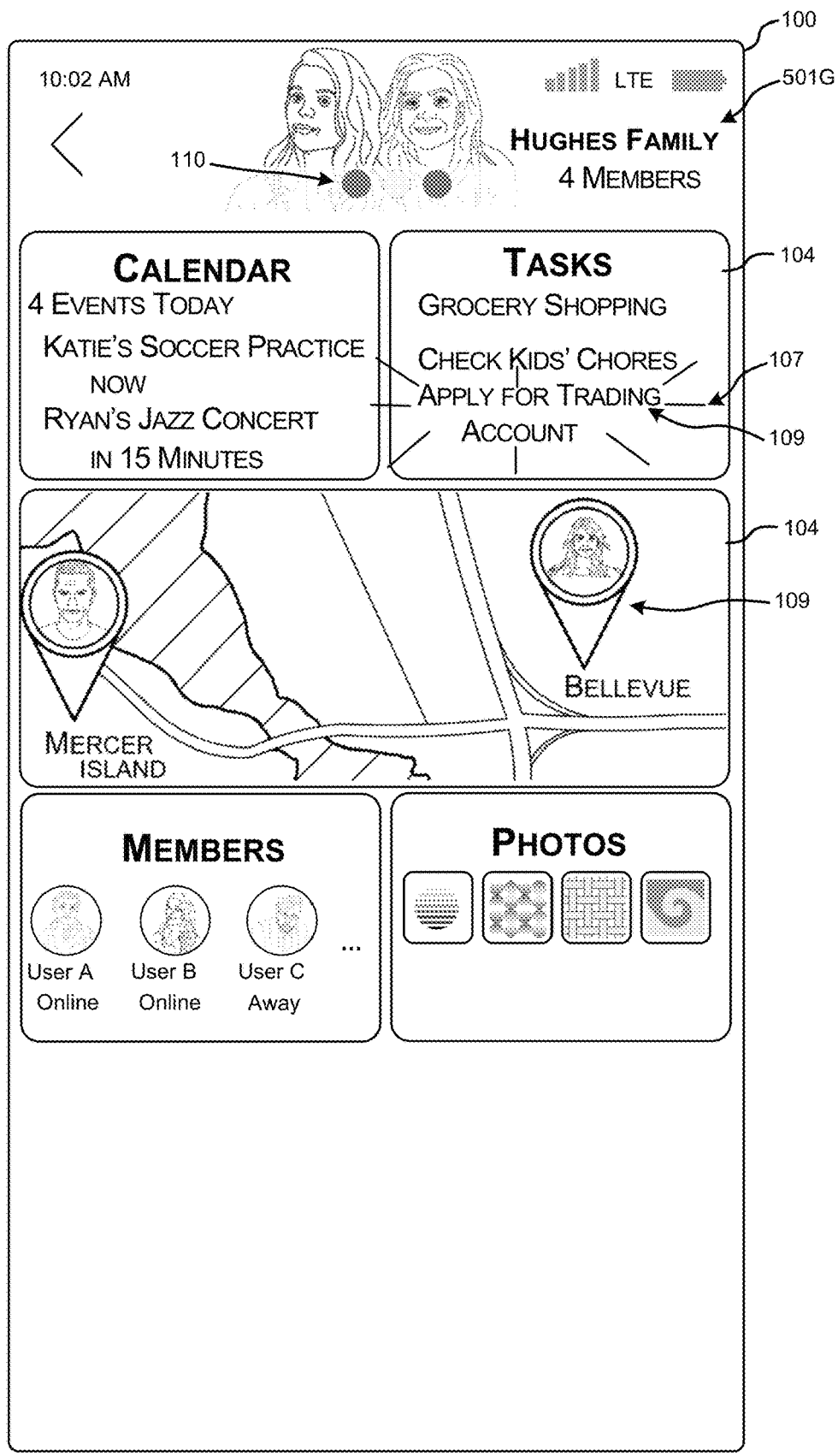
*FIGURE 5G*     TIME = $T_6$

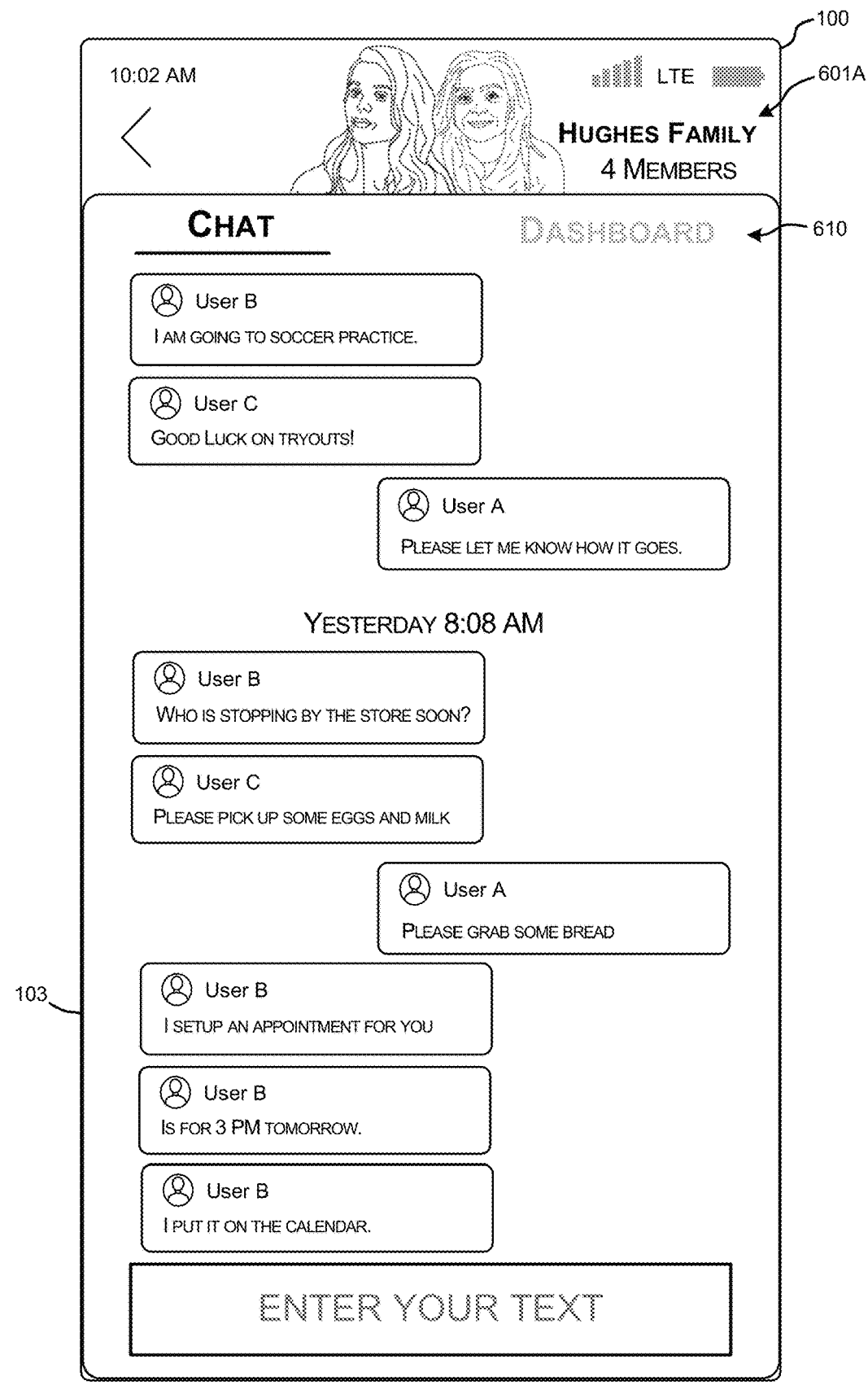
FIGURE 6A   TIME = T₀

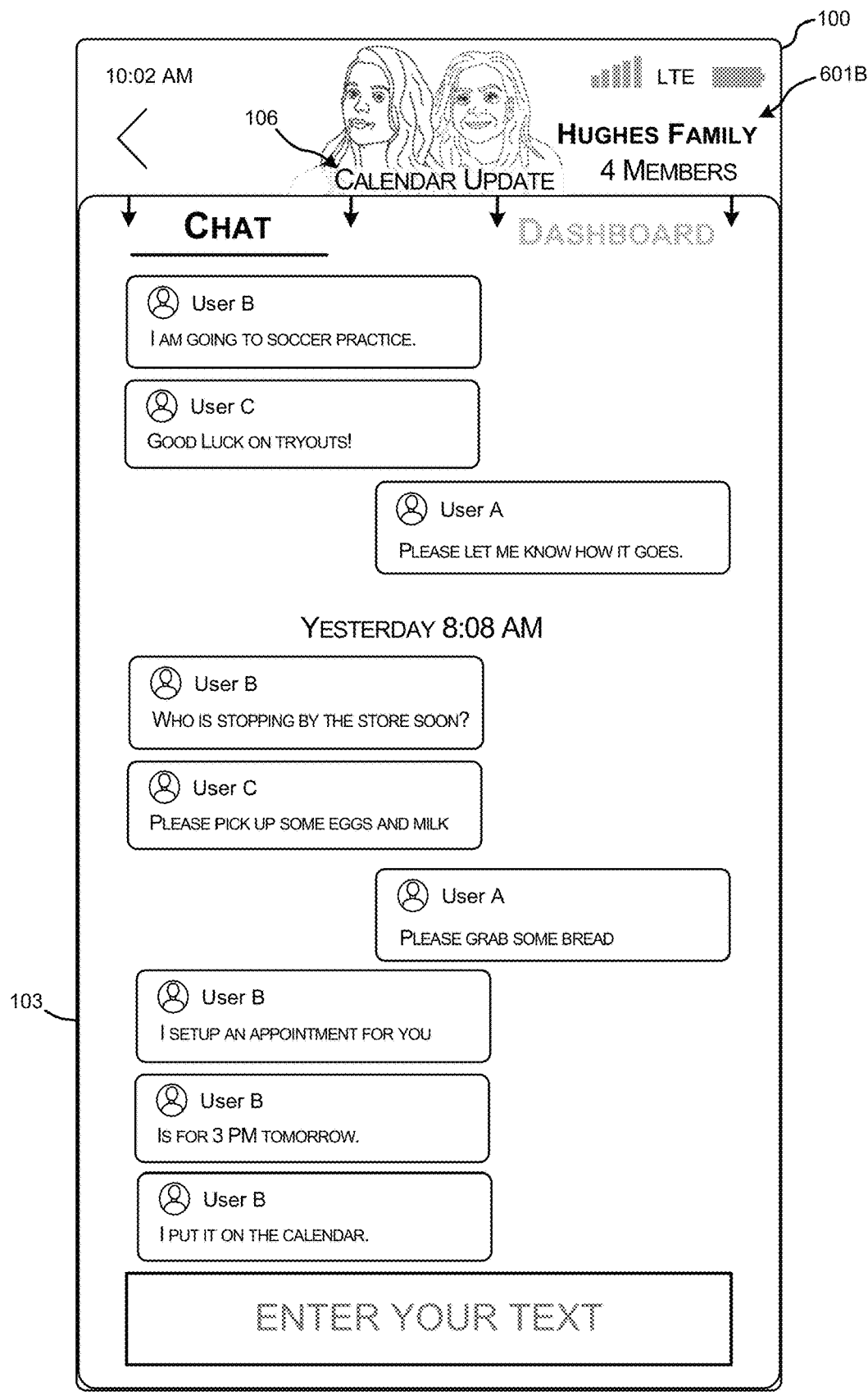
FIGURE 6B  TIME = T₁

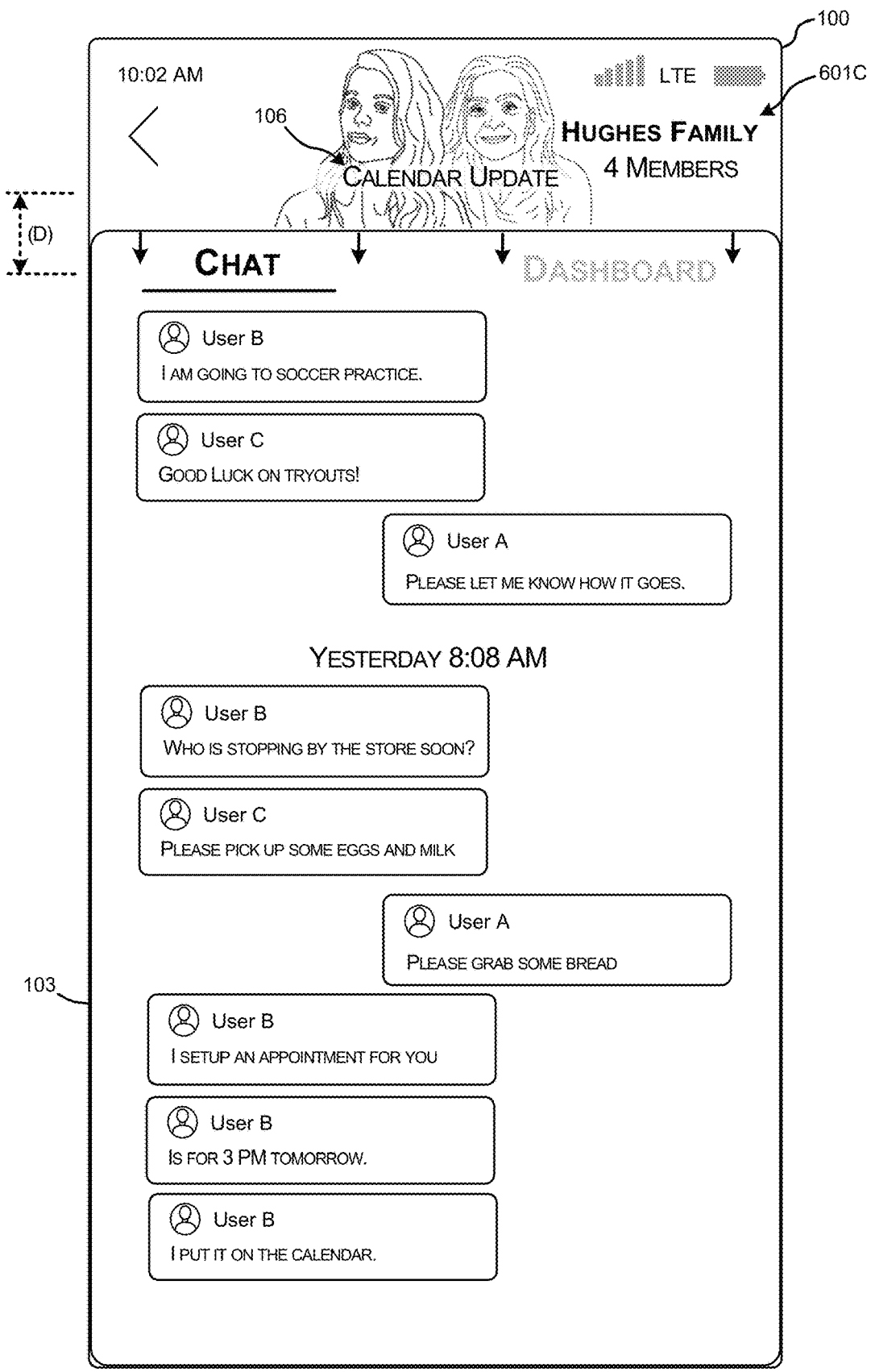
FIGURE 6C    TIME = $T_2$

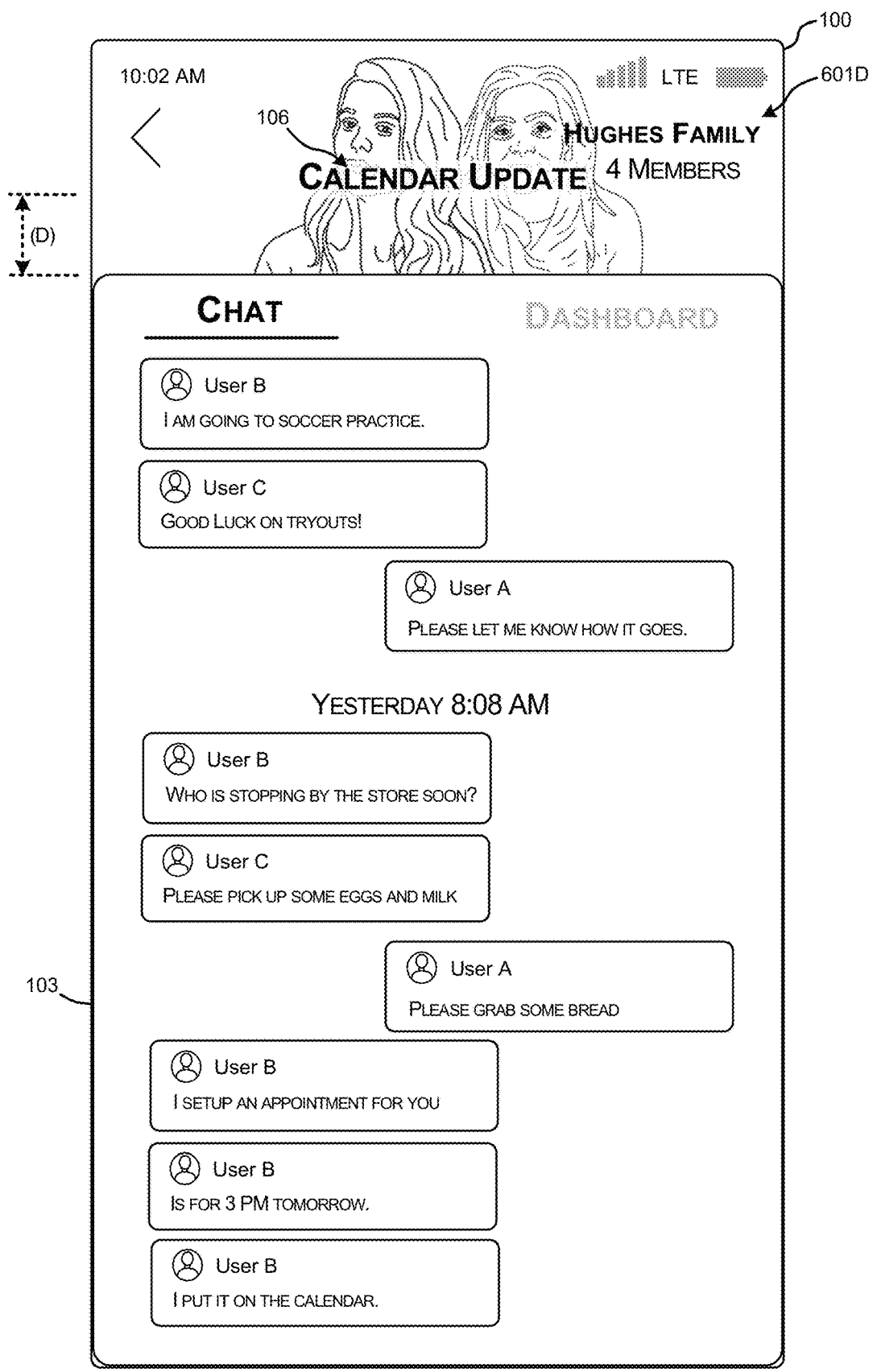
*FIGURE 6D*   TIME = T₃

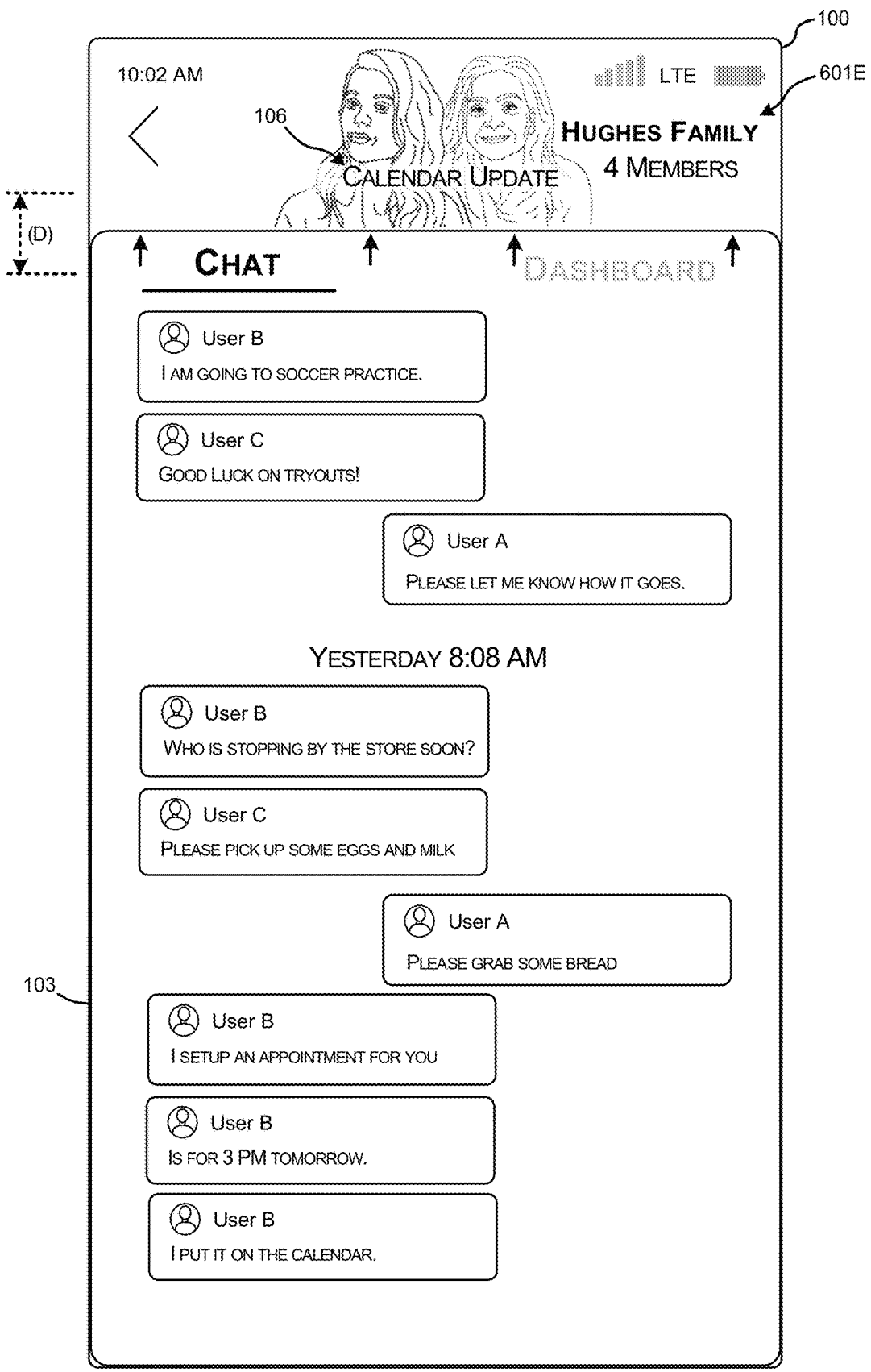
FIGURE 6E     TIME = T₄

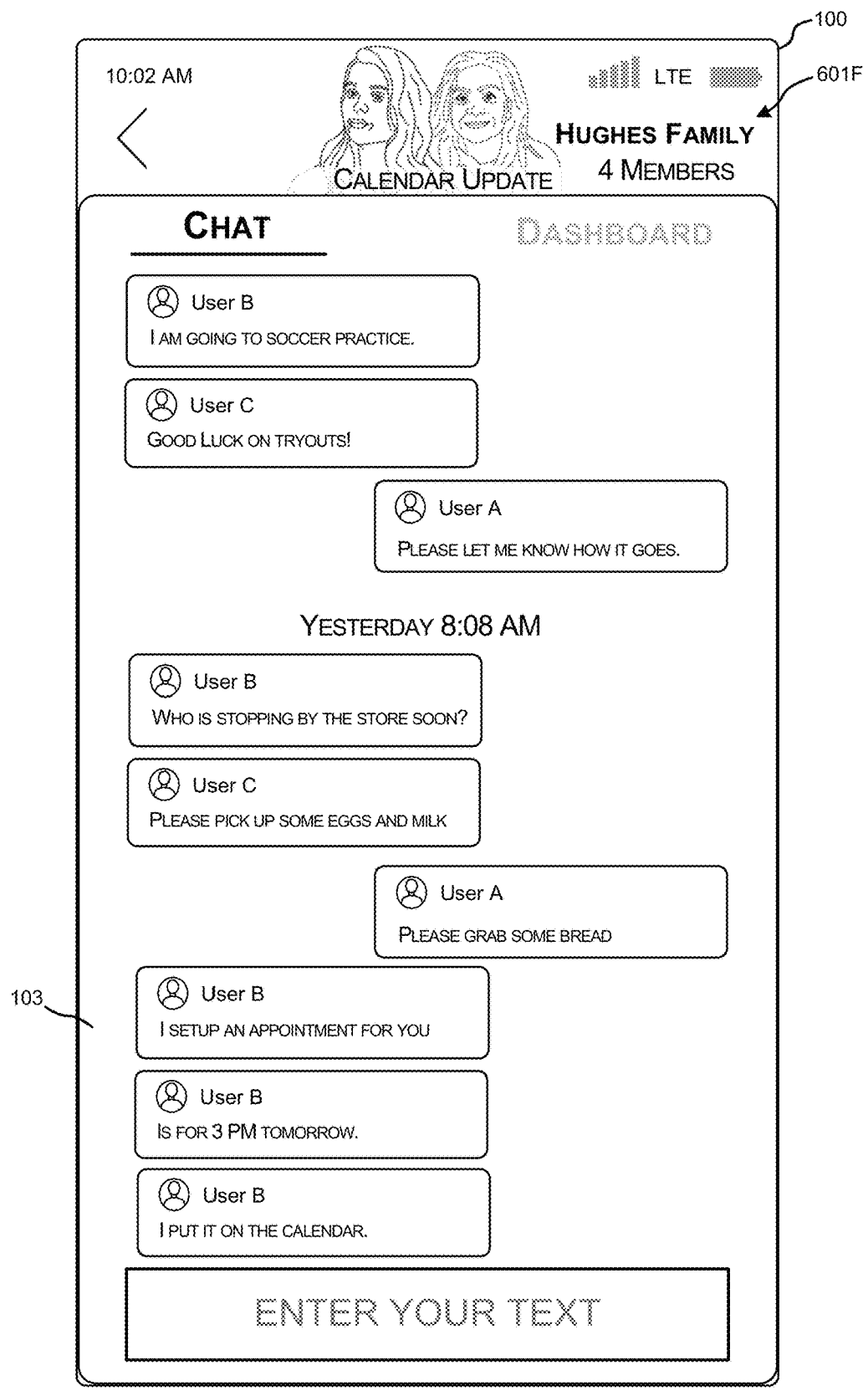
FIGURE 6F  TIME = $T_6$

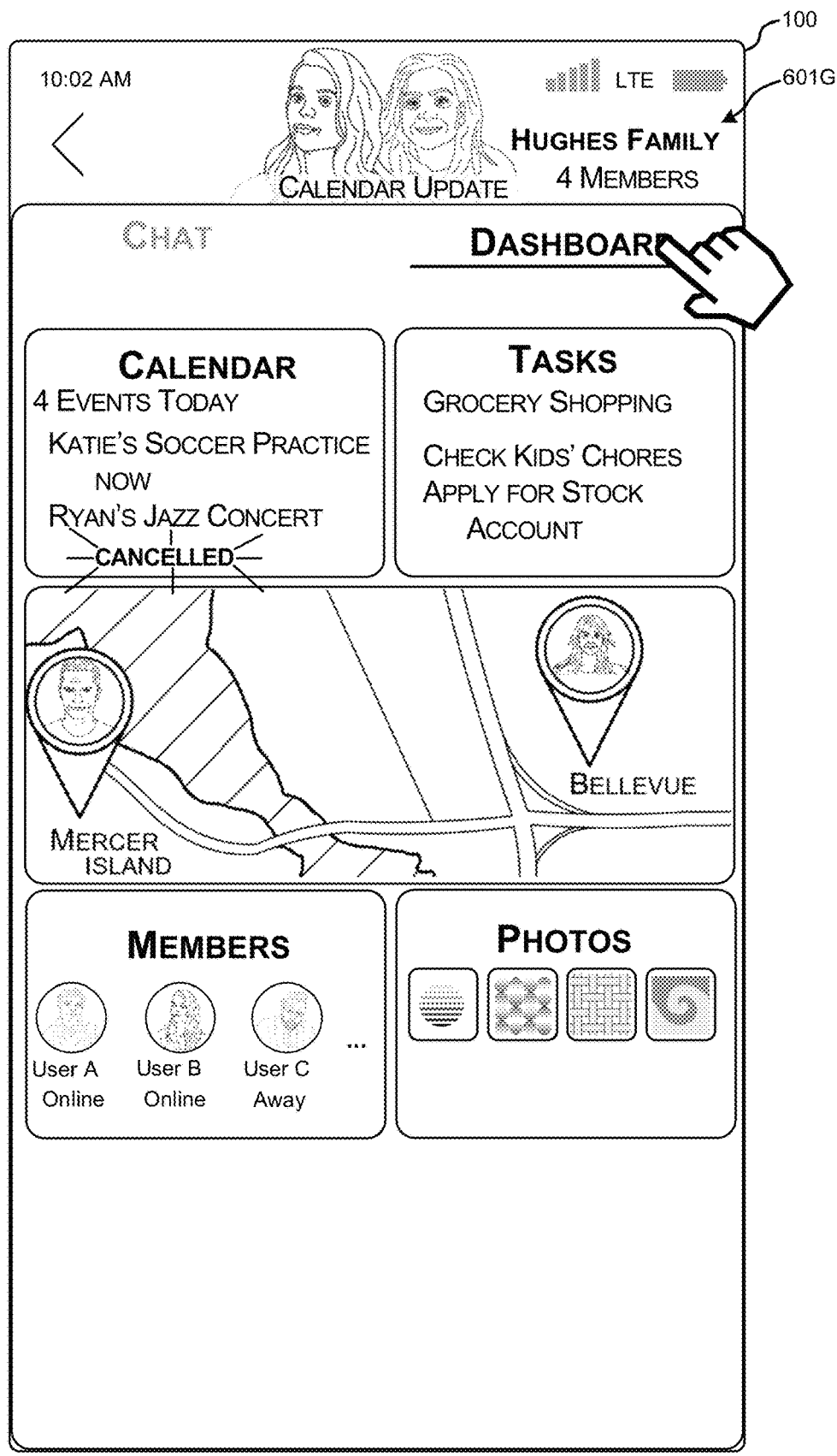
FIGURE 6G     TIME = $T_7$

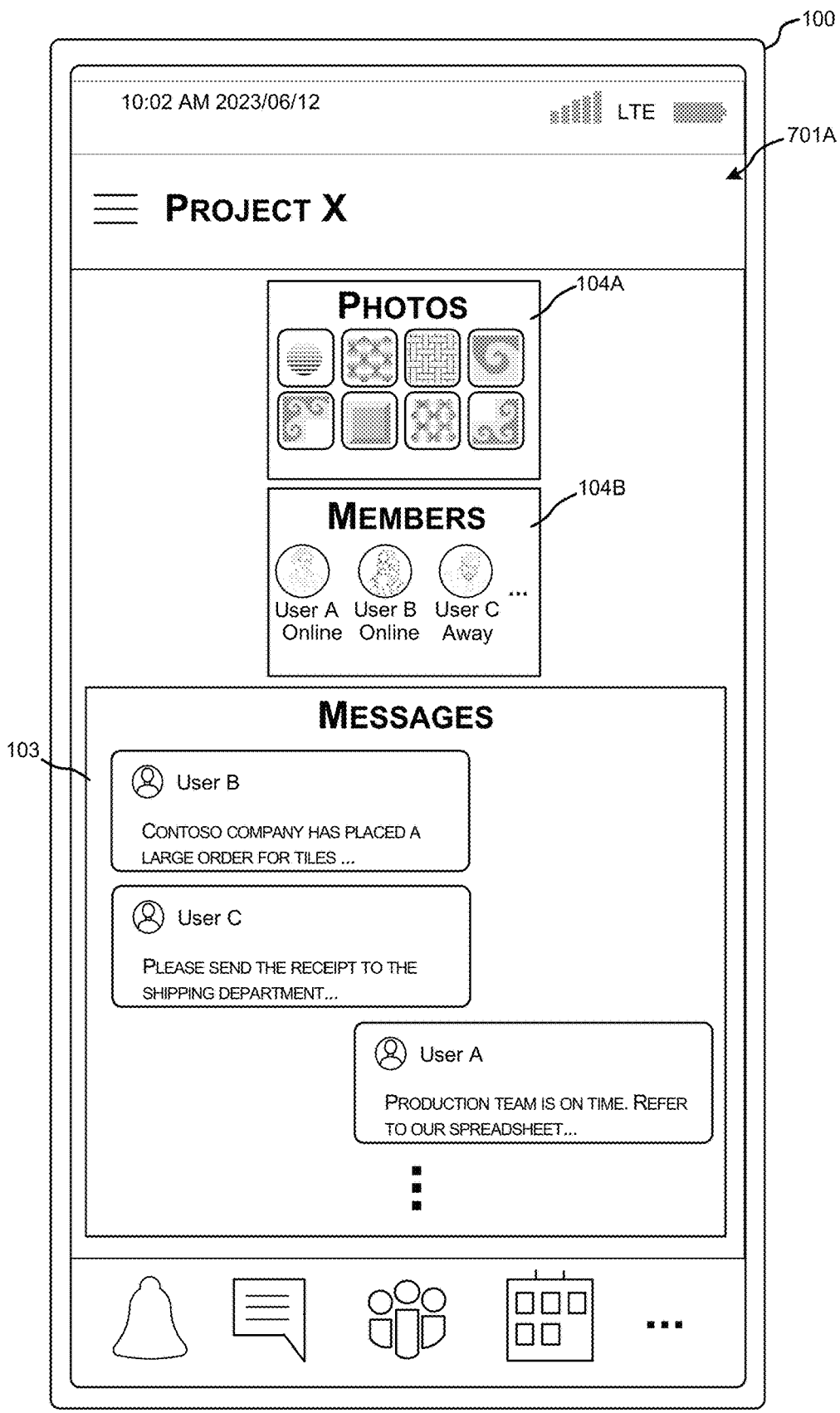
FIGURE 7B  TIME = $T_0$

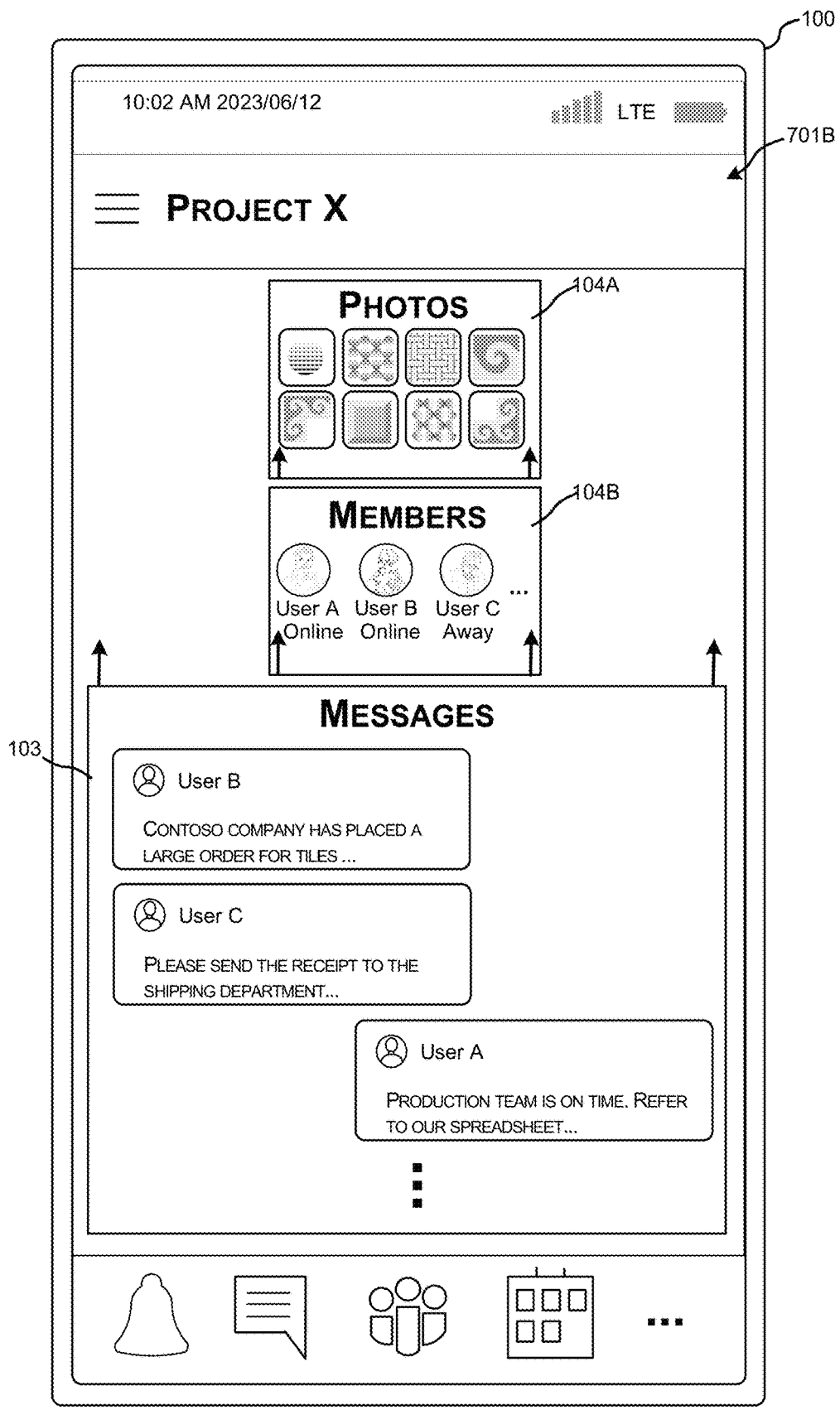
FIGURE 7C  TIME = T₁

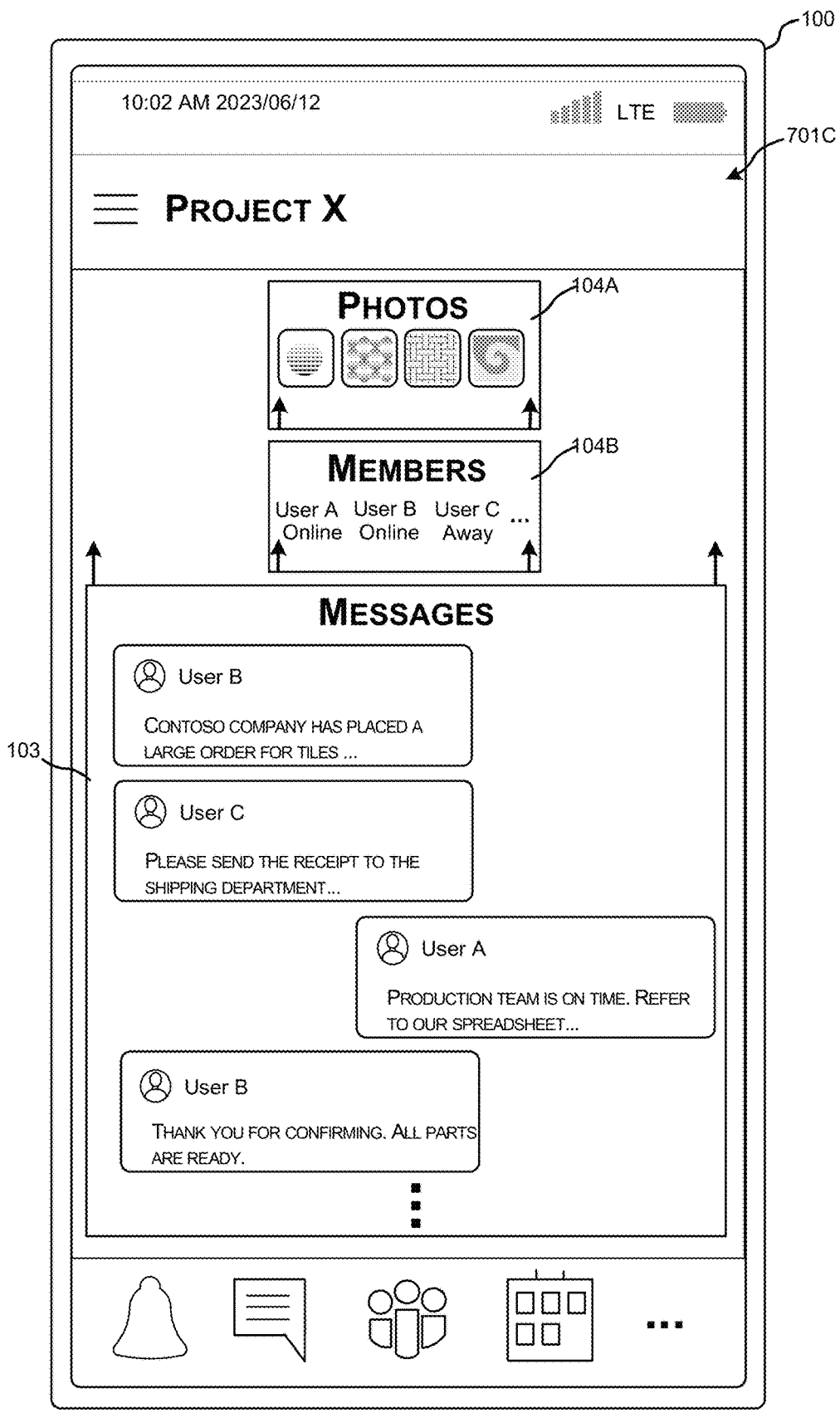
FIGURE 7D  TIME = T₂

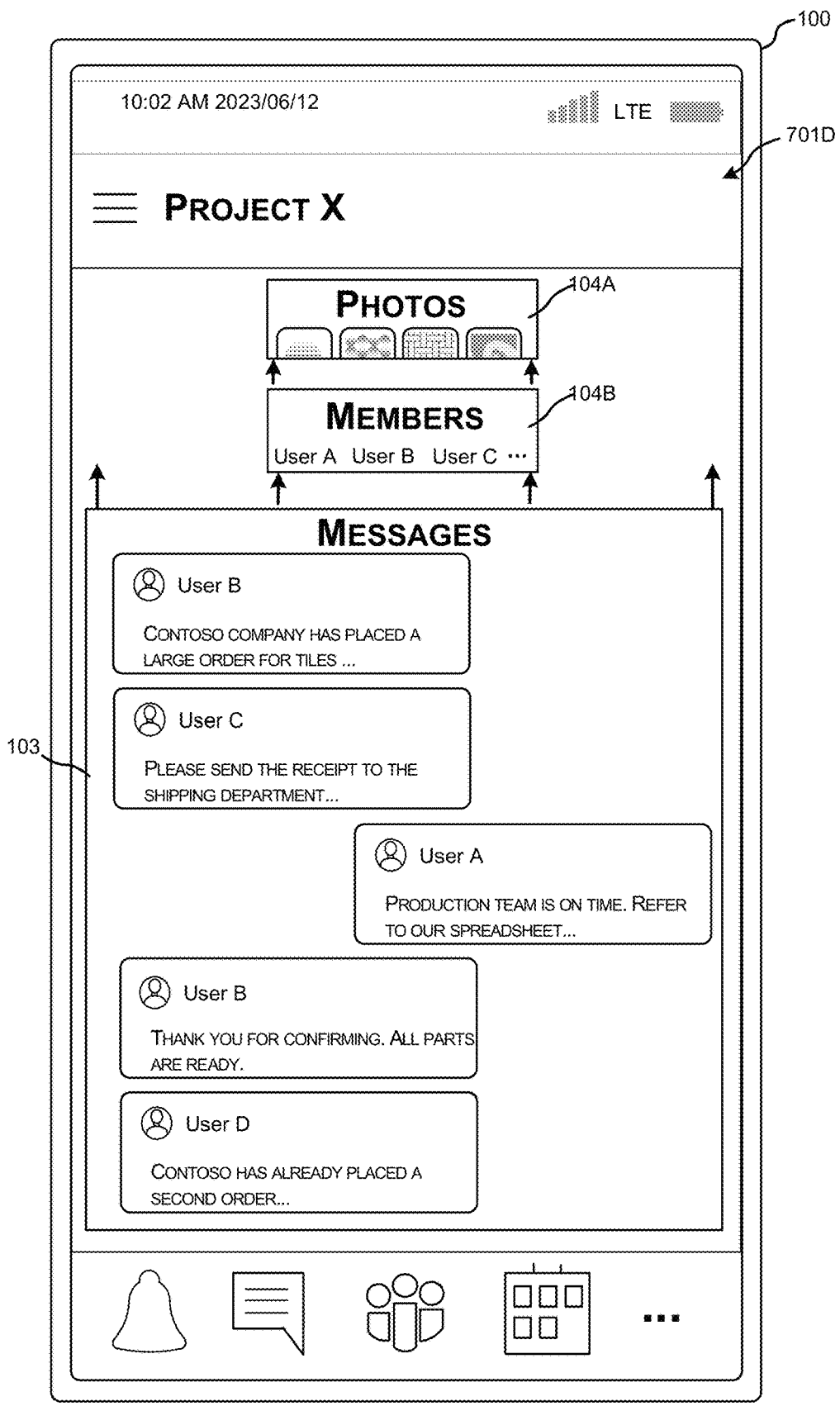
FIGURE 7E          TIME = T₃

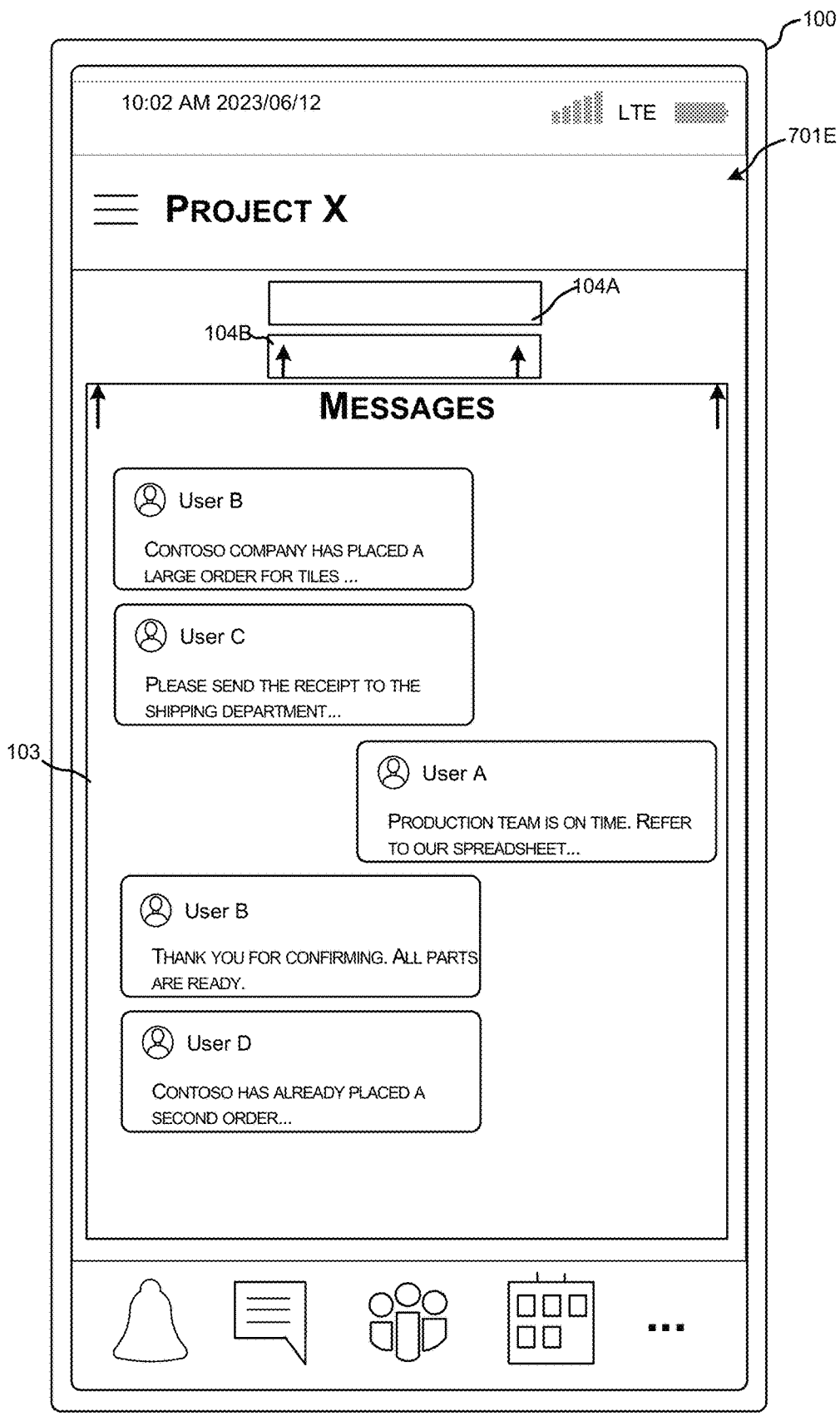
FIGURE 7F     TIME = $T_4$

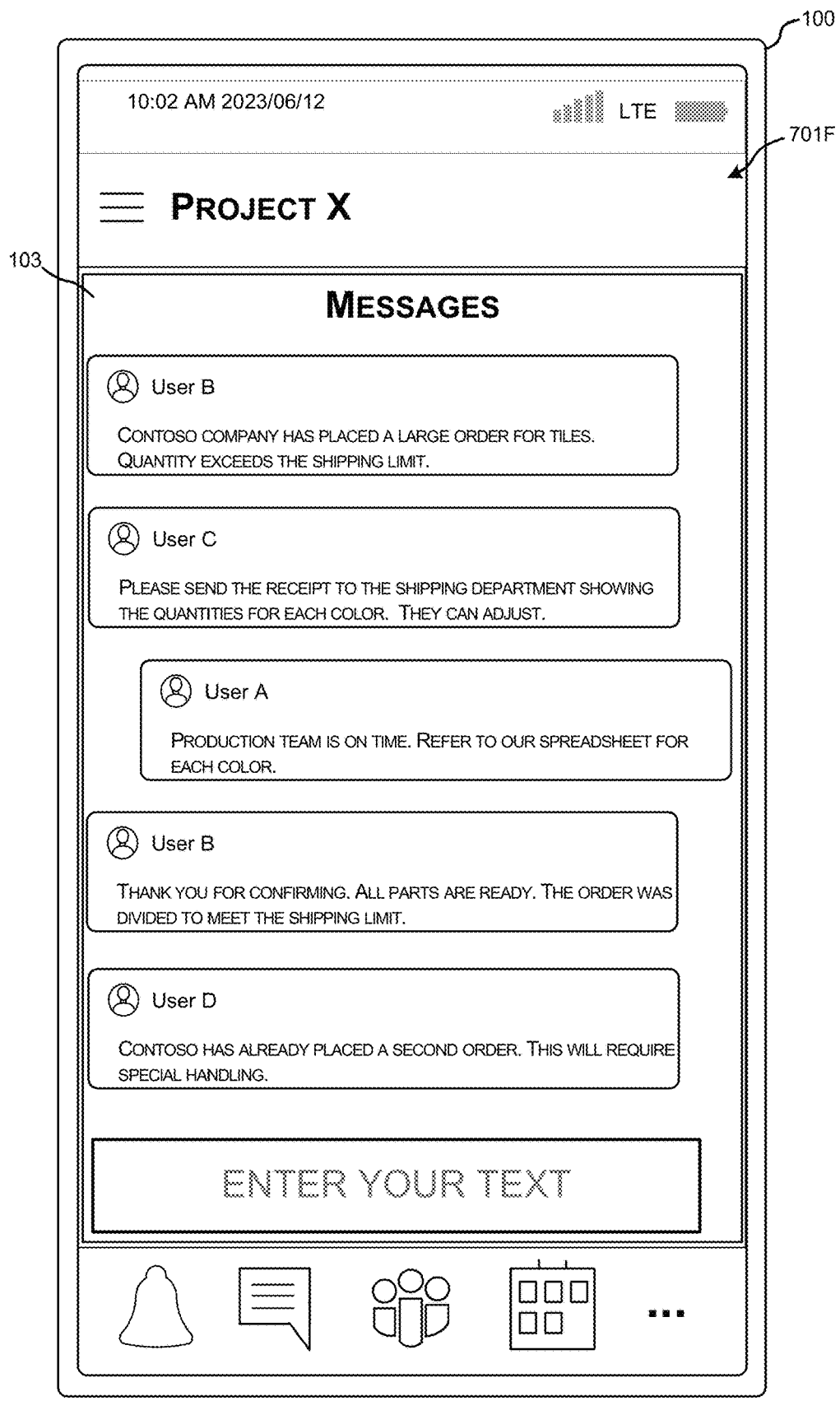
FIGURE 7G  TIME = T₅

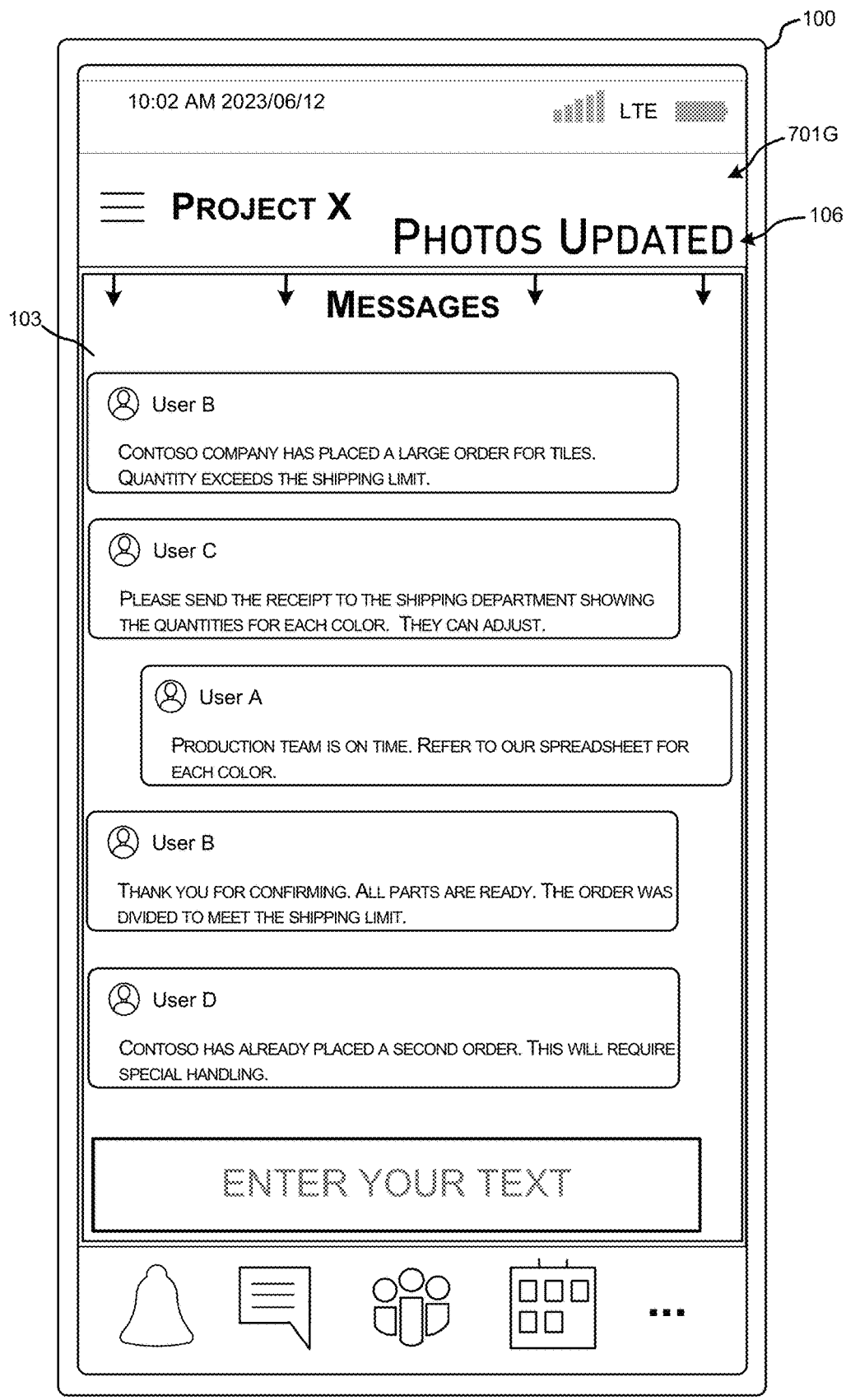
FIGURE 7H  TIME = $T_6$

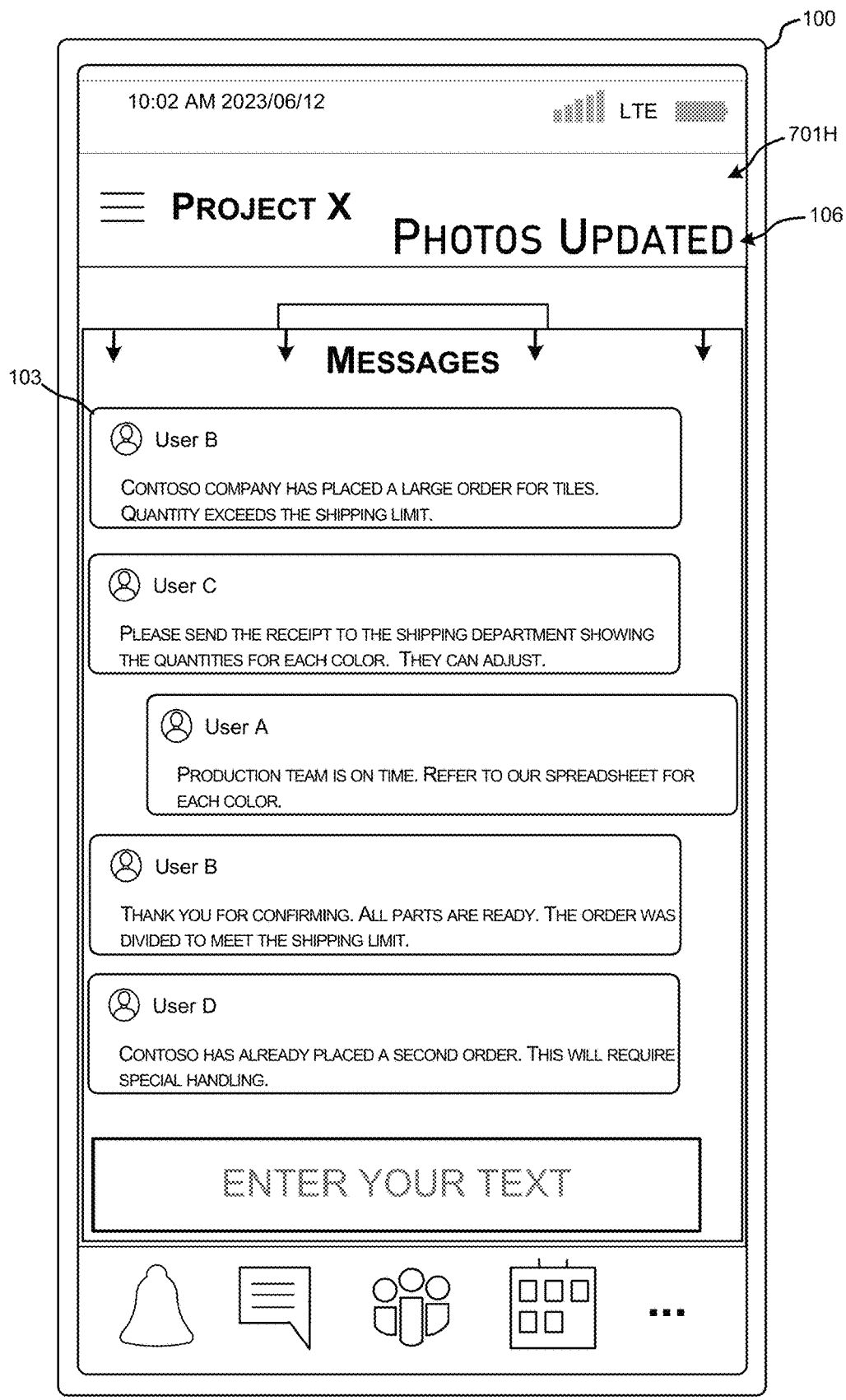
FIGURE 7I     TIME = $T_7$

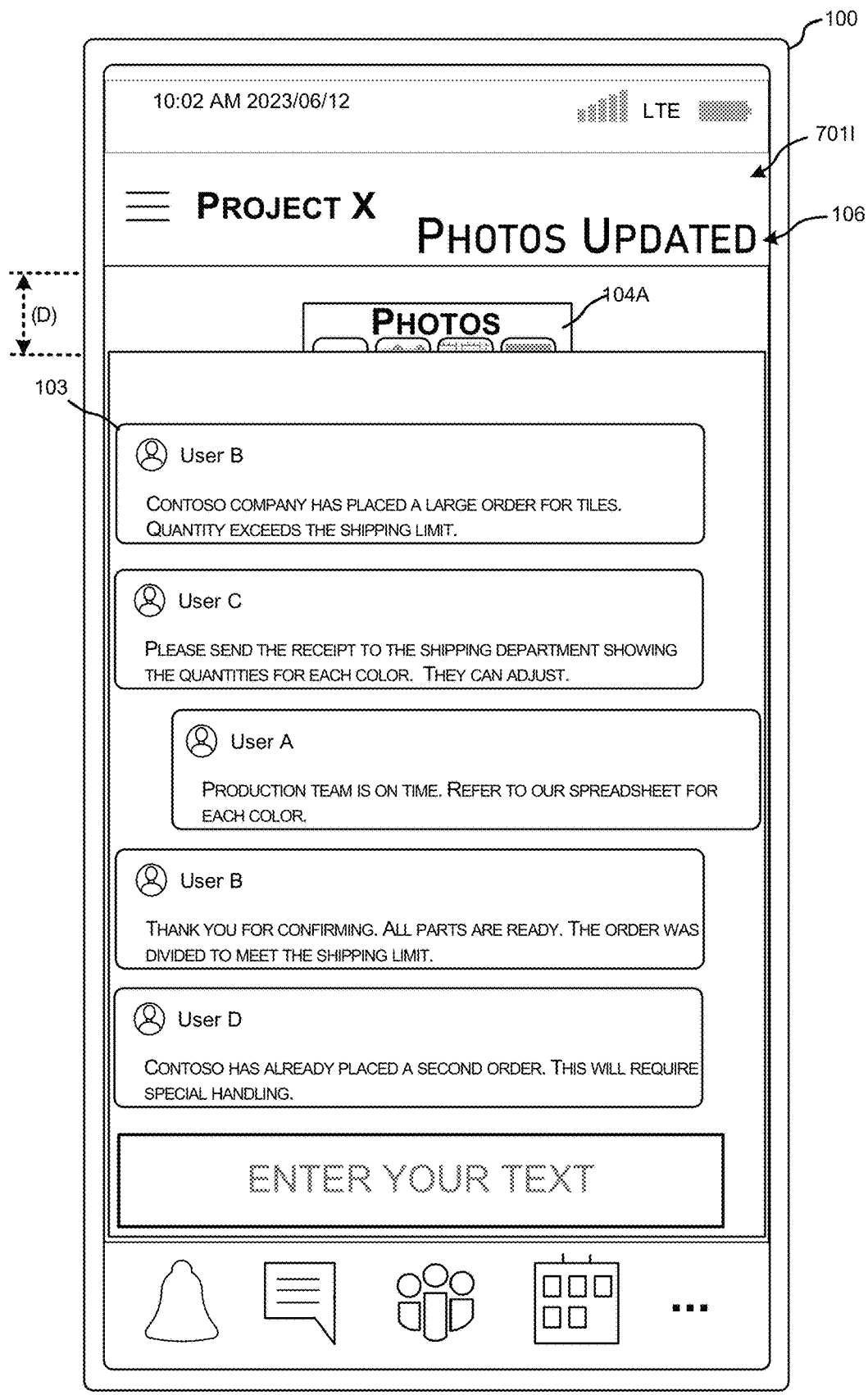
*FIGURE 7J*  TIME = $T_8$

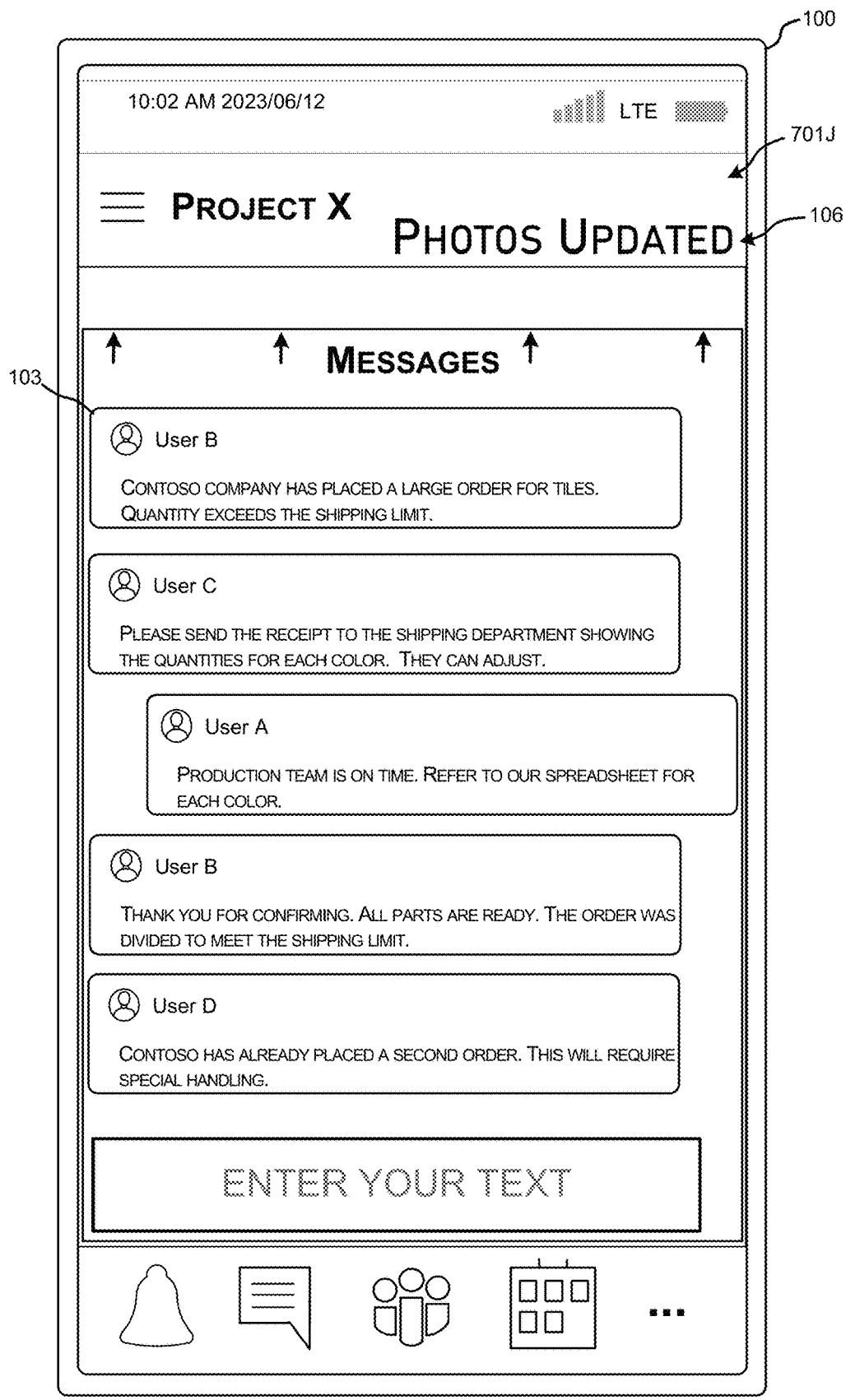
FIGURE 7K  TIME = T₉

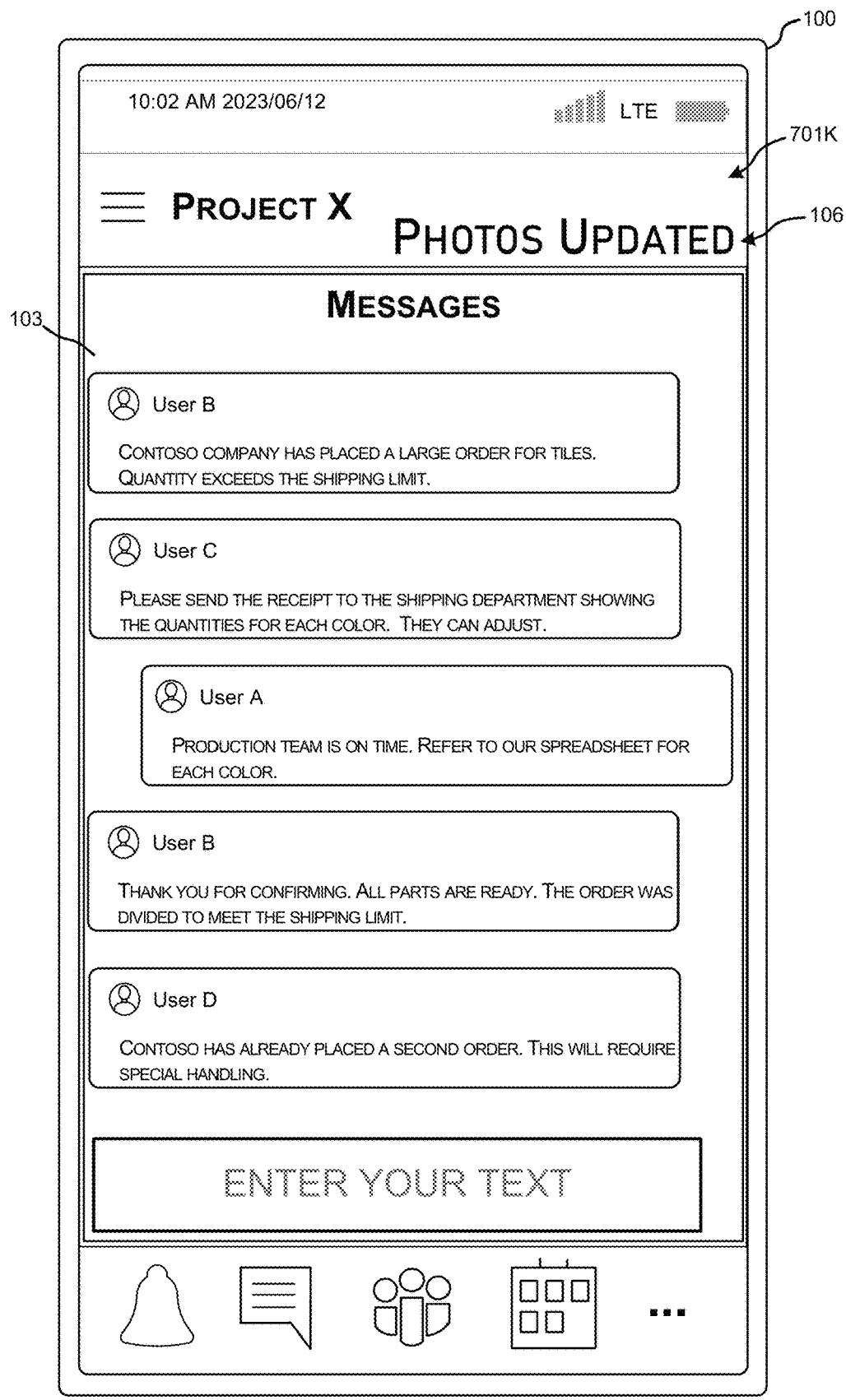
FIGURE 7L    TIME = T₁₀

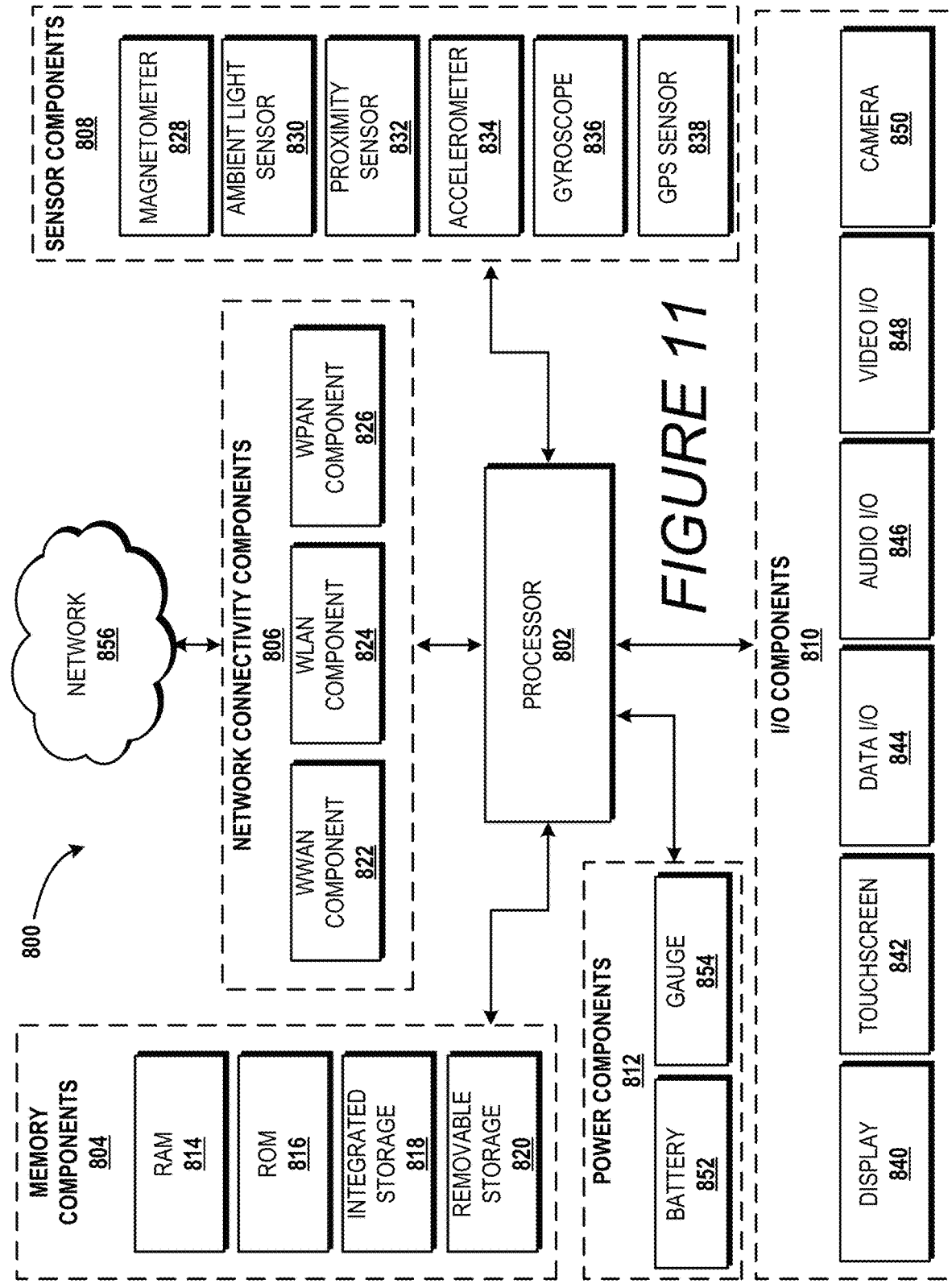

ANIMATED VISUAL CUES INDICATING THE AVAILABILITY OF ASSOCIATED CONTENT

BACKGROUND

There are a number of user interface designs that help users organize and view content. For instance, a home screen of a mobile device may be configured with a multi-page view, where each page shows individual icons associated with individual applications and content. Some devices are configured to only display one page at a time. Users navigate between the pages by providing a user input, such as a swipe gesture. Some devices display a visual indicator, such multi-dot graphical element, to guide users as they navigate between each page. In addition, some user interface designs provide notifications when new content becomes available. For example, a text notification may appear to let a person know that an email was received. In another example, an application icon may also display a number or other insignia indicating a number of unread emails, text messages, etc.

Although existing user interface designs have improved over time, some existing systems still have a number of shortcomings. For example, although the multi-dot graphical element can be used to indicate the availability of additional pages of a user interface, this feature does not provide any type of context regarding the available content. A user may be required to navigate through a number of pages to check the status indicators of certain applications. This process can unnecessarily consume a number of computing resources and also create a number of inefficiencies for a user, as it requires a person to periodically check for updates which may or may not exist. In addition, although text notifications of existing operating systems can notify a person of incoming data, such as a new text message or email, this type of notification to be intrusive and interrupt a person's workflow, as such notifications can cover salient content. These traditional notifications are often disabled because some users deem them as intrusive and inefficient. In this scenario, even if the notifications are intermittently disabled, the value of such notification features is devalued greatly.

SUMMARY

The disclosed techniques enable systems to generate animated visual cues for providing previews that indicate the availability of associated content. A system can display a landing page for initiating a display of selected content. The landing page can also generate a visual cue that provides a preview of additional layers of associated content. For example, when a device initiates a view of selected content, such as messages of a chat session, the landing page may display an animated preview of files related to the chat session before transitioning to a chat session UI. The preview can provide a glimpse of data that is related to the selected content. For instance, if the selected content includes a number of chat messages, the system can display the chat messages along with a glimpse of associated content, e.g., images, tasks, calendar events, membership data, or any other content pertaining to the chat messages. Once the preview is displayed, the landing page can transition to a second user interface arrangement that covers or obscures the display of the associated content. The second user interface arrangement may be dedicated to exclusively display the selected content, thus allowing the user to fully utilize a display screen to view and edit the selected content. The second user interface arrangement may also display a dynamically activated user interface element, e.g., which may be in the form of a multi-dot element, that indicates the availability of the associated content.

In some embodiments, the techniques disclosed herein provide a hierarchical user interface (UI) structure that provides animated visual cues indicating the availability of associated content. In such embodiments, a system provides multiple user interface layers each containing individual sets of content. When a first set of content is selected for display in a first UI layer, a system can monitor the content displayed on the other UI layers that are hidden behind the first UI layer. When the monitored content satisfies one or more criteria, e.g., receives an update and/or is or becomes related to the displayed content, the system can generate an animation to give the appearance that the hidden content is reaching around the displayed content of the first UI layer. In some configurations, when the system detects that hidden content satisfies one or more criteria, the first set of content displayed in a first UI layer moves using an animated motion to reveal a glimpse of the UI layers that are hidden behind the first UI layer. The UI structure can be configured such that the speed or distance of the animated motion may vary based on a priority of the hidden content that is to be revealed.

The disclosed techniques also enable systems to generate a visual bounce cue for providing awareness of updated content. For example, a device displaying selected content, e.g., messages in a chat session UI, may generate a controlled animated movement of the chat session UI to let a user know of an update to associated content that may be displayed in a UI layer under the UI displaying the selected content. The animated movement of the selected content can temporarily reveal a portion of the associated content in a subtle motion that minimizes the movement of the selected content. In some configurations, the motion can involve dynamic speed variations that give the appearance of a bouncing motion. The visual bounce cue can be displayed when an update to the associated content satisfies one or more criteria. For instance, the system can generate the visual bounce cue in response to determining if an update is received within a predetermined timeframe and/or if an update pertains to a person related to the selected content.

By moving the selected content to reveal at least a portion of the associated content or by providing a visual bounce cue, a system can provide a glimpse at salient content that might be of interest to a user. This can provide a number of benefits to user in that the user can see at least a portion of the associated content while maintaining a view of their selected content. In addition, previews and notifications that reveal associated content can reduce the need for a user to periodically traverse through various pages of information to check for updates that may or may not exist. This allows users to focus on important content and reduce the utilization of computing resources that is needed to unnecessarily navigate through pages of information. This improvement with respect to a user's interaction with the device can improve a device's overall efficiency with respect to memory usage, network bandwidth, and processing resources.

The selected content can be moved in a subtle way to minimize interruptions while also providing context to the information that a user may want to see. This will allow a user to determine a priority with respect to associated content while maintaining a view of the selected content. This benefit of showing both selected content and associated content can also occur during certain operations, such as a transition to a full view of the associated content. This has another benefit over existing systems in that some existing systems are unable to show any type of preview or notification during certain operations, e.g., during a transition into a particular UI of selected content. In addition, by providing notifications that are activated based on particular conditions, a system can be more precise at triggering notifications or previews during a most contextually relevant time. For instance, a preview of related content during a transition into a UI of selected content can give a user a broader perspective as they dive into a narrowed view of data, e.g., into a message UI. In another example, the techniques disclosed herein can animate visual cues as a user is launching an application user interface for displaying selected content. Existing systems do not provide such notifications and previews of associated content during a launch of some applications. Thus, the techniques disclosed herein can provide a broader view of a user's data at a contextually relevant time. These features reduce the overall number of notifications and thus mitigates the need for a user to disable a notification function. Also, by providing notifications that are more subtle, and less intrusive, a user is less likely to disable the notification function, and in turn, make notification functions more useful for a product.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2B shows aspects of a landing page used for generating animated visual cues and previews of associated data.

FIG. 2C shows aspects of a first stage of a transition from a landing page used for providing animated visual cues and previews of associated data to a content interaction user interface.

FIG. 2D shows aspects of a second stage of a transition from a landing page used for providing animated visual cues and previews of associated data to a content interaction user interface.

FIG. 2E shows aspects of a third stage of a transition from a landing page used for providing animated visual cues and previews of associated data to a content interaction user interface.

FIG. 2G shows aspects of a fifth stage of a transition from a landing page used for providing animated visual cues and previews of associated data to a content interaction user interface.

FIG. 2H shows aspects of a content interaction user interface after a transition from a landing page providing previews of associated data to a content editing user interface arrangement.

FIG. 3B shows aspects of a landing page having a dashboard used for providing animated visual cues and previews of associated data.

FIG. 3C shows aspects of a first stage of a transition from a landing page having a dashboard used for providing animated visual cues and previews of associated data to a content interaction user interface.

FIG. 3D shows aspects of a second stage of a transition from a landing page having a dashboard used for providing animated visual cues and previews of associated data to a content interaction user interface.

FIG. 3E shows aspects of a third stage of a transition from a landing page having a dashboard used for providing animated visual cues and previews of associated data to a content interaction user interface.

FIG. 3F shows aspects of a content interaction user interface after a transition from a landing page providing previews of associated data.

FIG. 4A shows aspects of a content interaction user interface configured to provide content viewing and editing operations.

FIG. 4C shows aspects of a transition from a notification user interface arrangement to a content interaction user interface arrangement.

FIG. 4D shows aspects of a first stage of a transition from a content interaction user interface arrangement to a user interface arrangement displaying associated data.

FIG. 4E shows aspects of a second stage of a transition from a content interaction user interface arrangement to a user interface arrangement displaying associated data.

FIG. 4F shows aspects of a third stage of a transition from a content interaction user interface arrangement to a user interface arrangement displaying associated data.

FIG. 4G shows aspects of a fourth stage of a transition from a content interaction user interface arrangement to a user interface arrangement displaying associated data.

FIG. 4H shows aspects of a fifth stage of a transition from a content interaction user interface arrangement to a user interface arrangement displaying associated data.

FIG. 5A shows aspects of a content interaction user interface configured with a dashboard to provide content viewing and editing operations.

FIG. 5B shows aspects of a transition from a content interaction user interface arrangement with a dashboard to a notification user interface arrangement with the dashboard.

FIG. 5D shows aspects of a first stage of a transition from a content interaction user interface arrangement with a dashboard to a user interface arrangement displaying associated data with the dashboard.

FIG. 5E shows aspects of a second stage of a user-controlled transition from a content interaction user interface arrangement with a dashboard to a user interface arrangement displaying associated data with the dashboard.

FIG. 5F shows aspects of a third stage of a user-controlled transition from a content interaction user interface arrangement with a dashboard to a user interface arrangement displaying associated data with the dashboard.

FIG. 5G shows aspects of a user interface arrangement displaying associated data with a dashboard.

FIG. 6A shows aspects of a tab-enabled content interaction user interface to provide content viewing and editing operations.

FIG. 6B shows aspects of a first stage of a transition from a tab-enabled content interaction user interface arrangement with a dashboard to a notification user interface arrangement with the dashboard.

FIG. 6C shows aspects of a second stage of a transition from a tab-enabled content interaction user interface arrangement with a dashboard to a notification user interface arrangement with the dashboard.

FIG. 6D shows aspects of a tab-enabled notification user interface arrangement with a dashboard.

FIG. 6E shows aspects of a transition from a notification user interface arrangement with a dashboard to a tab-enabled content interaction user interface arrangement with the dashboard.

FIG. 6F shows aspects of a tab-enabled content interaction user interface arrangement with a notification.

FIG. 6G shows aspects of a user-controlled transition from a content interaction user interface arrangement with a dashboard to a user interface arrangement displaying associated data with the dashboard.

FIG. 7B shows aspects of a landing page used for providing animated visual cues and previews of associated data.

FIG. 7C shows aspects of a first stage of a transition from a landing page used for providing animated visual cues and previews of associated data to a content interaction user interface.

FIG. 7D shows aspects of a second stage of a transition from a landing page used for providing animated visual cues and previews of associated data to a content interaction user interface.

FIG. 7E shows aspects of a third stage of a transition from a landing page used for providing animated visual cues and previews of associated data to a content interaction user interface.

FIG. 7F shows aspects of a fourth stage of a transition from a landing page used for providing animated visual cues and previews of associated data to a content interaction user interface.

FIG. 7G shows aspects of a content interaction user interface configured to provide content viewing and editing operations.

FIG. 7H shows aspects of a transition from a content interaction user interface arrangement to a notification user interface arrangement.

FIG. 7I shows other aspects of a transition from a content interaction user interface arrangement to a notification user interface arrangement.

FIG. 7J shows aspects of a notification user interface arrangement in a bounce motion showing a preview of associated data.

FIG. 7K shows aspects of a transition from a notification user interface arrangement to a content interaction user interface arrangement.

FIG. 7L shows aspects of a content interaction user interface arrangement with a notification indicating a change to associated data.

FIG. 11 is a computer architecture diagram illustrating a computing device architecture for a computing device capable of implementing aspects of the techniques and technologies presented herein.

DETAILED DESCRIPTION

Figure 1:
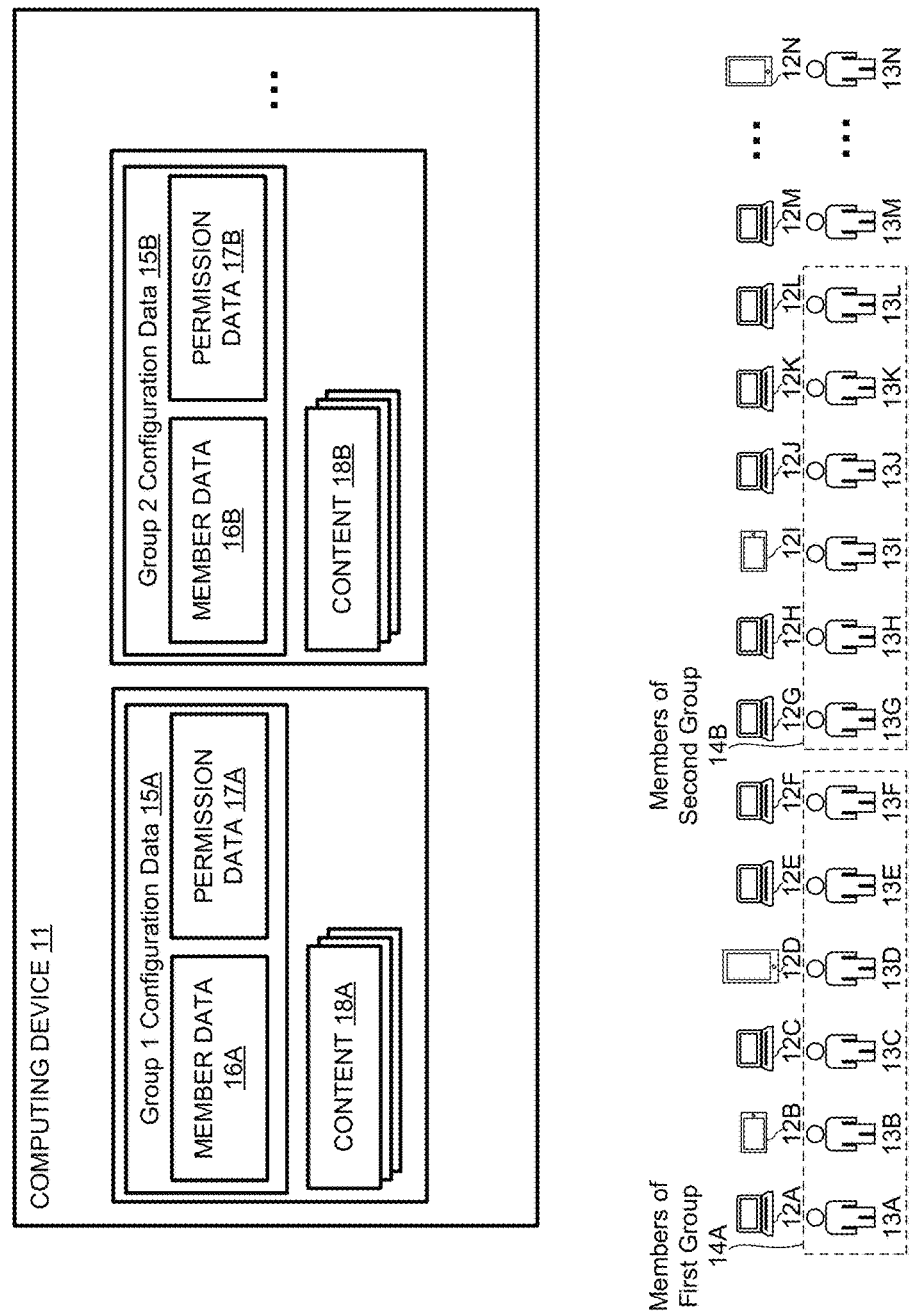
FIG. 1 is a block diagram of a system for generating animated visual cues for providing previews that indicate the availability of associated content.

FIG. 1 illustrates a system 10 that can automatically generate animated visual cues that indicate the availability of associated content. In one illustrative example, the system 10 can include a centralized computing device 11 and a number of network-connected client computing devices 12 that can be accessed by individual users 13. The computing device 11 can be configured to generate and manage a number of services, which may include management of communication sessions, data storage, and software services, e.g., software as a service (SaaS). Individual users 13 can form user groups, such as the first group of users 14A and the second group of users 14B. Users may be associated in number of different ways. For example, individual users may be associated with one another if they are communicating in a chat group, or a video or audio communication session. In another example, individual users may be associated with one another if they are members of a family, company, team, or any other entity. The computing device may also associate users if they share common data, such as a stored file, a shared account, a shared project, etc. Any type of activity, such as a calendar event or a broadcast, can also be used to associate individual users to form a user group 14. Among other examples described herein, content stored, processed, or communicated in conjunction with a group or a group's activity can be considered as "associated content" that satisfies one or more criteria, as described herein. As will be described in more detail below, the system 10 can work in conjunction with one or more client computing devices 12 to generate visual cues to bring awareness to data that may be relevant to users within a group.

The centralized computing device 11 and/or any of the client computers 12 can store configuration data 15 that defines a number of aspects of each user group. For example, the configuration data 15 can include group membership data 16 identifying each group member, and permission data 17 for defining roles and permissions for each group member. Content data 18 can also be stored in conjunction with individual user groups. The content data 18 can include any type of stored content such as images, videos, documents, spreadsheets, messages, emails, location data, task data, etc. The system 10 illustrated in FIG. 1 is provided for illustrative purposes and is not to be construed as limiting. It can be appreciated that the system can include more or fewer components and data for facilitating the techniques disclosed herein can involve any number of client computing devices 12 and any number of users 13. In addition, it can be appreciated that the techniques disclosed herein can be implemented without the use of a centralized computing device 11 and without the use of user groups. The visual cues and the previews disclosed herein can also be utilized by an individual client computing device indicating the availability of content associated with an individual user.

Referring to FIGS. 2A-2H, aspects of a visual cue showing a preview of available content are shown and described below. In this example, a computing device 100 generates a landing page that includes a visual cue showing a preview of available UI layers of associated content. When a user initiates a display of selected content, e.g., a user input causing a display of a message UI, the landing page provides a quick glance at related data, such as photos, calendars, tasks, and/or other data related to the selected content along with an animation of the message UI. Thus, instead of transitioning immediately to the message UI, the computing device provides the user with a broader contextual view of related information, such as contact information, images, calendar events, files, etc. This preview enables a user to get a quick glance of the related information that allows a user to determine a priority of the content. Then after the display of the preview, the user interface transitions to a larger user interface displaying the selected content without displaying the preview of the associated content. Although this example illustrates selected content in the context of a message UI, it can be appreciated that the techniques disclosed herein can apply to any selected content such as images, videos, task or any other content type that might be selected by user.

Figure 2A:
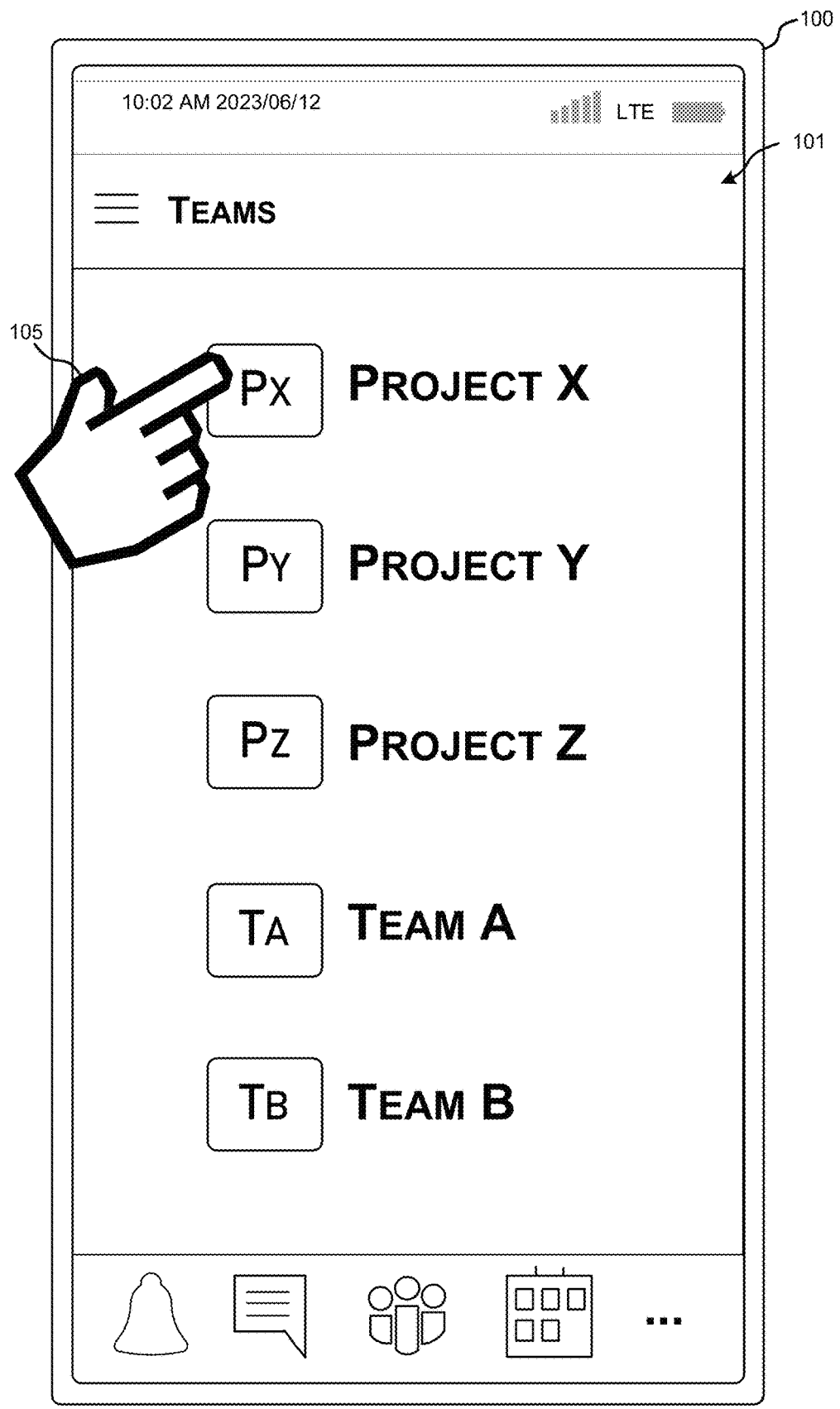
FIG. 2A shows an example user interface for initiating a process for generating animated visual cues and previews of associated data.
Figure 2F:
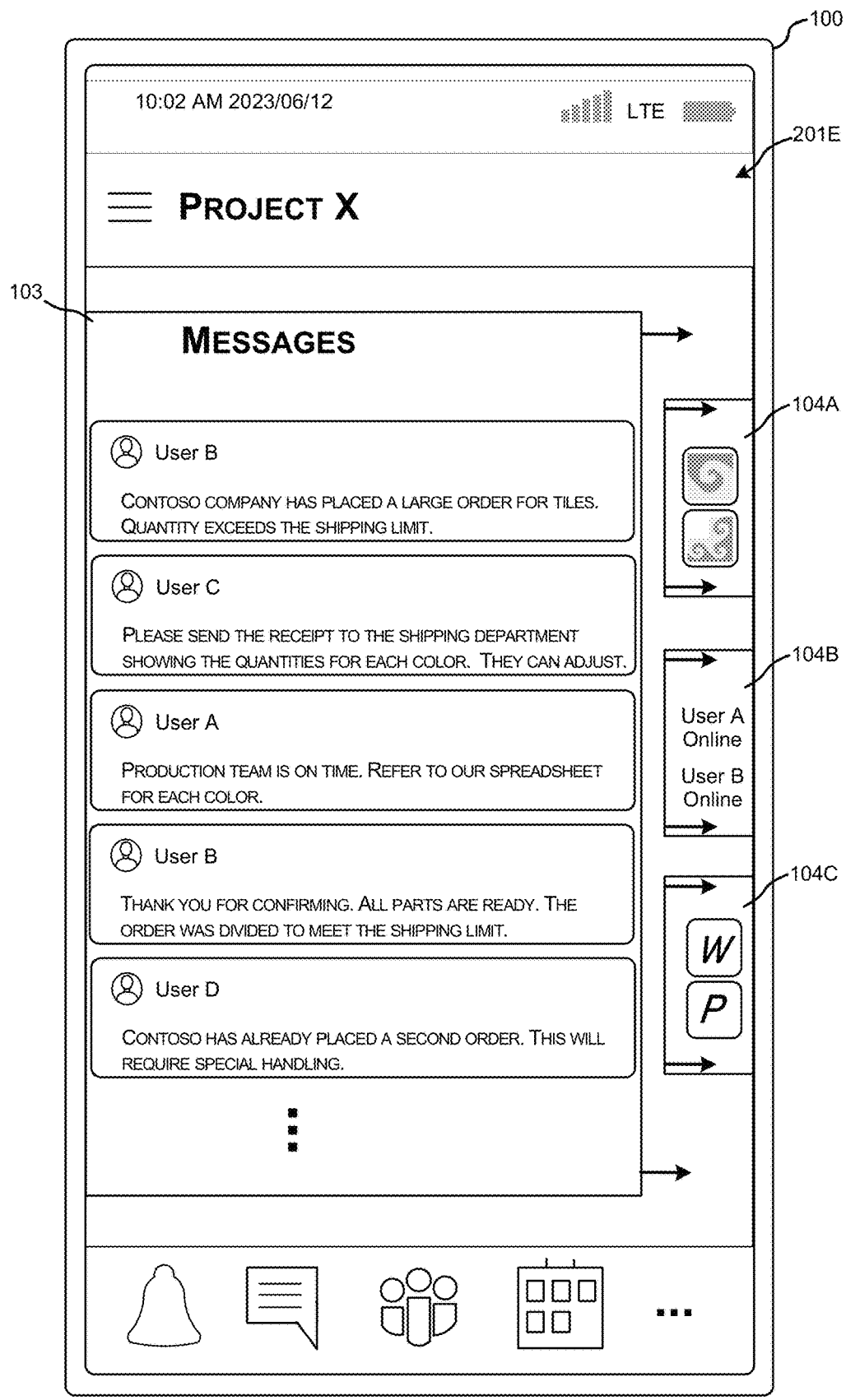
FIG. 2F shows aspects of a fourth stage of a transition from a landing page used for providing animated visual cues and previews of associated data to a content interaction user interface.

FIG. 2A shows a user interface 101 that can be used to initiate a process for generating animated visual cues and previews of associated data. In this example, the user interface 101 provides a number of selectable elements and corresponding text, e.g., Project X, Project Y, etc. Each selectable element is associated with a particular user group, a collection of content, or an application. For instance, each selectable element may cause a computer to display a user interface for a chat session, a video communication session, a multi-user content editing session, a collection of files, task data, a display of a multi-user editing session, etc. In response to a user input 105 indicating a selection of a particular element, such as "Project X," the computing device 100 displays the selected content, which in this example is a set of chat messages associated with a group of users participating in a chat session.

As shown in FIG. 2B, in response to the user input 105 or in response to any detected condition, the selected content can be displayed in a user interface 201A, also referred to herein as a "user interface arrangement" or a "landing page." The user interface 201A includes a rendering 103 of the selected content 108 and renderings 104 of the associated content 109. Instead of displaying the selected content 108 in a full-screen configuration in response to the user input, the landing page provides a view of the selected content 108 along with a preview of the associated content 109. For instance, the landing page can display selected content, e.g., a number of chat messages, along with a preview of associated photos, associated membership data, a set of associated files, etc.

The size and the position of the initial rendering 103 of the selected content 108, shown FIG. 2B, can be configured to allocate screen space for at least a portion of the associated content, e.g., thumbnails or representations of files, etc. In some configurations, the initial rendering of the selected content can be sized to take a fraction of the display screen, which may include less than a majority of the screen space.

The initial rendering of the selected content can also start on any corner or edge of the display screen, such as the top, bottom, left or right side of the display screen. The initial position of the rendering of the selected content can be at a predetermined distance (D) from at least one edge of a screen to allocate a particular portion of the display screen for the associated content. For instance, the distance (D) can be established to position an edge of the rendering 103 at a midpoint of the screen or at any other predetermined distance from any edge of a display screen to allocate space for the associated content. Thus, if the associated content requires a larger scale for text to be legible, the distance (D) can be increased. The initial size and/or the initial position of the selected content can be maintained to allocate room for a preview of the associated content for a predetermined time, e.g., a duration in which the associated content is displayed or a time in which the initial position of the associated content is maintained.

In some configurations, the initial position or size of the selected content and/or the time in which the associated content is displayed can be determined based on a number of factors. For instance, the initial position and/or the initial size of the selected content can be based on a priority of the associated content. For example, with reference to FIG. 2B, a system may determine that photos that are mentioned in the chat session by an executive of a company may be a higher priority than photos that are not mentioned in a chat session, or mentioned by a person having a lower rank. When the system detects the presence of the higher priority photos, the preview of the photos may be displayed for a longer time and/or the distance (D) allocating screen space and exposure time for the photos may be greater for higher priority content. Thus, the factors may include roles and permissions of users associated with the selected content, whether the associated content was mentioned in a chat session, and/or whether the associated content is owned by a participant of a chat session. The priority may also be based on a time or date since a recent update of the associated content, a type of associated content, e.g., images, emails, or documents, and/or an origin of the content. In another illustrative example, a document stored in OneDrive that is from a user participating in the chat session may be considered as high priority content, and thus the landing page may allocate more space for the document preview and/or hold the initial position of the selected content for a longer period of time vs. documents from users that are not participating in the chat session.

In some configurations, the landing page may be displayed only if the associated content 109 satisfies or meets one or more criteria. For instance, the landing page may only be displayed if the associated content has a relationship with the selected content. In such embodiments, if the computing device determines that content stored on a user's device is not related to the selected content, the computing device may bypass the landing page and automatically display the contents of the chat session.

In another example, the landing page may only be displayed if the associated content has been updated within a predetermined time of a current time. Thus, in some configurations, if a user initiates the display of the selected content and the system detects that the associated content has been updated within a predetermined time, e.g., less than 24 hours has lapsed since an update to the associated content has been received, the system displays the landing page. However, in some configurations, if a user initiates the display of the selected content and the system detects that the associated content has not updated within a predetermined time, e.g., it has been more than 24 hours since an update to the associated content has been received, the system may bypass the landing page and automatically display the selected content. The display of the landing page may be in response to other criteria described herein.

In the example of FIG. 2B, the display of the landing page may only occur if the associated content is related to an individual participating in the chat session. The associated content can satisfy the one or more criteria based on other factors, such as a reference within a chat session to the associated content. In one illustrative example, the user may refer to a particular document or provide an at mention within a chat session referring to any stored data. In another example, a participant of a chat session may have certain permissions to a file, task, image or video. The computing device can be configured to detect such activity and/or permissions and determine that such content is associated with the selected content, and thus, determine that a landing page is to be displayed. As shown in FIG. 2B, the computing device can cause a display of a first user interface arrangement 201A comprising a rendering 103 of the selected content 108 and a rendering 104 of the associated content 109 that meets the one or more criteria. In this example, a position and size of the rendering 103 of the selected content 108 enables a preview of at least a portion of the selected content 109.

As shown in FIGS. 2C-2G, after the landing page is displayed, the computing device can cause a transition from the first user interface arrangement 201A to subsequent user interface arrangements (201B-201G). In some configurations, the rendering of the selected content can increase in size over time while the rendering of the associated content can decrease in size over time. This type of transition allows the user to visualize both sets of content while a user interface transitions to a content interaction user interface 201G that enables a user to edit and/or view the selected content.

As shown in FIG. 2G, in some configurations, as the renderings 104 of the associated content decrease in size, and are eventually removed or hidden from the user interface arrangement, a graphical animation may be displayed to draw attention to the generation of a navigation element 110 indicating the availability of the associated content 108. For instance, the renderings 104 of the associated content may continue to decrease in size as they follow a path, shown by the dashed lines, to draw user attention to control element or page navigation element 110. This type of animation allows the user to readily see that the associated content is still available by the use of the navigation element 110 even though the associated content are being removed from the user interface. In some configurations, the navigation element 110 is generated prior to the removal of the associated content.

A shown in FIG. 2H, the transition of the user interface concludes at a UI arrangement 201G that displays the rendering of the selected content 108 at a new size that covers a predetermined portion of the display screen and shows the selected content 109 in a new rendering that is larger than the initial rendering of the selected content 109, as shown in FIG. 2B. In this arrangement 201G, also referred to herein as a content interaction user interface, the system may also display one or more interaction tools, such as a text entry field, a scroll bar, and other content editing tools allowing the user to view and interact with the selected content. In addition, the navigation element 110, which can be in the form of a multi-dot configuration, can indicate the number of pages of available content.

Some configurations, the content interaction user interface can include a rendering of the selected content that occupies a predetermined percentage of an available display area. In some configurations, the rendering of the selected content can occupy a majority, e.g. over 50% or over 75%, of a display area for an application configured to interact with the selected content. By allocating a majority of a display area to a particular set of selected content, a device can provide a more readable display of the selected content. In addition, a larger allocation, a majority of a display area, can allow room for various editing controls, such as a keyboard or other types of content editing tools. In some configurations, the content interaction user interface can include an edge-to-edge arrangement to maximize the utilization of a display area. In some configurations, the content interaction user interface can occupy a fixed percentage of a display area and allocate a predetermined portion of the display area for a dashboard 111, such as the section labeled as "Project X" as shown on the top of FIG. 2H.

In some configurations, the landing page can provide a visual cue showing a preview of available UI layers of associated content. A user interface structure can include a number of layers. The user interface structure can include a first layer that renders the selected content, such as a message UI shown in FIG. 2H. The user interface structure can also include at least one secondary layer that can render associated content, such as image data, task data, calendar data, membership data, or any other data associated with the selected content. One or more secondary layers can also include the dashboard 111. Thus, the dashboard 111 can appear to be positioned behind rendering 103 of the selected content 108.

In some configurations the secondary layer, also referred to herein as a "second layer," can render associated content that satisfies one or more criteria. Associated content can satisfy the one or more criteria when at least one of the following conditions is detected: when the associated content is referenced in a message or document included in the selected content, when the associated content is owned by, or has access permissions allocated to, a participant in a communication session (chat, message, video, and/or audio) having media included as the selected content, when the associated content references the selected content, or any other scenario the associated content and the selected content are associated with a common project, event, or a link.

The first layer can be positioned over the second layer such that when the layers are aligned, the first layer covers or obscures the display of the second layer or associated content displayed on the second layer. In embodiments involving a dashboard 111, the first layer can be sized and positioned to allow the dashboard 111 to be displayed to a user. When the landing page is displayed, the first layer can be positioned and sized such that it also exposes at least a portion of the associated content rendered in the second layer. The first layer can utilize characteristics of the selected content rendering described herein. For instance, the first layer can be sized and/or positioned to take less than half of a display area and allocate a majority of the display area to the second layer. This initial arrangement can be displayed for a predetermined period of time based on one or more factors, such as a priority of the associated content. A higher priority of the associated content can cause a device to prolong the display of this initial arrangement. Over time, the first layer can change in size and/or be repositioned to cover or obscure the display of the second layer. By simultaneously displaying the first layer and the second layer initially in the initial arrangement, a device can show a user that the selected content is to be displayed while also providing the user with a glimpse of the associated layer. In some configurations, the user interface structure can also cause a modification of a display property of the associated content to draw user focus to salient content, such as a new calendar item, a new team member, etc.

Referring now to FIGS. 3A-3F, illustrate another example of a visual cue showing a preview of available content is shown and described below. In this example, a computing device 100 generates a landing page that includes a visual cue showing a preview of available UI layers of associated content. The example of FIGS. 3A-3F shows an example of a visual cue that is used in conjunction with a dynamically controlled dashboard 111 that can change at least one of a shape, size and/or other display properties as the selected content and or associated content move with respect to one another.

Similar to the example above, when a user initiates a display of selected content, e.g., a set of messages, a landing page provides a glimpse of related content, such as photos, calendars, tasks, and/or other data related to the selected content. Thus, instead of transitioning immediately to a message UI displaying the set of messages, the computing device provides the user with a broader contextual view of related information, such as contact information, images, calendar events, files, etc. This preview enables a user to get a quick glance of important information that is pertinent to the content the user is about to engage with. Then after the display of the preview, the user interface transitions to a larger user interface displaying the selected content without displaying the preview of the associated content. Although this example illustrates selected content as a message user interface, it can be appreciated that the techniques disclosed herein can apply to any selected content such as images, videos, task or any other content type that might be selected by user.

Figure 3A:
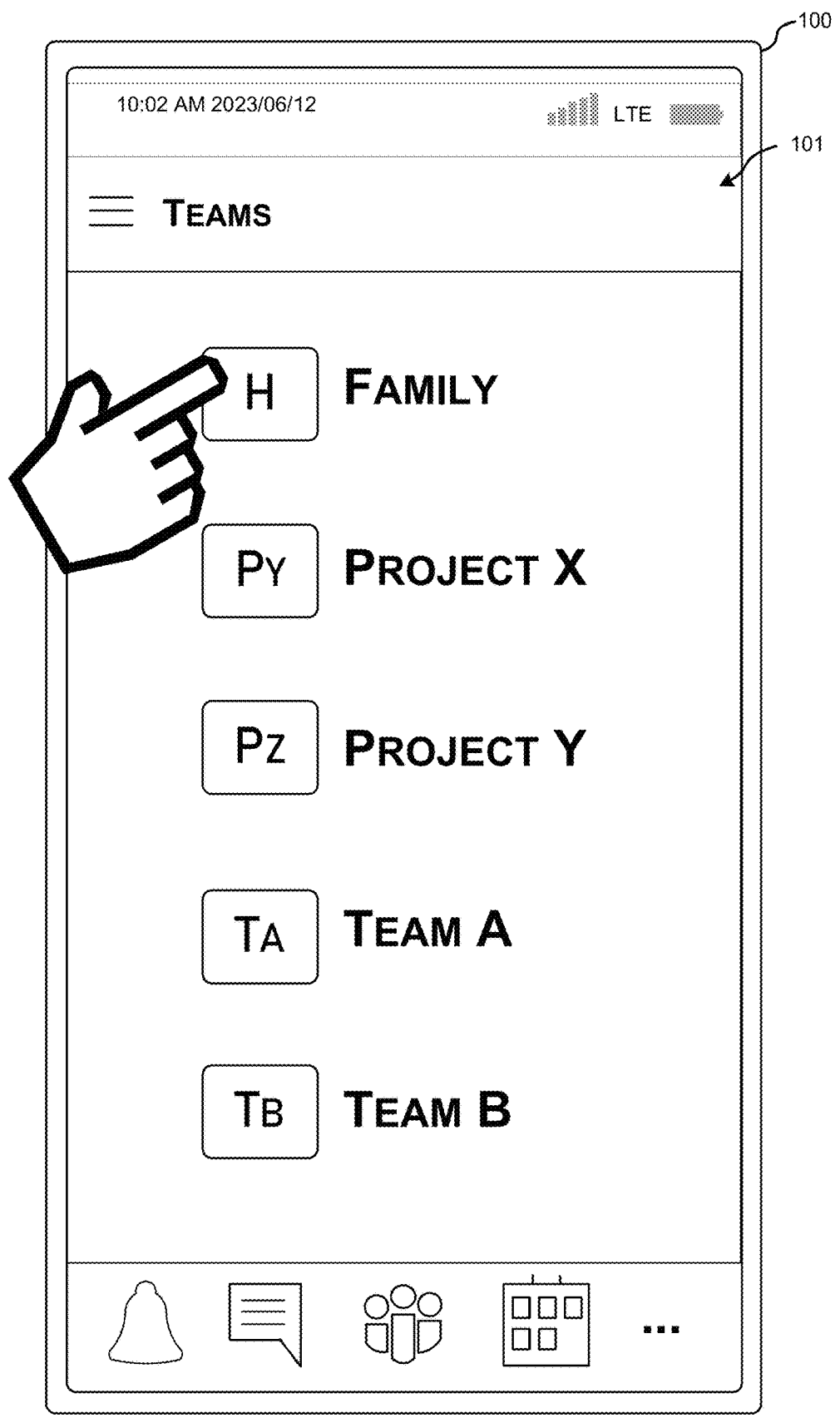
FIG. 3A shows an example user interface for initiating a process for providing animated visual cues and previews of associated data.

FIG. 3A shows an example user interface 101 for initiating a process for generating animated visual cues and previews of associated content. In this example, the user interface 101 provides a number of selectable elements: e.g., FAMILY, Project Y, etc. Each selectable element is associated with a particular user group, a collection of content, or an application. For instance, each selectable element may cause computer to display a user interface for a chat session, a video communication session, a multi-user content editing session, a collection of files, task data, etc. In response to a user input 105 indicating a selection of a particular element, the computing device 100 displays the selected content, which in this example is a set of chat messages associated with a group of users participating in a chat session.

As shown in FIG. 3B, in response to the user input 105, the selected content can be displayed in a user interface 201A, also referred to herein as a user interface arrangement or a landing page. The user interface 201A includes a rendering 103 of the selected content 108 and renderings 104 of the associated content 109. Instead of displaying the selected content 108 in a full-screen configuration in response to the user input, the landing page provides a partial view of the selected content 108 along with a preview of the associated content 109. For instance, the landing page can display selected content, e.g., chat messages, along with a preview of photos, tasks, location information, calendar information, group membership data, and files that are associated with the chat messages.

The size and the position of the initial rendering 103 of the selected content 108, shown FIG. 2B, can be configured to allocate screen space for at least a portion of the associated content, e.g., thumbnails or representations of files, etc. In some configurations, the initial rendering of the selected content can be sized to take a fraction of the display screen, which may include less than a majority of the screen space.

The initial rendering of the selected content can also start on one edge of the display screen, such as the top, bottom, left or right side of the display screen. The initial position of the rendering of the selected content can be at a predetermined distance (D) from at least one edge of a screen to allocate a particular portion of the display screen for the associated content. For instance, the distance (D) can be established to position an edge of the rendering 103 at a midpoint of the screen or at any other predetermined distance from any edge of a display screen to allocate space for the associated content. Thus, if the associated content requires a larger scale to improve the content's legibility or discernability, the distance (D) can be increased. The initial size and/or the initial position of the selected content can be maintained to allocate room for a preview of the associated content for a predetermined time, e.g., a duration in which the associated content is displayed or a time in which the initial position of the associated content is maintained. The initial position or size of the selected content and/or the time in which the associated content is displayed can be determined based on the factors disclosed herein.

As shown in FIGS. 3C-3E, after the landing page is displayed, the computing device can cause a transition from the display of the first user interface arrangement 301A to a display of subsequent user interface arrangements (301B-301F). In some configurations, the rendering of the selected content can increase in size over time while the rendering of the associated content can decrease in size over time. This type of transition allows the user to visualize both sets of content while a user interface transitions to a content interaction user interface that enables a user to edit and/or view the selected content.

A shown in FIG. 3F, the transition of the user interface concludes at a UI arrangement 301E that displays the rendering of the selected content 108 at a new size that covers a predetermined portion of the display screen and shows the selected content 109 in a rendering that is larger than the initial rendering of the selected content 109, as shown in FIG. 3B. In this arrangement 301E, also referred to herein as a content interaction user interface, the system may also display one or more interaction tools, such as a text entry field and other content editing tools allowing the user to view and interact with the selected content. In addition, a navigation element 110, which can be in the form of a multi-dot configuration, can indicate the availability of associated content. In some embodiments, the navigation element 110 can indicate a number of pages of the associated content.

In this embodiment, the user interface 301A includes a dynamically controlled dashboard 111 that includes an illustration 320. The dashboard 111 and/or the illustration 320 that can be sized and positioned based on a size and/or positioned based on the size and/or position of the selected content 108 or the associated content 109. The dynamically controlled illustration 320 can include information related to a group of users such as, but not limited to, an image associated with a user group, a title for the user group, and a status of the user group. As shown in FIGS. 3B-3F, the dynamically controlled dashboard 111 can decrease in size as the rendering 103 of the selected content increases in size, and the dashboard 111 can increase in size as the rendering 103 of the selected content decreases in size.

Referring now to FIGS. 4A-4H, aspects a visual bounce cue for bringing awareness of updated content are shown and described below. In some configurations, a system may display selected content, such as chat content, in a first user interface arrangement, such as the content interaction user interface described above. The system can then analyze the associated content to determine if an update to the associated content satisfies one or more criteria. In response to determining that an update satisfies one or more criteria, the system moves a rendering of the selected content to temporarily reveal at least a portion of the associated content. The movement of the selected content provides awareness of the associated content and shows a preview that provides context to an update to the associated content.

As shown in FIG. 4A, a computing device 100 can cause a display of a first user interface arrangement 401A comprising a rendering 103 of selected content 108. In some embodiments, the first user interface arrangement 101A conceals a rendering of associated content 109 having a relationship with the selected content 108. The first user interface arrangement 401A can include a first UI layer 103 displaying the selected content 109 and a second UI layer displaying the associated content. In such configurations, the second UI layer displaying the associated content in FIG. 4A is not shown in the first user interface arrangement 401A.

To initiate the visual bounce cue, a system may analyze the associated content 109 to determine that an update to the associated content 109 meets one or more criteria. For instance, the system can determine if an update is received within a predetermined timeframe and/or if an update pertains to a person related to the selected content. For example, if the selected content comprises chat messages of a chat session, the associated content satisfies one or more criteria if a participant engaged with the chat session owns or otherwise has access rights to the associated content and if the associated content has been updated with a predetermined period of time. In another examples, the associated content satisfies one or more criteria if the associated content meets a data size requirement, if the associated content has been updated with a predetermined period of time, if an update to the associated content indicates a particular user of a group has arrived at a predetermined location, if an update to the associated content indicates a particular user of a group has departed from a predetermined location, and/or if an update to the associated content has content of a particular data type, e.g., image data, location data, video data, etc. For illustrative purposes, a group of users can be a predetermined group of users or a group defined by participation of an activity, e.g., members of a chat group, members of a multi-user editing session, etc. Other types of activity can also trigger a visual bounce cue, such as, but not limited to, video data capturing predetermined gestures or movement, images identifying individuals or groups of individuals, etc.

Figure 4B:
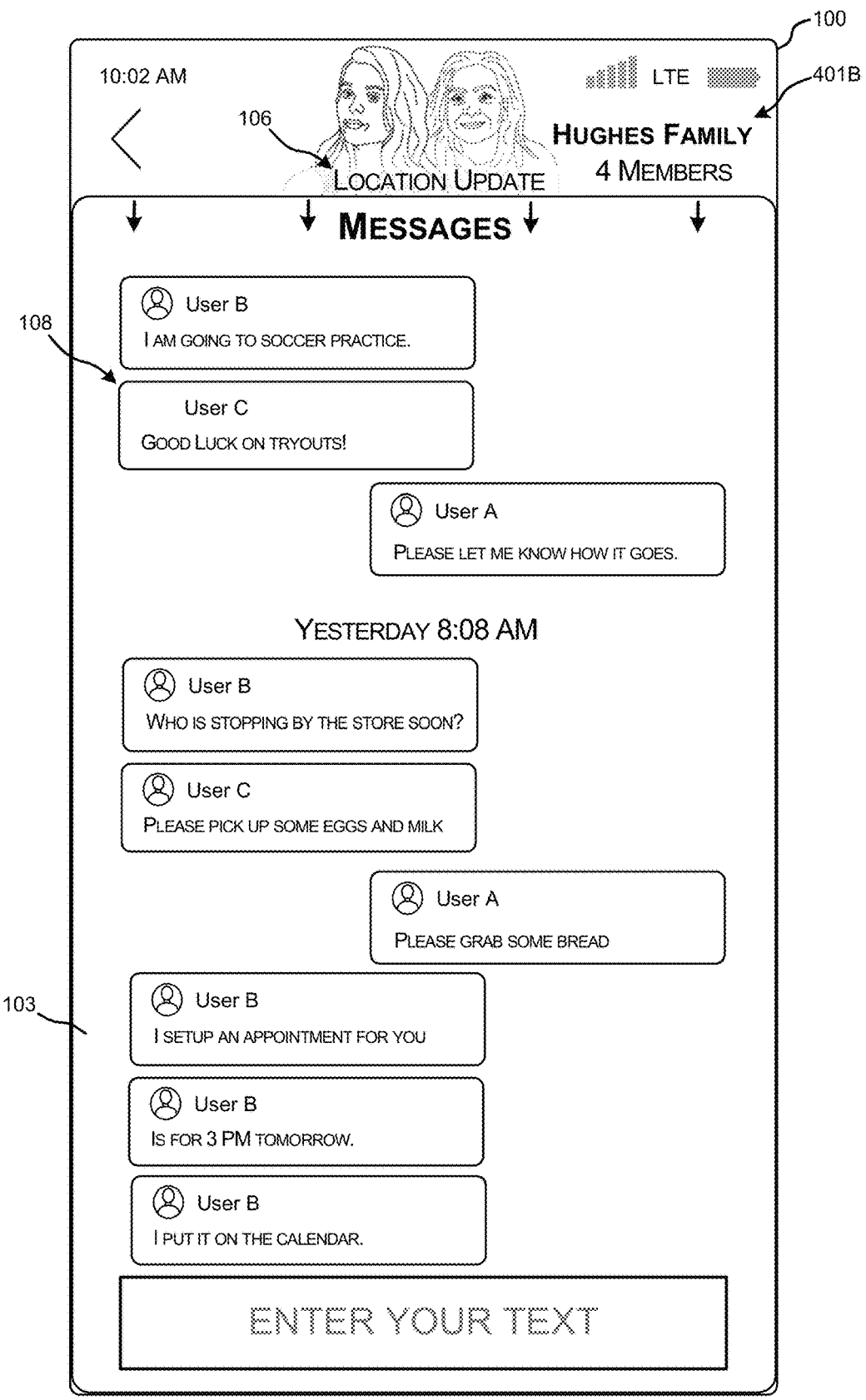
FIG. 4B shows aspects of a transition from a content interaction user interface arrangement to a notification user interface arrangement.

As shown in FIG. 4B, in response to determining that the associated content 109 meets one or more criteria, the computing device may display a notification 106. The notification 106 can be in the form of a text description of the update, a graphical element, or an animation indicating a type of update, etc. In the illustrative example of FIG. 4B, the associated content includes location data that indicates when a family member has reached a destination defined in a calendar event, e.g., that a family member made it to an appointment.

In response to determining that the associated content 109 meets one or more criteria, as shown in FIG. 4B, the computing device 100 causes a first transition from the first user interface arrangement 401A to a second user interface arrangement 401C. In the first transition, the first UI layer 103 moves in a predetermined direction. As shown in FIG. 4C, the movement of the first UI layer 103 is configured such that at least a portion of the associated content 109 is revealed. In some configurations, the movement of the first UI layer 103 is configured such that a representation 104 of the associated content 109 is revealed. The representation 104 may include, but is not limited to, as a text box, a title of the associated content, or a representative graphical element, In some embodiments, the first UI layer can move a distance (D) to create the second UI arrangement 401C shown in FIG. 4C. The distance (D) can be based on any of the factors disclosed herein. For instance, the distance (D) can be at a particular distance that allows the device to reveal a salient portion of the associated content, a portion of the associated content, or a representation of the associated content. In some configurations, to minimize the disruption to the user, the distance (D) can be less than a predetermined value, e.g., 5%, of a measurement of the rendering 103 of the selected content, or less than a predetermined measurement of any other measurement of the display screen.

Next, as shown in FIG. 4C, the computing device can cause a second transition from the second user interface arrangement 401C to another user interface arrangement 401D shown in FIG. 4D, similar to the initial user interface arrangement 401A. The second transition moves the rendering 103 of selected content 108 to conceal the portion of the associated content 109.

In some configurations, the first transition and the second transition can be coordinated to produce an animation that gives the appearance that the rendering 103 of the selected content is performing a bounce gesture. The bounce gesture can have characteristics similar to that of an object, such as rubber ball, bouncing off of the ground. This can include an acceleration of the rendering 103 toward the position shown in FIG. 4C. In addition, the bouncing motion can also include a deceleration as the rendering 103 moves from the position shown in FIG. 4C to the position shown in FIG. 4D.

As shown in FIG. 4D, upon completion of the second transition, the computing device may also display a notification 106 within the rendering 103 of the selected content 108. In some configurations, the notification 106 displayed within the rendering 103 of the selected content 108 can generate a graphical element, e.g., pulsing dot or an arrow, to suggest that the user can move the selected content to reveal the updates to the associated content. As shown in FIGS. 4E-4H, a user input, such as a swipe gesture, can cause the device to move the rendering 103 of the selected content 108 to reveal the associated content 109 displayed in the second UI layer 104. In addition, the computing device can also modify display properties or generate a highlight 107 to salient content. For instance, in the example shown in FIG. 4H, a highlight 107 around a person's location status can be generated if the update to the associated content indicates that the person has reached a particular destination. In this example, a particular user that is part of a group, such as a family, has a calendar event that indicates they are to be at a particular location at a given time. When the system detects that particular user's mobile device indicates that they have reached that location, or left that destination, the system determines that the person's location data, e.g., their associated content, meets one or more criteria and the causes the bounce cue and the highlight 107 to the salient content.

Referring now to FIGS. 5A-5G, another example showing aspects a visual bounce cue providing a preview and awareness of salient content are shown and described below. This example is similar to the above-described example in that this example provides a bounce cue based on an update to content. However, in this example, a dashboard 111 comprises a navigation element 110 that indicates the existence of pages of associated content. In addition, the navigation element 110 also provide a notification of updates to the associated content. In addition to providing a visual bounce cue indicating updated content, the device can also modify one or more display properties of the navigation element 110 to indicate a location of updated content. As described below, the modification of one or more display properties can also provide additional context on how users can navigate through pages of information to view the updated content.

As shown in FIG. 5A, a computing device 100 can cause a display of a first user interface arrangement 501A comprising a rendering 103 of selected content 108. In some embodiments, the first user interface arrangement 501A conceals a rendering of associated content 109 having a relationship with the selected content 108. The first user interface arrangement 501A can include a first UI layer 103 displaying the selected content 109 and a second UI layer displaying the associated content. In such configurations, the second UI layer displaying the associated content in FIG. 5A is not shown in the first user interface arrangement 501A.

The visual bounce cue can be initiated using any of the techniques disclosed herein. For instance, the device may analyze the associated content 109 to determine that the associated content 109 satisfies one or more criteria, e.g., an update to the associated content 109 indicates that a member of a group has an updated task. In the illustrative example of FIGS. 5A-5G, the computing device 100 determines that the associated content 109 meets one or more criteria when the computing device receives associated content indicating that a task of a group member has been updated.

As shown in FIG. 5B, in response to determining that the associated content 109 meets one or more criteria, the computing device displays a notification 106. The notification 106 can be in the form of an animation indicating a type of update. For instance, a pulsing graphical element with a first color can indicate a task update, a second color can indicate a calendar event, etc. A particular flashing element or a graphical property change, e.g., brightness or contrast or color, can also indicate an update type.

In response to determining that the associated content 109 meets one or more criteria, as shown in FIG. 5B, the computing device modifies a display property of one component of the navigation element 110 provide a notification of the updated content. In this example, the modification of the display property and cause the second dot of the multi-dot navigation element to pulse, change colors, and/or change brightness levels. This notification also indicates, a page, e.g., a second page of three pages, in which the content update is displayed.

Figure 5C:
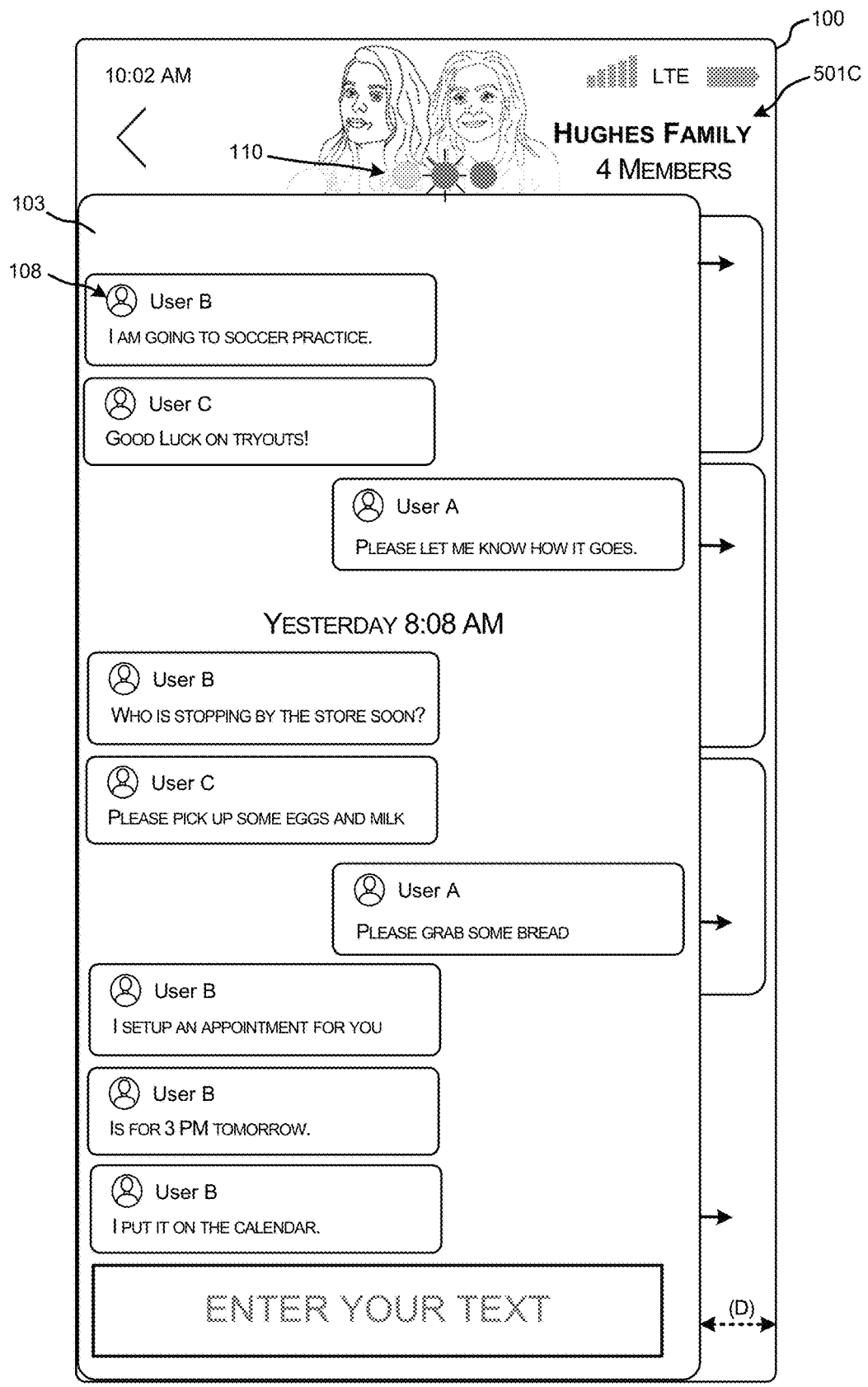
FIG. 5C shows aspects of a transition from a notification user interface arrangement with a dashboard to a content interaction user interface arrangement with the dashboard maintaining a notification.

In addition, in response to determining that the associated content 109 meets one or more criteria, as shown in FIG. 5B, the computing device 100 causes a first transition from the first user interface arrangement 501B to a second user interface arrangement 501C. In the first transition, the first UI layer 103 moves in a predetermined direction. As shown in FIG. 5C, the movement of the first UI layer 103 is configured such that at least a portion of the associated content 109 is to be revealed. In some configurations, the movement of the first UI layer 103 is configured such that a representation 104 of the associated content 109 is revealed. The representation 104 may include, but is not limited to, as a text box, a title of the associated content, or a representative graphical element.

Similar to other examples described herein, the first UI layer can move a distance (D) to create the second UI arrangement 501C shown in FIG. 5C. The distance (D) can be based on any of the factors disclosed herein. For instance, the distance (D) can be at a particular distance that allows the device to reveal a salient portion of the associated content, a portion of the associated content, or a representation of the associated content. The distance can also be based on a priority with respect to the updated content, an amount of updated content, and/or the arrangement of the updated content. The distance can be greater if there is a need to reveal more content or reveal a large arrangement.

Next, as shown in FIG. 5C, the computing device can cause a second transition from the second user interface arrangement 501C to another user interface arrangement 501D shown in FIG. 5D, similar to the initial user interface arrangement 501A. The second transition moves the rendering 103 of selected content 108 to conceal the portion of the associated content 109.

In some configurations, the first transition and the second transition can be coordinated to produce an animation that gives the appearance that the rendering 103 of the selected content is performing a bounce gesture. The bounce gesture can have characteristics similar to that of an object, such as rubber ball, bouncing off of the ground. This can include an acceleration of the rendering 103 toward the position shown in FIG. 4C. In addition, the bouncing motion can also include a deceleration as the rendering 103 moves from the position shown in FIG. 5C to the position shown in FIG. 5D.

As shown in FIGS. 5E-5G, a user input can cause the device to move the rendering 103 of the selected content 108 to reveal the associated content 109 displayed in the second UI layer 104. In addition, the computing device can also modify display properties or generate a highlight 107 to salient content. For instance, in the example shown in FIG. 5G, a highlight 107 around the new task that was detected by the computing device.

Referring now to FIGS. 6A-6F, another example of a visual bounce cue is provided on a dashboard having a tabbed page format. In this example, as shown in FIG. 6A, a system may display selected content, such as chat content, in a first user interface arrangement 601A. This arraignment includes a content interaction user interface and a set of tabs 610, e.g., a Chat tab and a Dashboard tab. In this configuration, a user can select a particular tab and cause the device to display a particular UI layer.

In FIG. 6A, the chat tab is selected causing the device to display the selected content. In response to a user selection of the dashboard tab, the device transitions to a second layer displaying associated content. To initiate the visual bounce cue, as in the other examples described herein, the system analyzes the associated content to determine if an update to the associated content satisfies one or more criteria. In response to determining that an update satisfies one or more criteria, as shown in FIGS. 6B-6F, the system moves a rendering 103 of the selected content to temporarily reveal at least a portion of the associated content. In this illustrative example, the computing device receives an update to calendar event causing the computing device to animate the visual bounce cue of FIGS. 6B-6F. In addition, the computing device also generates a notification 106 in the dashboard indicating the nature or a description of the update.

The notification 106 brings user attention to information in a secondary UI layer. In response, as shown in FIG. 6G, a user input selecting the Dashboard tab can cause the device to display the secondary UI layer comprising the associated content. In this example, a graphical highlight can be generated in association with the associated content having an update that satisfies one or more criteria. In this illustrative example, the updated content includes a cancel calendar event, which is displayed and highlighted in the user interface arrangement 601G.

Referring now to FIGS. 7A-7L, an example user scenario showing a visual preview cue and a visual bounce cue is shown and described below. This illustrative example shows a process of a device generating a visual preview cue while transitioning to a display of selected content, then while in the display of the selected content, the device detects the presence of associated data that meets one or more criteria. In response to determining that the associated data meets one or more criteria, the device can generate a visual bounce cue to provide a notification regarding the availability of associated content of interest. In this example, the visual bounce cue is generated in response to the detection of data that is defined within a system policy, e.g., an appointment that is approaching, processing of a video is near completion, data from a chat session has been stored, or any status change with respect to location data, processing data, etc.

Figure 7A:
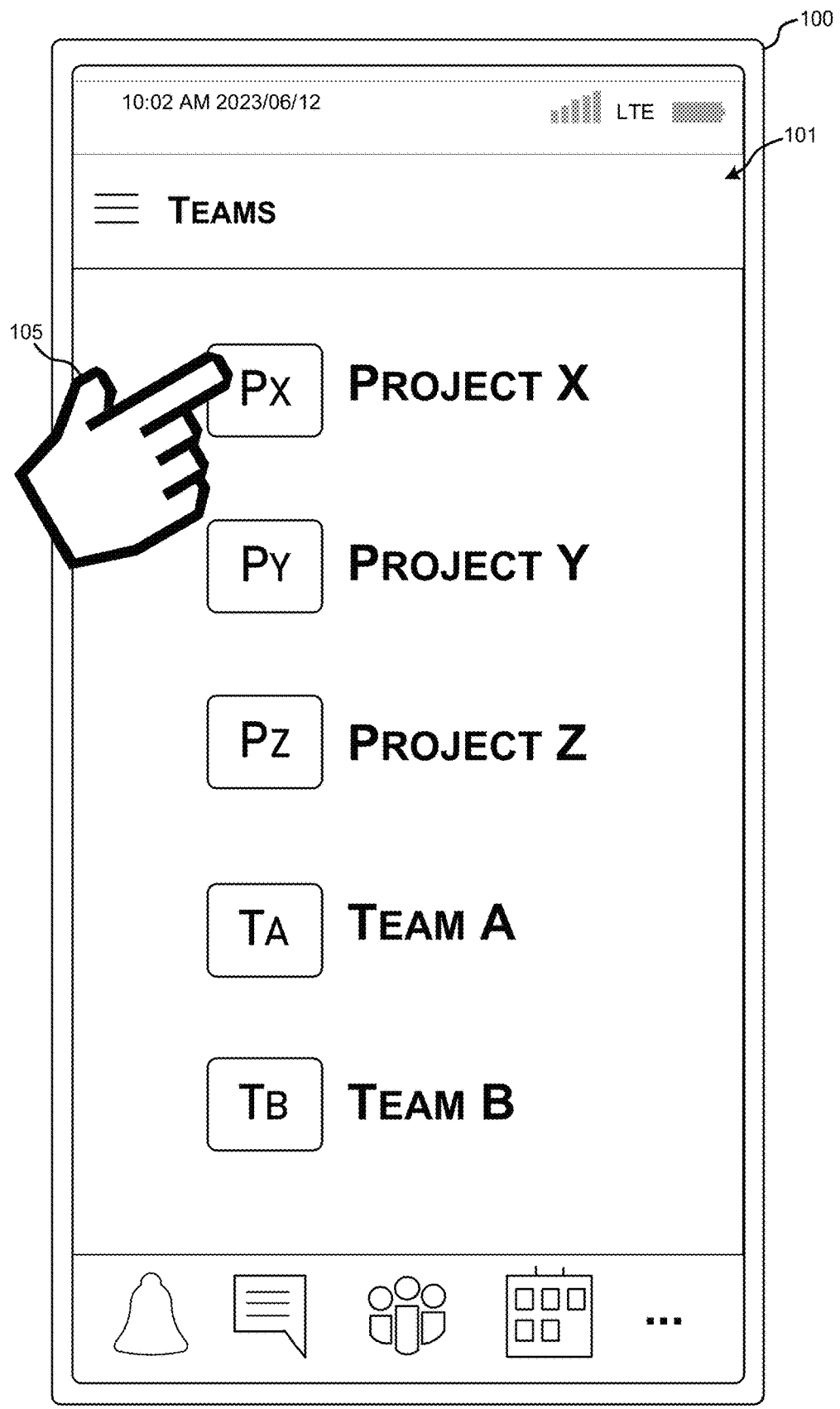
FIG. 7A shows an example user interface for initiating a process for providing animated visual cues and previews of associated data.

The computing device can display of a user interface 101 configured for allowing users to select a category of content. A category of content can be related to a particular user group, project, file, activity, broadcast, communication session, etc. As shown in FIG. 7A, user interface 101 displays a number of selectable elements, each representing a category of content. In response to a user input 105, the computing device can generate a visual preview cue, as shown in FIGS. 7B-7G.

As shown in FIG. 7B, the device 100 can generate an initial user interface arrangement 701A, also referred to herein as a landing page. This user interface arrangement 701A can include a first UI layer 103 displaying the selected content 108, which in this example is a set of chat messages. The user interface arrangement 701A also includes a second UI layer 104 having multiple graphical elements 104A and 104B representing and displaying content that is associated with the selected content 108.

As shown in FIGS. 7C-7G, after the landing page is displayed, the computing device can cause a transition from the first user interface arrangement 701A to subsequent user interface arrangements (701B-701G). In some configurations, a rendering 103 of the selected content can increase in size over time while a rendering 104 of the associated content can decrease in size over time. This type of transition allows the user to visualize both types of content while a user interface transitions to a content interaction user interface that enables a user to edit and/or view the selected content.

As shown in FIG. 7G, in some configurations, as the renderings 104 of the associated content decrease in size and are eventually removed from the user interface. This type of animation allows the user to readily see additional context of the associated content. In some configurations, the renderings 104 of the associated content can be arranged to position higher priority content, such as the previews of the photos 104A, such that the duration of the preview of this content last longer than the preview of other associated content. This example, the photos are considered to be higher priority than the membership data, thus the photos are arranged in a more prominent position during the preview process. A shown in FIG. 7G, the transition of the user interface to the content interaction user interface 701F ends when the rendering of the selected content covers the rendering of the associated content. While in the display the content interaction user interface 701F, a user can interact with the selected content by viewing messages and/or generating messages.

While the device displays the content interaction user interface 701F, the device analyzes the associated content to determine if the associated content satisfies one or more criteria. For instance, if the device detects a change within the photos and/or the membership data, the device will initiate the bounce cue process, shown in FIGS. 7H-7L. For illustrative purposes, consider a scenario where the device receives an update with respect to the photos, e.g., a new photo was received, an existing photo was modified, etc. In response to determining if the associated content satisfies one or more criteria, the rendering 103 of the selected content can move in a predetermined direction for a distance (D) for a predetermined period of time and then return to its original position. Some configurations, the movement of the rendering of the selected content can expose at least a portion of the associated content that was hidden behind the rendering 103 of the selected content.

In some configurations, the renderings of the associated content can be rearranged according to a detected update. For instance, in the example of FIG. 7J, if the device had detected a change within the membership data, for instance if the device detects a new member or a departing member, the device would rearrange renderings 104 of the associated content such that the membership data would be revealed during the visual bounce cue instead of revealing the photos. In this case, the rendering of the membership data would be positioned higher than the rendering of the photos so the membership data would be partially revealed during the bounce cue instead of the photos.

Turning now to FIG. 7, is a flow diagram showing aspects of a routine 851 for generating animated visual cues for providing previews that indicate the availability of associated content. This routine can be utilized separately or in combination in any order. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be rearranged, added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the example routines are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to a management engine 623 for performing the techniques disclosed herein, it can be appreciated that the operations of the example routines may be also implemented in many other ways. For example, the example routines may be implemented, at least in part, by a processor of another remote computer or a local computer. In addition, one or more of the operations of the example routines may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 8:
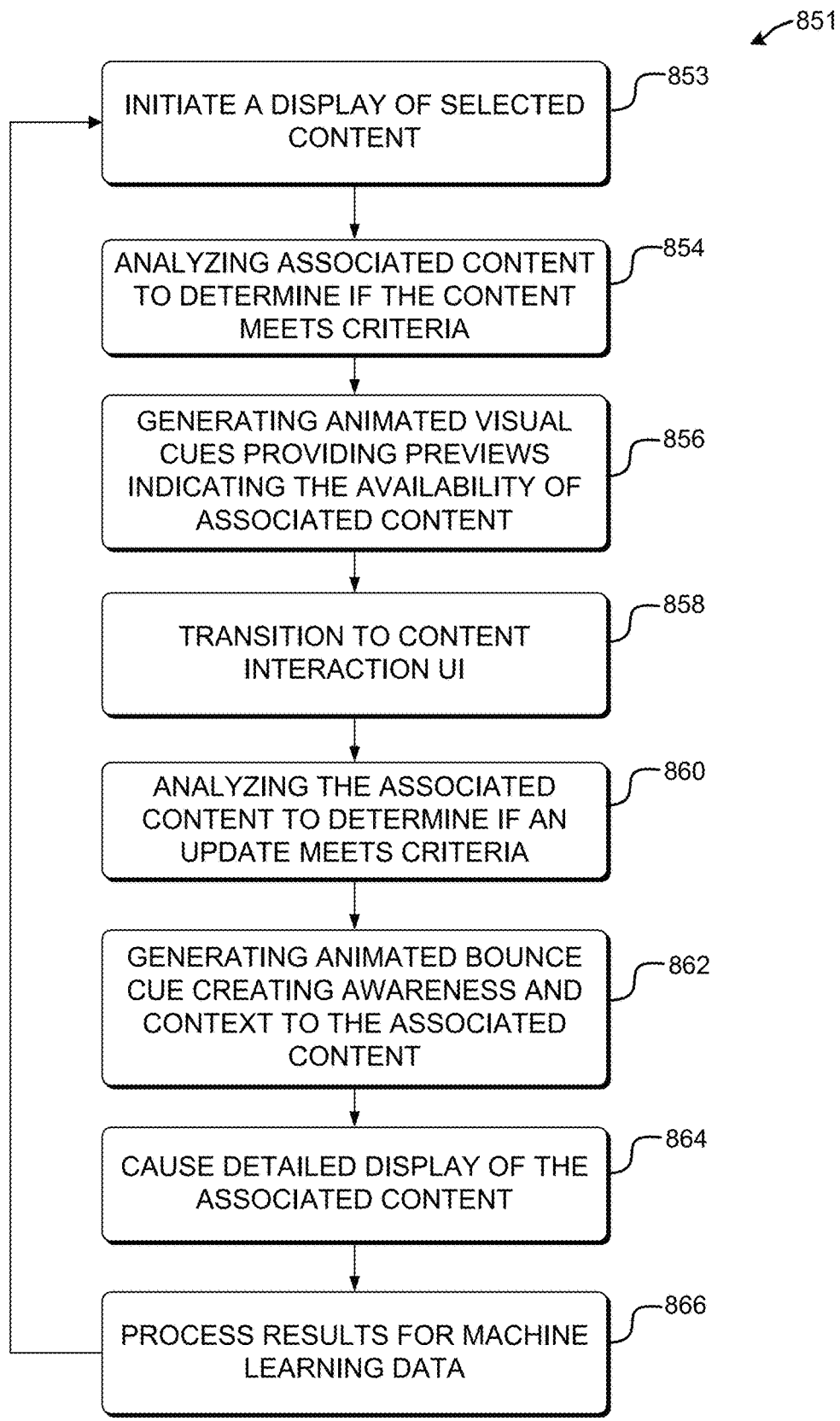
FIG. 8 is a flow diagram showing aspects of a routine for generating animated visual cues for providing previews that indicate the availability of associated content.

With reference to FIG. 8, the routine 851 can begin at operation 853 where the management engine 623 initiates a display of selected content 108. The display of the content can be initiated by any suitable input or detected condition of a computer. In one example, FIG. 2A shows an example user interface 101 for initiating a display of selected content 108. In this example, the user interface 101 provides a number of selectable elements, e.g., Project X, Project Y, etc. Each selectable element is associated with a particular user group, a collection of content, or an application. For instance, each selectable element may cause a computer to display a user interface for a chat session, a video communication session, a multi-user content editing session, a collection of files, task data, etc. In response to a user input 105 indicating a selection of a particular element, the computing device 100 displays the selected content, which in this example is a set of chat messages associated with a group of users participating in a chat session.

At operation 854, the management engine 623 can analyze the selected content 108 and associated content 109 to identify associated content 109 that meets one or more criteria. For instance, associated content 109 can meets one or more criteria if the associated content has a relationship with the selected content. Thus, if the computing device determines that content stored on a user's device is not related to the selected content, the computing device may determine that the associated content 109 does not meet the one or more criteria.

At operation 856, the management engine 623 can generate animated visual cues indicating the availability of associated content. An animated visual cue can include causing a display of a first user interface arrangement 101A comprising a rendering 103 of the selected content 108 and a rendering 104 of the associated content 109 that meets the one or more criteria, wherein a position and size of the rendering 103 of the selected content 108 enables a preview of at least a portion of the selected content 109. This first user interface arrangement 101A is referred to herein as a landing page. FIG. 2B shows an example where a size and position of the selected content messages allows preview of the associated content, e.g., images, tasks, location information, etc.

At operation 858, the management engine 623 can cause a transition from the display of the first user interface arrangement 101A to a display of a second user interface arrangement 101G, wherein the transition increases the size of the rendering 103 of the selected content 109, and wherein the transition ends with the second user interface arrangement 101G displaying the rendering of the selected content 108 at a new size that covers the selected content 109. FIG. 2B through FIG. 2H show how a transition can cover the associated content in an animated motion. At the end or near the end of the transition, the management engine 623 can also render a graphical element 110 indicating an availability of the associated content 109. The graphical element 110 can include navigation dots that show content is available on other pages of a user interface.

At operation 860, while displaying the rendering of the selected content 108, the management engine 623 can analyze the associated content 109 to determine if an update to the associated content 109 meets one or more criteria. An update to the associated content 109 can meets one or more criteria, for instance, if an update to the associated content 109 is received within a predetermined timeframe and/or if an update pertains to a person or activity related to the selected content. For example, if the selected content comprises chat messages of a chat session, the associated content satisfies one or more criteria if a participant engaged with the chat session owns or otherwise has access rights to the associated content, and if the associated content has been updated with a predetermined period of time. In another examples, the associated content satisfies one or more criteria if the associated content meets a data size requirement, if the associated content has been updated with a predetermined period of time, if an update to the associated content indicates a particular user of a group has arrived at a predetermined location, if an update to the associated content indicates a particular user of a group has departed from a predetermined location, and/or if an update to the associated content has content of a particular data type, e.g., image data, location data, video data, etc. Other types of activity can also trigger a visual bounce cue, such as, but not limited to, video data capturing predetermined gestures or movement, images identifying individuals or groups of individuals, etc.

At operation 862, the management engine 623 can generate an animated bounce cue creating awareness and context to the associated content in response to determining that an update to the associated content 109 meets one or more criteria. The animated bounce cue can include a first transition from the first user interface arrangement 201A to a second user interface arrangement 201C. The first transition causes a movement of the rendering 103 of selected content 108 to reveal at least a portion of the associated content 109, the movement configured to draw user awareness to the associated content 109. For example, the back layer of associated content is temporarily displayed during a bounce motion of the selected content rendering. The animated bounce cue can also include a second transition from the second user interface arrangement 201C to the first user interface arrangement 201A, wherein the second transition moves the rendering 103 of selected content 108 to conceal the portion of the associated content 109. The second transition is the motion where the rendering bounces back into its original position.

At operation 864, the management engine 623 can cause a detailed display of the associated content. In some configurations, a detailed display of the associated content can be in response to a user input, which can include a swipe motion to move the selected content or a user selection of a tab to display the associated content.

Next at operation 866, the management engine 623 can process results from one or more user input actions for generating machine learning data to be used in future iterations of the routine. For instance, if a user does not look at the associated data after a notification indicates an update to location information for a user of a group, the system may determine that updates to location information are lower in priority over time, and the system may generate a more subtle bounce cue in future updates, e.g., the distance (D) of a bounce may be reduced.

In some embodiments, a method for generating a visual cue providing a preview of content 109 can include receiving an input 105 for initiating a display of selected content 108, analyzing the selected content 108 and associated content 109 to identify associated content 109 that meets one or more criteria. For example, if there is any associated content to show, the visual cue is displayed. Thus, the method can also include causing a display of a first user interface arrangement 201A comprising a rendering 103 of the selected content 108 and a rendering 104 of the associated content 109 that meets the one or more criteria, wherein a position and size of the rendering 103 of the selected content 108 includes at least a portion of the selected content 109. For example, in FIG. 2B the landing page has size and position of the selected content, e.g., messages, that allows preview of associated content, e.g., images, tasks, location information, etc. The method can also include causing a transition from the display of the first user interface arrangement 201A to a display of a second user interface arrangement 201G, wherein the transition increases the size of the rendering 103 of the selected content 109, and wherein the transition ends with the second user interface arrangement 201G displaying the rendering of the selected content 108 at a new size that covers the associated content 109. For example, FIG. 2H shows a transition from landing page to the content interaction UI, the selected content UI covers the associated content in an animated movement. The method can also include an operation where, in response to the transition from first user interface arrangement to the second user interface arrangement that covers the selected content 109, rendering a graphical element 110 indicating an availability of the associated content 109. For example, navigation dots are displayed.

In some embodiments, the selected content can comprise messages between a plurality of users, wherein the associated content 109 meets the one or more criteria when the selected content and the associated content are both related to the users participating in a message chat session.

In some embodiments, the associated content 109 can meet the one or more criteria when the associated content comprises updated data comprising at least one of updated location data, updated calendar data, updated task data, updated image data, updated video data, or updated membership data. This provides details on how the associated data is identified, when there has been a change in the associated data, a location update of a person.

In some embodiments, the associated content 109 can meet the one or more criteria when the associated content comprises updated location data indicating a remote user having a relationship to the selected content has reached a predetermined destination defined in a calendar event. This is an example of an update to location data. The preview highlights a person reaching a designated location. In the method, the associated content 109 meets the one or more criteria when the associated content comprises calendar data defining an event scheduled within a predetermined time from a current time. This is an example of an update to calendar data, where the preview highlights include an upcoming calendar event.

In some embodiments, the new size of the rendering 103 of the selected data 108 provided by the second user interface arrangement 201G can be larger than the size of the rendering 103 of the selected data 108 provided by the first user interface arrangement 201A, wherein the new size is configured to utilize a majority of area of a device display screen for improving user interaction with the selected content. This shows the transition of UI from partial screen to full screen.

In some embodiments, a first category of the associated content 109 is prioritized higher than a second category of the associated content 109, wherein a rendering of the first category of the associated content 109 has a display property that draw user attention to the first category of the associated content 109 over the second category of the associated content 109. This describes details the associated data, e.g., higher priority data, such as an important calendar reminder is positioned higher than map data.

In some embodiments, the transition begins after displaying the first user interface arrangement for a predetermined time, wherein the predetermined time is based on a priority of the associated content 109. The preview lasts longer if there is higher priority associated content, e.g., data in the dashboard.

In some embodiments, a rate of the transition is based on a priority of the associated content 109. The UI moves more slowly to prolong preview if there is higher priority associated content, e.g., data in the dashboard.

Some embodiments can include a bounce notification, such as shown in FIGS. 4A-4H, 5A-5G, 6A-6G. A user viewing selected content, e.g., a message UI, will get a bounce notification when there is an update to information related to the selected content. For example, a chat UI will bounce to notify a viewer that a person involved in the chat has reached a destination.

In some embodiments, a computing device 100 for generating a visual cue providing awareness to content updates, can include one or more processing units 802; and a computer-readable storage medium 804 having encoded thereon computer-executable instructions to cause the one or more processing units 802 to perform a method comprising causing a display of a first user interface arrangement 101A comprising a rendering 103 of selected content 108, wherein the first user interface arrangement 101A conceals a rendering of associated content 109 having a relationship with the selected content 108; analyzing the associated content 109 to determine that an update to the associated content 109 meets one or more criteria; causing a first transition from the first user interface arrangement 201A to a second user interface arrangement 201C, in response to determining that an update to the associated content 109 meets the one or more criteria, the first transition causes a movement of the rendering 103 of selected content 108 to reveal at least a portion of the associated content 109, the movement configured to draw user awareness to the associated content 109. This can include an operation where the back layer of data is temporarily displayed during a bounce of the content UI.

In some embodiments, the system can also cause a second transition from the second user interface arrangement 201C to the first user interface arrangement 201A, wherein the second transition moves the rendering 103 of selected content 108 to conceal the portion of the associated content 109. This is where the UI bounces back.

In some embodiments, the system can also cause a display of a text notification describing an attribute of the update to the associated content in a display area outside the rendering of selected content, in response to determining that the update to the associated content meets the one or more criteria. For example, FIGS. 4A-4H show a text notification in the dashboard that appears in addition to the UI bounce notification.

In some embodiments, the system can also cause a graphical element representing a number of pages of content, wherein one component of the graphical element changes with respect to at least one display property, in response to determining that the update to the associated content meets the one or more criteria. This can include a display property that has periodically pulsing changing color, etc. This is in FIGS. 5A-4G, where dots, or other graphic, pulses or changes color in addition to the UI bounce notification.

In some embodiments, the system can also cause at least one graphical element to change in size for a predetermined time, in response to determining that the update to the associated content meets the one or more criteria. FIGS. 4A-4H show a dashboard image or other graphic that can change size in addition to the UI bounce notification.

In some embodiments, the selected content comprises messages between a plurality of users, wherein the associated content comprises activity data generated by devices associated with the plurality of users, wherein identities of the plurality of users communicating the messages and the activity data indicate the relationship between the selected content and the associated content. This is one example of how the associated data is identified, e.g., location data is from members of a chat.

In some embodiments, the update to the associated content meets one or more criteria when the associated content includes at least one of location data indicating an arrival of a user at a predetermined destination, a new calendar event, a new task, a new image, a new video, or a new update to a membership group. This is an example of how the associated data is identified when there has been a change in the associated data, a location update of a person.

In some embodiments, a system 100 can comprise a means for receiving an input 105 for initiating a display of selected content 108; a means causing a display of a first user interface arrangement 201A comprising a rendering 103 of selected content 108 and a rendering 104 of associated content 109 that has a relationship with the selected content 108, wherein a position and size of the rendering 103 of the selected content 108 enables a preview of at least a portion of the selected content 109. An example of this is shown in FIG. 2B. The landing page has size and position of the selected content messages allows preview of associated content images, tasks, location information, etc. The system also includes a means for causing a transition from the display of the first user interface arrangement 201A to a display of a second user interface arrangement 201G, wherein the transition increases the size of the rendering 103 of the selected content 109, and wherein the transition ends with the second user interface arrangement 201G displaying the rendering of the selected content 108 at a new size that covers the associated content 109. FIG. 2H shows a transition from landing page to the content interaction UI, the selected content UI covers the associated content in an animated movement.

The system also includes a means for rendering a graphical element 110 indicating an availability of the associated content 109, wherein the rendering of the graphical element is in response to the transition from first user interface arrangement to the second user interface arrangement that covers the selected content 109, e.g., navigation dots are displayed.

In some configurations of the system the selected content comprises messages between a plurality of users, wherein the associated content 109 meets the one or more criteria when the selected content and the associated content are both related to the users participating in a message chat session.

In some configurations of the system, the associated content 109 meets the one or more criteria when the associated content comprises updated data comprising at least one of updated location data, updated calendar data, updated task data, updated image data, updated video data, or updated membership data. In some configurations of the system, the associated content 109 meets the one or more criteria when the associated content comprises updated location data indicating a remote user having a relationship to the selected content has reached a predetermined destination defined in a calendar event. This is an example of an update to location data. The preview highlights a person reaching a designated location. In some configurations of the system, the associated content 109 meets the one or more criteria when the associated content comprises calendar data defining an event scheduled within a predetermined time from a current time.

Figure 9:
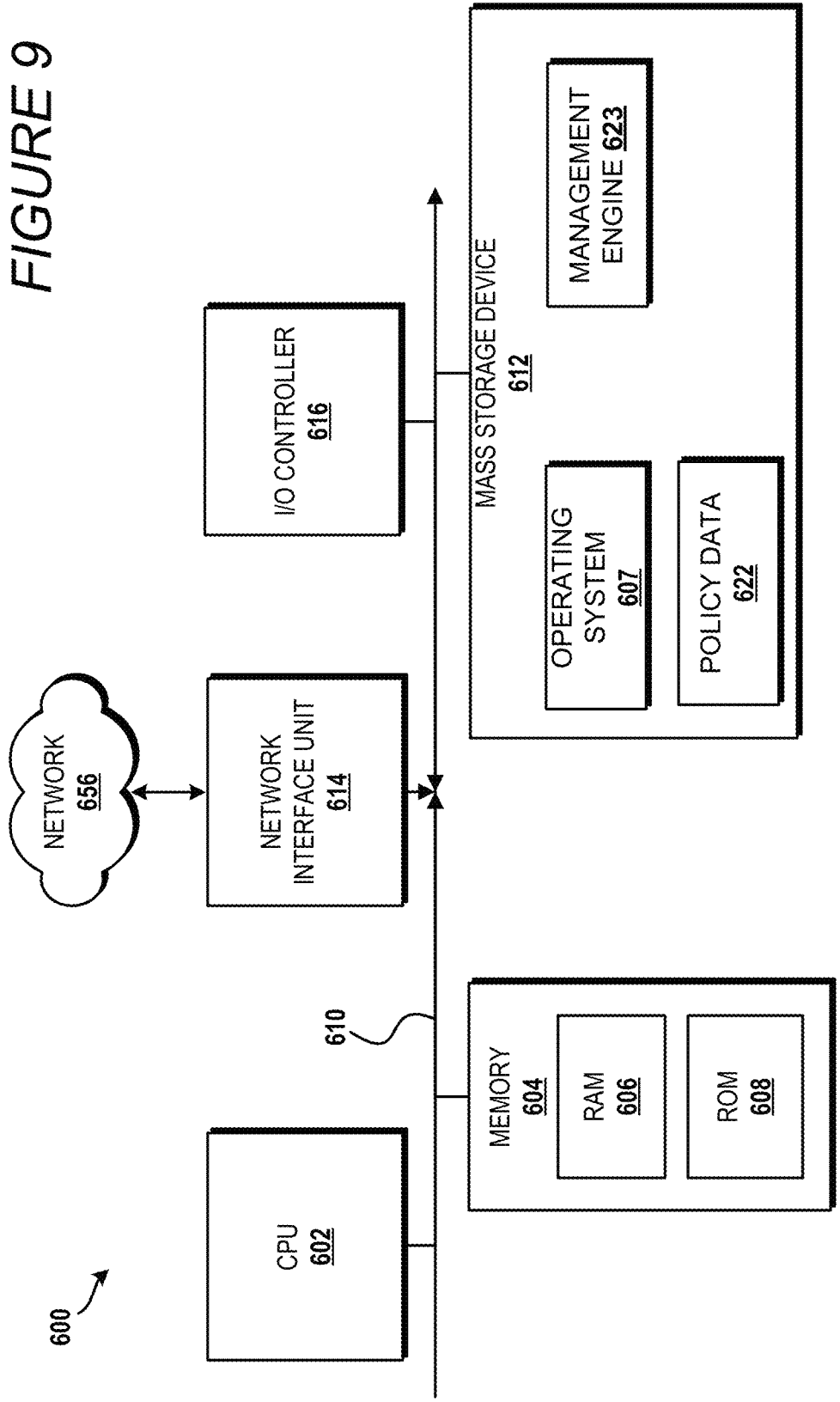
FIG. 9 is a computer architecture diagram illustrating an illustrative computer hardware and software architecture for a computing system capable of implementing aspects of the techniques and technologies presented herein.

FIG. 9 shows additional details of an example computer architecture 600 for a computer, such as the computing device 101 of the other figures, capable of executing the program components described herein. Thus, the computer architecture 600 illustrated in FIG. 9 illustrates an architecture for a server computer, a mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 9 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 607, other data, such as policy data 622, and one or more applications, such as the management engine 623 that can perform the techniques disclosed herein. The policy data 622 can be used to store the one or more criteria, thresholds, etc.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through the network 656 and/or another network (not shown). The computer architecture 600 may connect to the network 656 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown in FIG. 9). Similarly, the input/output controller 616 may provide output to a display screen, a printer, or other type of output device (also not shown in FIG. 9).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 9, may include other components that are not explicitly shown in FIG. 9, or may utilize an architecture completely different than that shown in FIG. 9.

Figure 10:
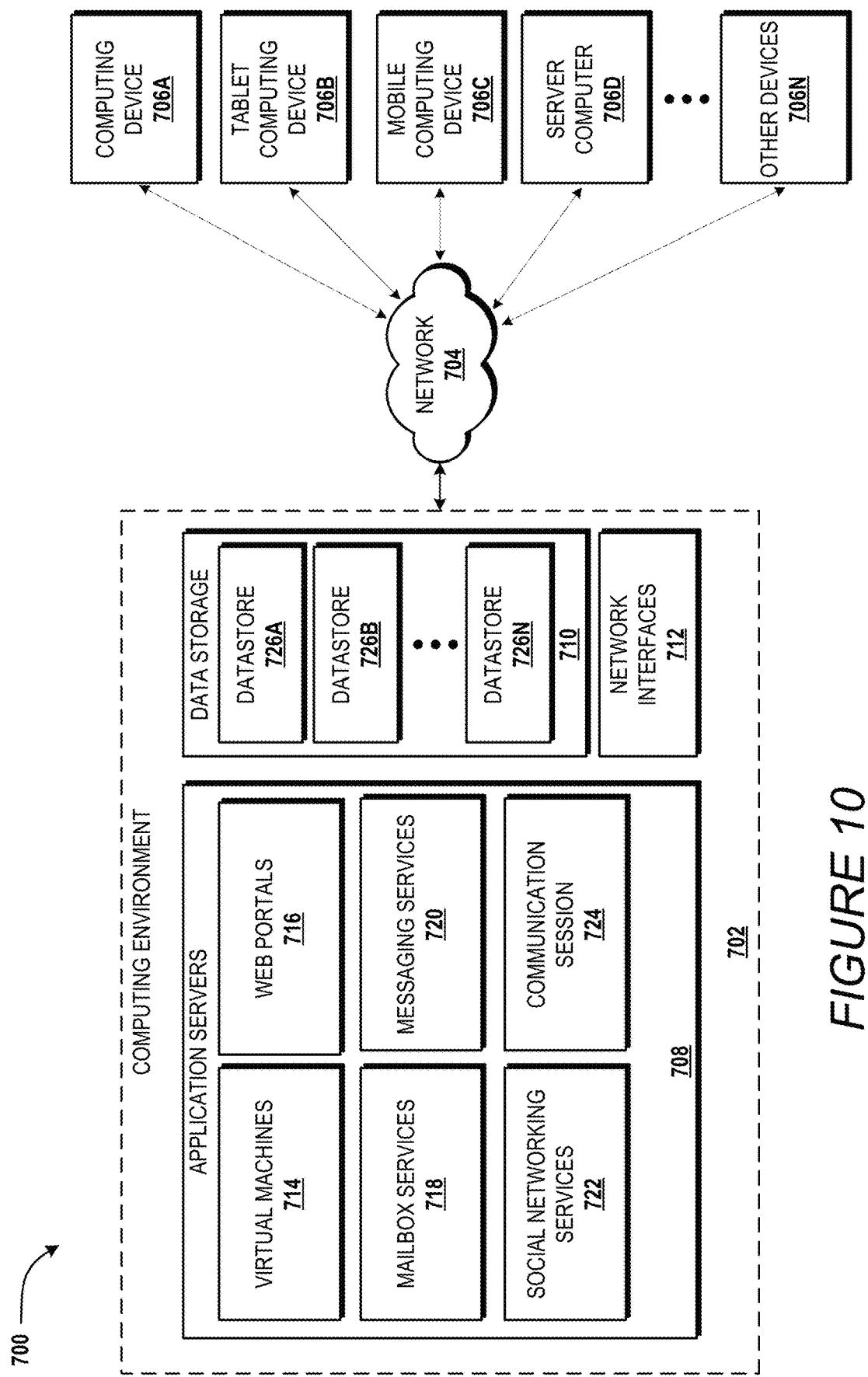
FIG. 10 is a diagram illustrating a distributed computing environment capable of implementing aspects of the techniques and technologies presented herein.

FIG. 10 depicts an illustrative distributed computing environment 700 capable of executing the software components described herein. Thus, the distributed computing environment 700 illustrated in FIG. 10 can be utilized to execute any aspects of the software components presented herein. For example, the distributed computing environment 700 can be utilized to execute aspects of the software components described herein.

According to various implementations, the distributed computing environment 700 includes a computing environment 702 operating on, in communication with, or as part of the network 704. The network 704 may be or may include the network 656, described above with reference to FIG. 9.

The network 704 also can include various access networks. One or more client devices 706A-706N (hereinafter referred to collectively and/or generically as "clients 706" and also referred to herein as computing devices 106) can communicate with the computing environment 702 via the network 704 and/or other connections (not illustrated in FIG. 10). In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. It should be understood that the illustrated clients 706 and computing architectures illustrated and described herein are illustrative, and should not be construed as being limited in any way.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated configuration, the application servers 708 host one or more virtual machines 714 for hosting applications or other functionality. According to various implementations, the virtual machines 714 host one or more applications and/or software modules for enabling efficient testing disclosed herein. It should be understood that this configuration is illustrative, and should not be construed as being limiting in any way. The application servers 708 also host or provide access to one or more portals, link pages, Web sites, and/or other information ("Web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") and presence services including, but not limited to, calendar services, contact management services, collaboration services, and/or other services. The messaging services 720 can include, but are not limited to, instant messaging services, chat services, forum services, and/or other communication services.

The application servers 708 also may include one or more social networking services 722. The social networking services 722 can include various social networking services including, but not limited to, services for sharing or posting status updates, instant messages, links, photos, videos, and/ or other information; services for commenting or displaying interest in articles, products, blogs, or other resources; and/or other services. In some configurations, the social networking services 722 are provided by or include the FACEBOOK social networking service, LINKEDIN professional networking service, GOOGLE HANGOUTS networking service, SLACK networking service, YAMMER office colleague networking service, and the like. In other configurations, the social networking services 722 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above configurations are illustrative, and should not be construed as being limited in any way. According to various implementations, the social networking services 722 may host one or more applications and/or software modules for providing the functionality described herein. For instance, any one of the application servers 708 may communicate or facilitate the functionality and features described herein. For instance, a social networking application, mail client, messaging client or a browser running on a phone or any other client 706 may communicate with a networking service 722 and facilitate the functionality, even in part, described above with respect to FIG. 10. Any device or service depicted herein can be used as a resource for supplemental data, including email servers, storage servers, etc.

As shown in FIG. 10, the application servers 708 also can host other services, applications, portals, and/or other resources ("other resources") such as a service managing a communication session 724. The communication session 724 can include, but is not limited to, document sharing, text sharing, video sharing, etc. It thus can be appreciated that the computing environment 702 can provide integration of the concepts and technologies disclosed herein with various mailbox, messaging, social networking, and/or other services or resources.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the application servers 708 and/or other data. Although not illustrated in FIG. 10, the datastores 726 also can host or store web page documents, word documents, presentation documents, data structures, algorithms for execution by a recommendation engine, and/or other data utilized by any application program or another module. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects. In one specific example, as summarized above, techniques described herein may be implemented, at least in part, by web browser application, which works in conjunction with the application servers 708 of FIG. 10.

Turning now to FIG. 11, an illustrative computing device architecture 800 for a computing device that is capable of executing various software components described herein for enabling the techniques disclosed herein. The computing device architecture 800, also referred to as a computer, device, or computing device (11, 12, or 100), is applicable to computing devices that facilitate mobile or server computing due, in part, to form factor, wireless connectivity, and/or battery-powered operation. In some configurations, the computing devices include, but are not limited to, servers, mobile telephones, tablet devices, slate devices, portable video game devices, and the like. The computing device architecture 800 is applicable to any of the computing devices shown in the figures. Moreover, aspects of the computing device architecture 800 may be applicable to traditional desktop computers, portable computers (e.g., phones, laptops, notebooks, ultra-portables, and netbooks), server computers, and other computer systems, such as described herein with reference to FIG. 1. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 11 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individuals components illustrated in FIG. 10, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720 P, 1080 P, and higher resolution), video games, three-dimensional ("3D") modeling applications, and the like. In some configurations, the processor 802 is configured to communicate with a discrete GPU (not shown). In any case, the CPU and GPU may be configured in accordance with a co-processing CPU/GPU computing model, wherein some of the sequential operations of an application executes on the CPU and the computationally-intensive operations is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. The processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 856 or another network, which may be a WWAN, a WLAN, or a WPAN. Although only the network 856 is illustrated, the network connectivity components 806 may facilitate simultaneous communication with multiple networks, including the network 604 of FIG. 14. For example, the network connectivity components 806 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 856 may be configured to provide voice and/or data communications with any combination of the above technologies. The network 856 may be configured to or adapted to provide voice and/or data communications in accordance with future generation technologies.

In some configurations, the WWAN component 822 is configured to provide dual-multi-mode connectivity to the network 856. For example, the WWAN component 822 may be configured to provide connectivity to the network 856, wherein the network 856 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 856 via the WI-FI access points. Such connections may be secured via various encryption technologies including, but not limited, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 832 are contemplated.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems. The GPS sensor 838 can also operate in conjunction with other components, such as the processor 802, to generate positioning data for the computing device 800.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interface described below, or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device may have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 842. As such, a developer may create gestures that are specific to a particular application program.

In some configurations, the touchscreen 842 supports a tap gesture in which a user taps the touchscreen 842 once on an item presented on the display 840. The tap gesture may be used for various reasons including, but not limited to, opening or launching whatever the user taps. In some configurations, the touchscreen 842 supports a double tap gesture in which a user taps the touchscreen 842 twice on an item presented on the display 840. The double tap gesture may be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture may be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture may be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture may be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 842. As such, the above gestures should be understood as being illustrative and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based buttons.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method for generating a visual cue providing a preview of associated content, the method for execution on a computing device comprising:
    receiving a selection input for initiating a display of selected content, and
    in response to the received selection input:
    determining if a temporary preview of a portion of other content is to be displayed concurrently with the selected content identified in the selection input, wherein the portion of the other content is to be identified as associated content for concurrent display with the selected content if the other content is related to the selected content;
    causing an automatic display of the temporary preview of the associated content using a first user interface arrangement comprising a rendering of the selected content that is concurrently displayed with a rendering of the associated content, wherein the display of the first user interface arrangement is in response to determining that the associated content is in existence, wherein a position and size of the rendering of the selected content includes at least a portion of the selected content, wherein the first user interface arrangement is bypassed if the other content is not related to the selected content, wherein the temporary preview of the selected content is displayed for a preset time period and the temporary preview of the selected content disappears after a lapse of the time period;

causing a transition from the display of the first user interface arrangement to a display of a second user interface arrangement, wherein the transition increases the size of the rendering of the selected content, and wherein the transition ends with the second user interface arrangement that displays the rendering of the selected content at a new size that covers a portion of a user interface surface that rendered the associated content; and in response to the transition from first user interface arrangement that rendered both the selected content and the associated content to the second user interface arrangement, rendering a graphical element indicating an availability of the associated content.

2. The method of claim 1, wherein the selected content comprises messages between a plurality of users, wherein the temporary preview of the portion of other content is to be displayed concurrently with the selected content for the time period in response to determining that the selected content and the associated content are both related to the users participating in a message chat session.

3. The method of claim 1, wherein the temporary preview of the portion of other content is to be displayed concurrently with the selected content for the time period in response to determining that the associated content comprises updated data comprising at least one of updated location data, updated calendar data, updated task data, updated image data, updated video data, or updated membership data.

4. The method of claim 1, wherein the temporary preview of the portion of other content is to be displayed concurrently with the selected content for the time period in response to determining that the associated content comprises updated location data indicating a remote user having a relationship to the selected content has reached a predetermined destination defined in a calendar event.

5. The method of claim 1, wherein the temporary preview of the portion of other content is to be displayed concurrently with the selected content for the time period in response to determining that the associated content comprises calendar data defining an event scheduled within a predetermined time from a current time.

6. The method of claim 1, wherein the new size of the rendering of the selected data provided by the second user interface arrangement is larger than the size of the rendering of the selected data provided by the first user interface arrangement, wherein the new size is configured to utilize a majority of area of a device display screen for improving user interaction with the selected content.

7. The method of claim 1, wherein a first category of the associated content is prioritized higher than a second category of the associated content, wherein a rendering of the first category of the associated content has a display property that draw user attention to the first category of the associated content over the second category of the associated content.

8. The method of claim 1, wherein the transition begins after displaying the first user interface arrangement for a predetermined time, wherein the predetermined time is based on a priority of the associated content.

9. The method of claim 1, wherein a rate of the transition is based on a priority of the associated content.

10. The method of claim 1, further comprising, displaying an initial user interface that displays an input element for causing the display of both the selected content and the associated content, wherein the initial user interface includes the input element and the initial user interface excludes the display of associated content that is related to the selected content, wherein the input causes the display of both the selected content and the associated content that is related to the selected content.

11. The method of claim 1, wherein the selection input causes the display of both the selected content and the associated content that is related to the selected content, wherein the input further causes the transition from the display of the first user interface arrangement having both the selected content and the associated content to the display of a second user interface arrangement that excludes the associated content and displays the selected content.

12. The method of claim 1, wherein the other content has a first data type and the selected content has a second data type, wherein the other content is related to the selected content if the selected content is a message UI, the other content may be photos or a calendar event related to the message UI.

13. The method of claim 1, further comprising: determining the preset time period based on a priority of the associated content, wherein the first user interface arrangement transitions to the second user interface arrangement after the time period without user input that for controlling the transition between the first user interface arrangement and the second user interface arrangement.

14. A computing device for generating a visual cue providing awareness to content updates, comprising:
one or more processing units; and
a computer-readable storage medium having encoded thereon computer-executable instructions to cause the one or more processing units to perform a method comprising:
receiving a selection input for initiating a display of selected content; and
in response to receiving the selection input:
determining if a temporary preview of a portion of other content is to be displayed concurrently with the selected content identified in the selection input, wherein the portion of the other content is to be identified as associated content for concurrent display with the selected content if the other content is related to the selected content;
causing an automatic display of the temporary preview of the associated content using a first user interface arrangement comprising a rendering of selected content, wherein the first user interface arrangement conceals a rendering of the associated content having the relationship with the selected content, wherein the first user interface arrangement is bypassed if the other content is not related to the selected content, wherein the temporary preview of the selected content is displayed for a preset time period and the temporary preview of the selected content disappears after a lapse of the time period;

analyzing the associated content to determine that an update to the associated content meets one or more criteria;

causing a first transition from the first user interface arrangement to a second user interface arrangement, in response to determining that an update to the associated content meets the one or more criteria, the first transition causes a movement of the rendering of selected content to reveal at least a portion of the associated content, the movement configured to draw user awareness to the associated content; and causing a second transition from the second user interface arrangement to the first user interface arrangement after the lapse of the time period, wherein the second transition moves the rendering of selected content to conceal the portion of the associated content.

15. The computing device of claim 14, wherein the method further comprises causing a display of a text notification describing an attribute of the update to the associated content in a display area outside the rendering of selected content, in response to determining that the update to the associated content meets the one or more criteria.

16. The computing device of claim 14, wherein the method further comprises causing a graphical element representing a number of pages of content, wherein one component of the graphical element changes with respect to at least one display property, in response to determining that the update to the associated content meets the one or more criteria.

17. The computing device of claim 14, wherein the method further comprises causing at least one graphical element to change in size for a predetermined time, in response to determining that the update to the associated content meets the one or more criteria.

18. A system comprising:
means for receiving a selection input for initiating a display of selected content;

means for determining if a temporary preview of a portion of other content is to be displayed concurrently with the selected content identified in the selection input, wherein the portion of the other content is to be identified as associated content for concurrent display with the selected content if the other content is related to the selected content;

means for causing an automatic display of the temporary preview of the associated content using a first user interface arrangement comprising a rendering of selected content and a rendering of associated content that has a relationship with the selected content, wherein the display of the first user interface arrangement is in response to determining that the associated content is in existence, wherein a position and size of the rendering of the selected content enables a preview of at least a portion of the selected content, wherein the first user interface arrangement is bypassed if the other content is not related to the selected content, wherein the temporary preview of the selected content is displayed for a preset time period and the temporary preview of the selected content disappears after a lapse of the time period;

means for causing a transition from the display of the first user interface arrangement to a display of a second user interface arrangement after the lapse of the time period, wherein the transition increases the size of the rendering of the selected content, and wherein the transition ends with the second user interface arrangement displays the rendering of the selected content at a new size that covers the selected content; and means for rendering a graphical element indicating an availability of the associated content, wherein the rendering of the graphical element is in response to the transition from first user interface arrangement to the second user interface arrangement that covers the selected content.

19. The system of claim 18, wherein the selected content comprises messages between a plurality of users, wherein the temporary preview of the portion of other content is to be displayed concurrently with the selected content for the time period in response to determining that the selected content and the associated content are both related to the users participating in a message chat session.

20. The system of claim 18, wherein the temporary preview of the portion of other content is to be displayed concurrently with the selected content for the time period in response to determining that the associated content comprises updated data comprising at least one of updated location data, updated calendar data, updated task data, updated image data, updated video data, or updated membership data.

* * * * *